US008958475B2

(12) United States Patent
Raveendran

(10) Patent No.: US 8,958,475 B2
(45) Date of Patent: Feb. 17, 2015

(54) TRANSMITTER QUIETING AND NULL DATA ENCODING

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 12/829,293

(22) Filed: Jul. 1, 2010

(65) Prior Publication Data

US 2011/0002377 A1 Jan. 6, 2011

Related U.S. Application Data

(60) Provisional application No. 61/222,845, filed on Jul. 2, 2009, provisional application No. 61/226,601, filed on Jul. 17, 2009, provisional application No. 61/295,479, filed on Jan. 15, 2010, provisional application No. 61/309,511, filed on Mar. 2, 2010.

(51) Int. Cl.

| | |
|---|---|
| ***H04N 11/02*** | (2006.01) |
| ***H04H 20/42*** | (2008.01) |
| ***H04H 60/41*** | (2008.01) |
| *H04H 60/80* | (2008.01) |

(52) U.S. Cl.

CPC ............... *H04H 20/42* (2013.01); *H04H 60/41* (2013.01); *H04H 60/80* (2013.01)

USPC ........................................................ 375/240.1

(58) Field of Classification Search

USPC ........................................ 375/240.01–240.29

See application file for complete search history.

(56) References Cited

U.S. PATENT DOCUMENTS

| | | | | |
|---|---|---|---|---|
| 3,668,525 A * | 6/1972 | McGraw | 455/7 |
| 4,079,380 A * | 3/1978 | Esry et al. | 342/368 |
| 4,098,110 A | 7/1978 | Bowden | |
| 4,745,479 A | 5/1988 | Waehner | |
| 5,098,110 A | 3/1992 | Yang | |
| 5,278,647 A | 1/1994 | Hingorani et al. | |
| 5,416,521 A | 5/1995 | Chujoh et al. | |
| 5,751,280 A * | 5/1998 | Abbott et al. | 715/203 |
| 5,754,353 A | 5/1998 | Behrens et al. | |
| 5,977,804 A | 11/1999 | Beech | |
| 6,009,237 A | 12/1999 | Hirabayashi et al. | |

(Continued)

FOREIGN PATENT DOCUMENTS

| | | |
|---|---|---|
| CN | 1264529 A | 8/2000 |
| CN | 1536784 A | 10/2004 |

(Continued)

OTHER PUBLICATIONS

Shellhammer et al., "Technical Challenges for Cognitive Radio in the TV White Space Spectrum," Information Theory and Applications Workshop, 2009, Feb. 2009.

(Continued)

*Primary Examiner* — Dave Czekaj
*Assistant Examiner* — Leron Beck
(74) *Attorney, Agent, or Firm* — Donald C. Kordich

(57) ABSTRACT

A method comprises encoding a set of frames of multimedia data, encoding null data for a period following the set of frames of multimedia data, modulating the encoded set of frames and the null data, wherein modulating the null data creates a null interval over the period, transmitting the encoded set of frames via a transmitter, and blanking the transmitter during the null interval.

35 Claims, 32 Drawing Sheets

(56) References Cited

U.S. PATENT DOCUMENTS

| | | | | |
|---|---|---|---|---|
| 6,044,270 | A | 3/2000 | Raith | |
| 6,201,966 | B1 | 3/2001 | Rinne et al. | |
| 6,556,585 | B1 * | 4/2003 | Moulsley | 370/465 |
| 6,563,896 | B1 * | 5/2003 | Nomura et al. | 375/364 |
| 6,621,528 | B1 | 9/2003 | Kessler et al. | |
| 6,788,710 | B1 | 9/2004 | Knutson et al. | |
| 6,895,544 | B1 | 5/2005 | Park et al. | |
| 6,914,637 | B1 | 7/2005 | Wolf et al. | |
| 7,068,724 | B1 | 6/2006 | Hamilton | |
| 7,075,982 | B2 | 7/2006 | Koto | |
| 7,212,570 | B2 | 5/2007 | Akiyama et al. | |
| 7,254,191 | B2 * | 8/2007 | Sugar et al. | 375/340 |
| 7,269,304 | B2 | 9/2007 | Lee et al. | |
| 7,274,661 | B2 | 9/2007 | Harrell et al. | |
| 7,391,809 | B2 | 6/2008 | Li et al. | |
| 7,483,717 | B2 * | 1/2009 | Champion et al. | 455/557 |
| 7,532,643 | B2 | 5/2009 | Teng | |
| 7,903,550 | B2 * | 3/2011 | Schmidt et al. | 370/230 |
| 8,493,834 | B2 | 7/2013 | Walker et al. | |
| 2002/0012395 | A1 | 1/2002 | Song et al. | |
| 2003/0032392 | A1 | 2/2003 | Suzuki | |
| 2003/0093364 | A1 | 5/2003 | Bae et al. | |
| 2003/0195977 | A1 | 10/2003 | Liu et al. | |
| 2004/0010729 | A1 | 1/2004 | Lockridge et al. | |
| 2004/0259548 | A1 | 12/2004 | Moon et al. | |
| 2005/0008074 | A1 * | 1/2005 | van Beek et al. | 375/240.01 |
| 2005/0078756 | A1 | 4/2005 | Narita | |
| 2005/0083873 | A1 | 4/2005 | Yamamoto | |
| 2005/0088074 | A1 | 4/2005 | Yoon et al. | |
| 2005/0191965 | A1 | 9/2005 | Yu et al. | |
| 2005/0213602 | A1 | 9/2005 | Redi | |
| 2005/0259623 | A1 | 11/2005 | Garudadri et al. | |
| 2006/0039483 | A1 | 2/2006 | Lee et al. | |
| 2006/0084444 | A1 | 4/2006 | Kossi et al. | |
| 2006/0171353 | A1 | 8/2006 | Nagata et al. | |
| 2006/0223467 | A1 | 10/2006 | Mason | |
| 2007/0195893 | A1 | 8/2007 | Kim et al. | |
| 2007/0253394 | A1 | 11/2007 | Horiguchi et al. | |
| 2008/0014880 | A1 | 1/2008 | Hyon et al. | |
| 2008/0086286 | A1 | 4/2008 | Shellhammer | |
| 2008/0146159 | A1 | 6/2008 | Faltman et al. | |
| 2008/0152003 | A1 | 6/2008 | Oguz | |
| 2008/0165754 | A1 | 7/2008 | Hu | |
| 2008/0232294 | A1 | 9/2008 | Ulupinar et al. | |
| 2008/0261639 | A1 | 10/2008 | Sun et al. | |
| 2008/0298654 | A1 | 12/2008 | Roth et al. | |
| 2009/0054020 | A1 | 2/2009 | Mason | |
| 2009/0102981 | A1 | 4/2009 | Mody | |
| 2009/0143019 | A1 | 6/2009 | Shellhammer | |
| 2009/0147859 | A1 | 6/2009 | McGowan et al. | |
| 2009/0161610 | A1 | 6/2009 | Kang et al. | |
| 2009/0163225 | A1 | 6/2009 | Haghighi et al. | |
| 2009/0235316 | A1 | 9/2009 | Wu et al. | |
| 2009/0247201 | A1 | 10/2009 | Ye et al. | |
| 2009/0263105 | A1 | 10/2009 | Sato et al. | |
| 2009/0279626 | A1 | 11/2009 | Wang | |
| 2010/0013855 | A1 | 1/2010 | Allen et al. | |
| 2010/0110997 | A1 | 5/2010 | Erceg et al. | |
| 2011/0002378 | A1 | 1/2011 | Raveendran | |
| 2011/0002379 | A1 | 1/2011 | Raveendran | |
| 2011/0002399 | A1 | 1/2011 | Raveendran | |
| 2011/0002405 | A1 | 1/2011 | Raveendran | |
| 2011/0182257 | A1 | 7/2011 | Raveendran et al. | |
| 2012/0224617 | A1 | 9/2012 | Feher | |

FOREIGN PATENT DOCUMENTS

| | | | |
|---|---|---|---|
| CN | 1788516 | A | 6/2006 |
| CN | 101053165 | A | 10/2007 |
| CN | 101127903 | A | 2/2008 |
| CN | 101142772 | A | 3/2008 |
| EP | 0892571 | | 1/1999 |
| EP | 1467589 | | 10/2004 |
| EP | 1478197 | | 11/2004 |
| JP | H07107558 | A | 4/1995 |
| JP | H10191331 | A | 7/1998 |
| JP | H1188945 | A | 3/1999 |
| JP | 2000083216 | A | 3/2000 |
| JP | 2000196967 | A | 7/2000 |
| JP | 2001308876 | A | 11/2001 |
| JP | 2002527995 | A | 8/2002 |
| JP | 2002538697 | A | 11/2002 |
| JP | 2004297316 | A | 10/2004 |
| JP | 2004312635 | A | 11/2004 |
| JP | 2004320302 | A | 11/2004 |
| JP | 2005057710 | A | 3/2005 |
| JP | 2005079738 | A | 3/2005 |
| JP | 2005175611 | A | 6/2005 |
| JP | 2005244991 | A | 9/2005 |
| JP | 2006074647 | A | 3/2006 |
| JP | 2006128812 | A | 5/2006 |
| JP | 2006526312 | A | 11/2006 |
| JP | 2007006349 | A | 1/2007 |
| JP | 2007060410 | A | 3/2007 |
| JP | 2007096665 | A | 4/2007 |
| JP | 2007134896 | A | 5/2007 |
| JP | 2007300419 | A | 11/2007 |
| JP | 2008079280 | A | 4/2008 |
| JP | 2008533913 | A | 8/2008 |
| JP | 2008211583 | A | 9/2008 |
| JP | 2008289056 | A | 11/2008 |
| JP | 2012532515 | A | 12/2012 |
| KR | 20000038176 | A | 7/2000 |
| KR | 20030013517 | A | 2/2003 |
| KR | 20050071571 | | 7/2005 |
| TW | 200826576 | A | 6/2008 |
| WO | WO-9904590 | A1 | 1/1999 |
| WO | WO-0022783 | A1 | 4/2000 |
| WO | WO-0051390 | A1 | 8/2000 |
| WO | WO03005719 | A2 | 1/2003 |
| WO | 2004051868 | A2 | 6/2004 |
| WO | WO-2004100587 | A1 | 11/2004 |
| WO | WO-2005114943 | A2 | 12/2005 |
| WO | WO2006020405 | | 2/2006 |
| WO | WO2006051509 | A1 | 5/2006 |
| WO | WO-2006101801 | A2 | 9/2006 |
| WO | WO2007043827 | A1 | 4/2007 |
| WO | WO-2007047755 | | 4/2007 |
| WO | WO-2007049609 | A1 | 5/2007 |
| WO | WO-2008027815 | A2 | 3/2008 |
| WO | 2008086243 | A1 | 7/2008 |
| WO | 2008129660 | A1 | 10/2008 |
| WO | WO2008155598 | A1 | 12/2008 |
| WO | 2009073819 | A1 | 6/2009 |

OTHER PUBLICATIONS

Hur et al., "A Cognitive Radio (CR)-based Mobile Interactive Digital Broadcasting Application adopting a Multi-Resolution Spectrum-Sensing (MRSS) Technique," IEEE, 5 pages, 2007.

Federal Communications Commission, FCC 08-260, "In the Matter of Unlicensed Operation in the TV Broadcast Bands, Additional Spectrum for Unlicensed Devices Below 900 MHz and in the 3 GHz Band," Second Report and Order and Memorandum Opinion and Order, released Nov. 14, 2008.

Claudio R. C. M. Da Silva et al.: "Distributed Spectrum Sensing for Cognitive Radio Systems" Information Theory and Applications workshop, 2007;Jan. 1, 2007;retrieved from http:/citeseerx.ist.psu.edu/viewdoc/download?doi=10.1.1.1296203.pdf, downloaded on Sep. 13, 2011 the whole document.

Federal Communication Commission, In the Matter of Unlicensed Operation in the TV Broadcast Band, Additional Spectrum for Unlicensed Devices Below 900 MHZ and in the 3GHZ Band—First Report and Order and Further Notice of Proposed Rulemaking, FCC 06-156, Oct. 18, 2006.

IEEE 802.11; Part 11: Wireless LAN Medium Access Control (MAC) and Physical Layer (PHY) Specifications (Revision of IEEE STD 802.11-1999) (2007).

IEEE 802.22-05/0007R48, C.R. Stevenson, C. Cordeiro, E. Sofer and G. Chouinard, Functional Requirements for the 802.22 WRAN Standards, Nov. 2006.

(56) References Cited

OTHER PUBLICATIONS

IEEE 802.22-06/28R10, Steve Shellhammer, Victor Tawil, Gerald Chouinard, Max Muterspaugh and Monisha Ghosh, Spectrum Sensing Simulation Model, Sep. 2006.
IEEE P802.22/D0.1, Draft Standard for Wireless Regional Area Networks Part 22: Cognitive Wireless RAN Medium Access Control (MAC) and Physical Layer (PHY) Specifications: Policies and Procedures for Operation in the TV Bands, Working Document Towards a Draft Version 0.1. May 2006.
International Search Report and Written Opinion—PCT/US2010/040942, International Search Authority—European Patent Office—Oct. 4, 2010.
Laar Van De F, et al.,"General-Purpose and Application-Specific Design of a DAB Channel Decoder", EBU Review—Technical, European Broadcasting Union. Brussels, BE, No. 258, Dec. 21, 1993, pp. 25-35, XP000435122.
Raveendran, U.S. Appl. No. 12/829,274, filed Jul. 1, 2010.
Raveendran, U.S. Appl. No. 12/829,280, filed Jul. 1, 2010.
Raveendran, U.S. Appl. No. 12/829,302, filed Jul. 1, 2010.
Raveendran, U.S. Appl. No. 12/829,321, filed Jul. 1, 2010.
Stevenson C, et al., "IEEE 802.22: The first cognitive radio wireless regional area network standard", IEEE Communications Magazine, IEEE Service Center, Piscataway, US, vol. 47, No. 1, Jan. 1, 2009, pp. 130-138, XP011280623, ISSN: 0163-6804, DOI: 10.1109/MCOM.2009.4752688.
Taiwan Search Report—TW099121867—TIPO—May 6, 2013.
Hu W., et al.,"IEEE P802.22—Wireless RANs—IEEE 802.22 Wireless RAN Standard PHY and MAC Proposal", XP007902891, Nov. 2005, URL: http://www.ieee802.org/22/Meeting_documents/2006_Jan/22-05-0098-01-0000_STM-Runcom_PHY-MAC_Outline.doc.

* cited by examiner

TRANSMITTER QUIETING AND NULL DATA ENCODING

This application claims the benefit of each of the following United States Provisional Patent applications:

U.S. Provisional Application 61/222,845, filed on Jul. 2, 2009;

U.S. Provisional Application 61/226,601, filed on Jul. 17, 2009;

U.S. Provisional Application 61/295,479, filed on Jan. 15, 2010; and

U.S. Provisional Application 61/309,511, filed on Mar. 2, 2010, the entire contents each of which are incorporated herein by reference.

This application is related to the following co-pending applications:

U.S. application Ser. No. 12/829,280 filed on Jul. 1, 2010 entitled, "TRANSMITTER QUIETING AND REDUCED RATE ENCODING"; U.S. application Ser. No. 12/829,9321 filed on Jul. 1, 2010 entitled, "TRANSMITTER QUIETING AND DIFFERENT ENCODING RATES FOR PORTIONS OF A SET OF FRAMES"; U.S. application Ser. No. 12/829,274 filed on Jul. 1, 2010 entitled, "TRANSMITTER QUIETING DURING SPECTRUM SENSING"; U.S. application Ser. No. 12/829302 filed on Jul. 1, 2010 entitled, "CODING LATENCY REDUCTIONS DURING TRANSMITTER QUIETING"

each of which was filed on the same day as this application and each of which is incorporated herein by reference in its respective entirety.

TECHNICAL FIELD

This disclosure relates to the transmission of data across a network.

BACKGROUND

Presently, several solutions for the wireless display of multimedia data, such as wireless HDMI (High-Definition Multimedia Interface), are in development. The primary intent for these solutions is to replace the HDMI cable between a particular component (e.g., set-top box, digital versatile disc (DVD) player, computing device) and a display device.

Certain providers have developed solutions that use proprietary methodologies for the transmission of uncompressed video. Other solutions may target consumer electronic devices (e.g., game consoles or DVD players) and require dedicated hardware on both the host and client side. The power consumption for such dedicated devices may be quite high. In addition, the transmission of uncompressed video in certain solutions may limit any expansion capabilities to support higher-resolution data transmission.

SUMMARY

In general, this disclosure describes a number of techniques, devices, and systems in which transmitter quieting (also called blanking) is performed. A number of techniques are also described for the creation of null intervals to correspond to a transmitter blanking interval so that data is not lost when the transmitter blanking occurs. In many examples, sensing is performed during the transmitter quieting.

In one example, a method comprises encoding a set of frames of multimedia data, encoding null data for a period following the set of frames of multimedia data, modulating the encoded set of frames and the null data, wherein modulating the null data creates a null interval over the period, transmitting the encoded set of frames via a transmitter, and blanking the transmitter during the null interval.

In another example, a device comprises a multimedia encoding unit that encodes a set of frames of multimedia data and encodes null data for a period following the set of frames of multimedia data, a modulator unit that modulates the encoded set of frames and the null data, wherein modulating the null data creates a null interval over the period, and a transmitter that transmits the encoded set of frames and blanks during the null interval.

In another example, a device comprises means for encoding a set of frames of multimedia data, means for encoding null data for a period following the set of frames of multimedia data, means for modulating the encoded set of frames and the null data, wherein modulating the null data creates a null interval over the period, means for transmitting the encoded set of frames via a transmitter, and means for blanking the means for transmitting during the null interval.

In another example, a computer-readable storage medium comprises instructions that upon execution in a processor cause the processor to encode a set of frames of multimedia data, encode null data for a period following the set of frames of multimedia data, modulate the encoded set of frames and the null data, wherein modulating the null data creates a null interval over the period, transmit the encoded set of frames via a transmitter, and blank the transmitter during the null interval.

The details of one or more aspects are set forth in the accompanying drawings and the description below. Other features, objects, and advantages will be apparent from the description and drawings, and from the claims.

DETAILED DESCRIPTION

Figure 1:
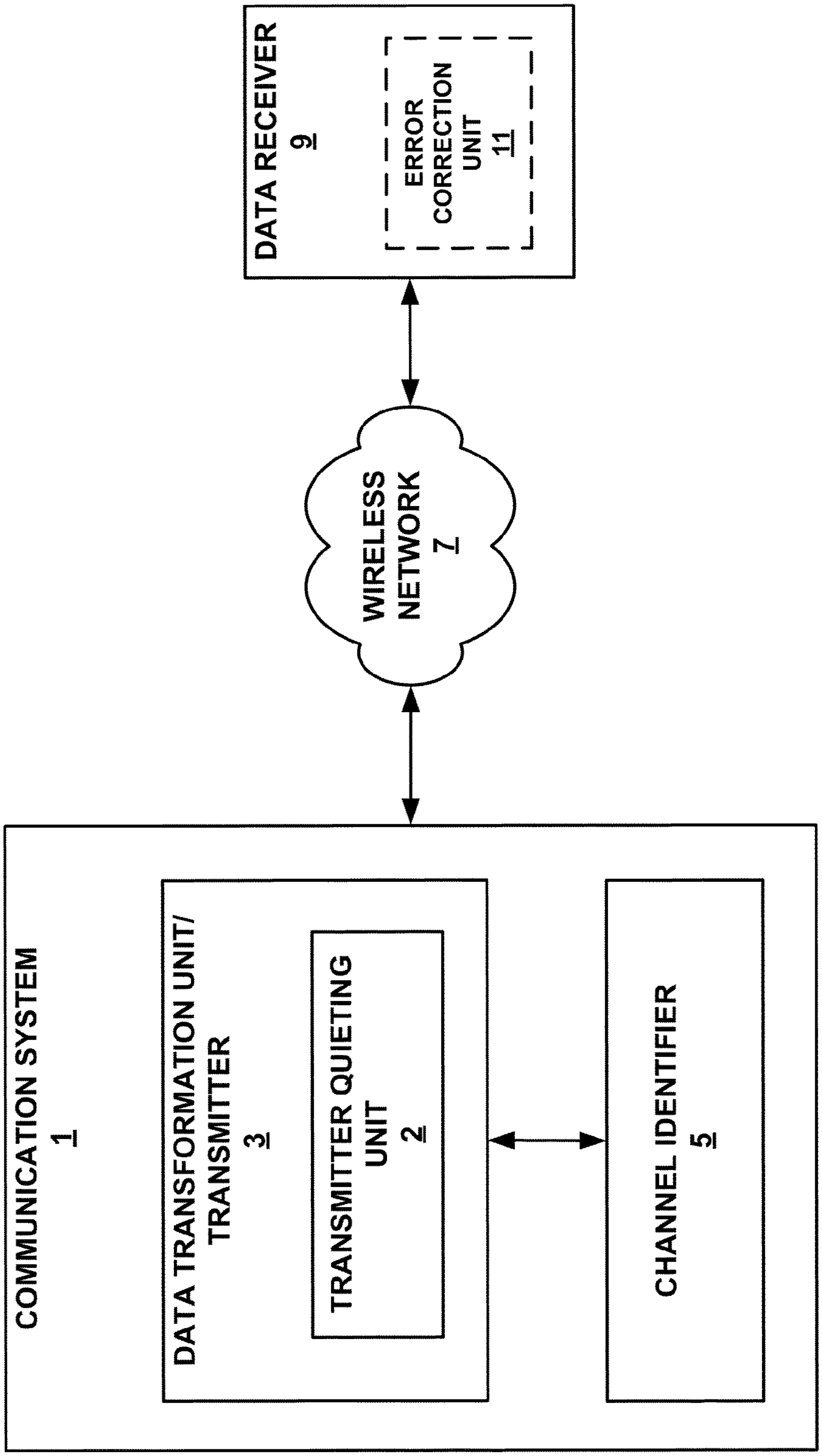
FIG. 1 is a block diagram illustrating an example of a communication system being communicatively coupled to a data receiver via a wireless network.

FIG. 1 is a block diagram illustrating an example of a communication system 1 that is communicatively coupled to a data receiver 9 via a wireless network 7. Communication system 1 is capable of sending data to data receiver 9. In some cases, the data may comprise multimedia data including at least one of audio data, video data, text data, speech data, and graphics data. In the example of FIG. 1, although communication system 1 is shown as only sending data to one data receiver 9 via wireless network 7, communication system 1 may also, in some cases, be capable of sending or broadcasting data to one or more data receivers, including data receiver 9, via wireless network 7.

In some instances, wireless network 7 may comprise a network providing support for communications across a spectrum for a digital broadcast format, such as an Advanced Television Systems Committee (ATSC) format, a Digital Video Broadcasting (DVB) format, a Terrestrial Digital Multimedia Broadcasting (T-DMB) format, an Integrated Services Digital Broadcasting Terrestrial (ISDB-T) format, or a Moving Picture Experts Group Transport Stream (MPEG-TS) format, provided by International Standard ISO/IEC 13818-1, to name only a few, as will be described in more detail below. ATSC standards are a set of standards developed by the Advanced Television Systems Committee for digital television transmission. DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). DMB is a digital radio transmission technology for sending multimedia data to mobile devices. ISDB is a Japanese standard for digital television and digital radio. Other wireless standards that may benefit from the teaching of this disclosure include mobile broadcast standards such as Advanced Television Systems Committee-Mobile/Handheld (ATSC M/H), FO EV, Digital Multimedia Broadcast-handheld (DVB-H), Digital Multimedia Broadcast-satellite services to handheld DVB-SH, and next generation mobile broadcast standards. In addition, NTSC standards and next generation National Television System Committee NTSC standards may benefit from the teaching of this disclosure. Also, standards such as third generation (3G) standards, third-generation multimedia broadcast multicast service (3G MBMS), Broadcast and Multicast Services (BCMCS), long term evolution broadcast (LTE (broadcast)), or numerous other standards may benefit as well. With these and other standards, the blanking techniques of this disclosure may be used during sensing as well as for other reasons.

A digital broadcast format may be a broadcast format in which no specific or particular destination is provided in or specified by the transmitted data. For example, a digital broadcast format may comprise a format in which the header of a broadcasted data packet or unit does not include any destination address.

Communication system 1 may comprise a fixed system of one or more devices, which transmits or receives data at a specified location, or a mobile system of one or more devices. Each device may comprise one or more processors. Communication system 1 may comprise one or more stand-alone devices or may be part of a larger system. For example, communication system 1 may comprise, or be part of, a wireless communication device (e.g., wireless mobile handset or device), a digital camera, digital television (TV), a video camera, a video telephone, a digital multimedia player, a personal digital assistant (PDA), a video game console, a personal computer or laptop device, or other video device.

In certain examples, communication system 1 may be used for video game or gaming applications. In these examples, one or more users of communication system 1 may play one or more games, including any interactive games with other users via a network connection (e.g., wireless network connection) to communication system 1. Graphics and/or video data for the games, including real-time information, may be provided to data receivers 9, which may then be displayed on a separate display device coupled to data receivers 9 (e.g., a high-definition television or display device). In this fashion, a user may view the display data for a game application on this separate display device.

Communication system 1 may also comprise one or more peripheral devices (e.g., keyboards), including peripheral devices that communicate wirelessly with other devices. In some cases, communication system 1 may include components that are included within one or more integrated circuits, chips, or chip sets, which may be used in some or all of the devices described above.

As shown in FIG. 1, communication system 1 may include a data transformation unit/transmitter 3, which is coupled to a channel identifier 5. Data transformation unit/transmitter 3 and channel identifier 5 may be physically included, or part of, one or more devices. For example, in some cases, one or both of data transformation unit/transmitter 3 and channel identifier 5 could be included within a peripheral device that is coupled to a separate device. Thus, data transformation unit/transmitter 3 and channel identifier 5 may be part of one or more devices within communication system 1.

Communication system 1 is capable of receiving, processing, generating, and transmitting data. For example, communication system 1 may receive data over any of many possible radio or wireless access networks, including cellular, local wireless, or broadcast networks, including for example, ATSC, DVB, ISDB-T, or T-DMB. In some instances, communication system 1 may receive data over a wired interface or via one or more embedded interfaces. The data may also comprise data in an uncompressed format, such as data received via image/video sensors for camera or other camcorder applications. In some examples, the data may include one or more of audio data, video data, image data, graphics data, text data, speech data, or metadata.

Communication system 1 is further capable of broadcasting or otherwise transmitting data to one or more other devices, such as data receiver 9, through wireless network 7. Data transformation unit/transmitter 3 is capable of transforming data into a particular digital broadcast format. For example, data transformation unit/transmitter 3 may be capable of encoding data that complies with a particular digital broadcast format (e.g., ATSC, DVB, ISDB-T, T-DMB, MPEG-TS), modulating and then transmitting the encoded data.

Channel identifier 5 is able to identify at least one available channel of a spectrum, where one or more devices of communication system 1 may be involved in the identification of the at least one available channel. For example, the identification of the at least one available channel may be initiated by one or more devices of communication system 1. In some instances, channel identifier 5 may identify the at least one available channel in an unused and/or unlicensed portion of a broadcast spectrum, such as a digital television broadcast spectrum.

In some instances, the at least one available channel may comprise television band white space. As specified in the "Second Report and Order and Memorandum Opinion and Order" adopted by the Federal Communications Commission (FCC) on Nov. 4, 2008, and released on Nov. 14, 2008 as FCC Order 08-260, "white space" governed by the United States may comprise unused portions or locations of a broadcast television spectrum that are not currently being used by licensed services, and which therefore may be used by unlicensed radio transmitters. Similar types of white space may exist in other countries, regions, or jurisdictions outside the United States, subject to communication regulatory authorities that may exist in such areas.

In some instances, an available channel may comprise a channel that is currently unoccupied. In one example, an available channel may comprise a channel that is not currently being used by any authorized or licensed users, e.g., users licensed by the FCC. In one example, an available channel may comprise a channel that is not currently being used either by licensed users or by unlicensed users, e.g., other white space channel users. In some cases, an available channel may comprise a channel that may be used by a user upon acquiring a secondary license from another licensed user.

Channel identifier 8 may identify one or more available channels that may be needed for data broadcast based upon any specific requirements or needs of applications or services that are executed on, or implemented by, one or more devices of communication system 1. Upon identification of the one or more available channels, transformation unit/transmitter 3 may transmit data (e.g., encoded, modulated, or otherwise transformed data) to data receiver 9 via wireless network 7, using the at least one identified available channel. In certain cases, communication system 1 will perform one or more of the above-described actions (e.g., channel identification and data transmission), either automatically or in response to user input, based upon the execution of one or more services or applications locally running within communication system 1. Data receiver 9 may include functionality for demodulating and/or decoding the received broadcast data from communication system 1. In some cases, transformation unit/transmitter 3 may broadcast the data, via wireless network 7, to multiple data receivers, including data receiver 9, using the at least one identified available channel.

As described above, channel identifier 5 is able to identify at least one available channel of a broadcast spectrum for the particular digital broadcast format. In one example, channel identifier 5 may include a spectrum sensor that is used to identify the at least one available channel by sensing signal information within one or more channel ranges, or bands, within the broadcast spectrum. In one example, channel identifier 5 may access a database (e.g., a digital TV bands database, such as the one shown in FIG. 6) to identify the at least one available channel.

As shown in FIG. 1, data transformation unit/transmitter 3 includes a transmitter quieting unit 2. If channel identifier 5 includes spectrum sensing functionality, transmitter quieting unit 2 may provide transmission quieting intervals. Quieting may alternately be referred to as blanking in this disclosure. In particular, the phrase "blanking (or quieting) the transmitter" generally refers to a process in which the transmitter refrains from transmitting data for a period time, although the period of time may vary widely in different implementations. During transmission quieting intervals (i.e., transmitter blanking), data transformation unit/transmitter 3 refrains from transmitting data to data receiver 9 via wireless network 7. For example, data transformation unit/transmitter 3 may refrain from transmitting data by temporarily disabling or even temporarily turning off its data transmission functions. In one example, channel identifier 5 may detect, during at least one time interval, whether at least one channel of a spectrum, (e.g., white space channel), is available for use. During this at least one time interval, transmitter quieting unit 2 may refrain from transmitting any data to data receiver 9, which may reduce potential interference between data transmission and spectrum sensing operations. However, in addition to the sensing of white space for available channels, this disclosure also contemplates transmitter blanking for other sensing reasons, or other reasons unrelated to sensing. Accordingly, transmitter blanking is not limited to use during white space sensing and may have broad applicability to other sensing applications or other non-sensing applications.

For white space sensing, even after a channel is selected, periodic spectrum sensing may be required in order to verify that usage of the channel does not interfere with usage by other licensed or authorized users. The interval at which sensing must be performed may be specified by applicable rules or regulations. In some cases, the spectrum sensing may be required at least once per minute. Transmitter quieting during spectrum sensing may be desirable because sensing may need to be performed at very low power levels, e.g., to permit detection of lower power signals generated by users of the spectrum, such as licensed users or other authorized users. The FCC order identified above, or other applicable rules or regulations, may require spectrum sensing at specified intervals and at specified power levels to prevent interference with licensed or authorized users of channels in the spectrum. Such spectrum sensing may involve sensing whether other licensed or authorized users are transmitting signals on a given channel or frequency. The lower power signals may be generated by low power transmitters at nearby locations. Alternatively, the lower power signals may be generated by higher power transmitters at remote or nearby locations. However, the signals generated by the higher power transmitters may attenuate over extended distances or suffer fading. In either case, if a transmitter is enabled during spectrum sensing, transmit power may leak into the spectrum sensing circuitry, creating noise or interference that makes sensing of lower power signals in a spectrum, such as a white space spectrum, more difficult.

In some situations, channel identifier 5 may need to periodically detect for channel usage in one or more channels within a spectrum, or determine whether any channels that were previously available for use are no longer available (e.g., when a licensed user begins using a particular channel). Channel identifier 5 may implement a particular duty cycle for spectrum sensing when performing such detection and/or determination functions. As will be described in much greater detail below, channel identifier 5 may utilize or implement various different duty cycles for spectrum sensing, as well as various different spectrum sensing intervals. Similarly, transmitter quieting unit 5 may utilize or implement various different duty cycles for transmission quieting, as well as different quieting intervals.

Because transmission quieting may potentially result in errors and/or discontinuities in the data received by data receiver 9, communication system 1 and/or data receiver 9 may include certain functionality to mitigate such errors or discontinuities, such as through implementation of error recovery, error resilience, or even modification of the data transported by communication system 1. The transmitted data may, in some instances, comprise digital data that can be arranged in packets, frames or other units, and may include encoded data and other data that is used for decoding, data reassembly, or error correction. In some cases, transmitter quieting unit 2 may utilize or select transmission quieting intervals and/or duty cycles, with respect to data transmission, which match the spectrum sensing intervals and/or duty cycles in order to allow data receiver 9 to perform error recovery on the received data.

In this particular example, data receiver 9 may optionally include an error correction unit 11, which may be configured to perform standard error recovery or correction during the decoding process. Error correction unit 11, however, may be optional in some examples. Error correction unit 11 may process one or more error correction codes that have been inserted into the data by data transformation unit/transmitter 3 in order to perform error checking and/or correction. In some examples, error correction unit 11 may perform one or more conventional error correction techniques that are known in the art.

As noted above, channel identifier 5 and transmitter quieting unit 2 may utilize substantially similar duty cycles to correlate the spectrum sensing intervals with the transmission quieting intervals. In these situations, communication system 1 may align the sensing intervals with the quieting intervals, such that when channel identifier 5 is performing spectrum sensing functions (e.g., during spectrum sensing intervals), transmitter quieting unit 2 refrains from transmitting data to data receiver 9 (e.g., during transmission quieting intervals).

Furthermore, in some examples, data transformation unit/transmitter 3 may construct or adapt data transmission streams such that defined data is included within certain portions of the stream based upon the transmission quieting intervals. For example, the data stream may be constructed to include certain null data, padded data, redundant data, or other miscellaneous data that may not actually be transmitted to data receiver 9 based upon the timing of the transmission quieting intervals. In such fashion, data transformation unit/transmitter 3 may intelligently construct the transmitted data streams such that data not transmitted during the quieting intervals comprises miscellaneous (e.g., non-essential or null) data that is not necessarily needed by data receiver 9 upon receipt of the data transmission via wireless network 7. Such functionality may help minimize the impact of transmission quieting, where such quieting may be performed to avoid potential interference between data transmission and spectrum sensing operations. These concepts will be described in much further detail below.

Figure 2:
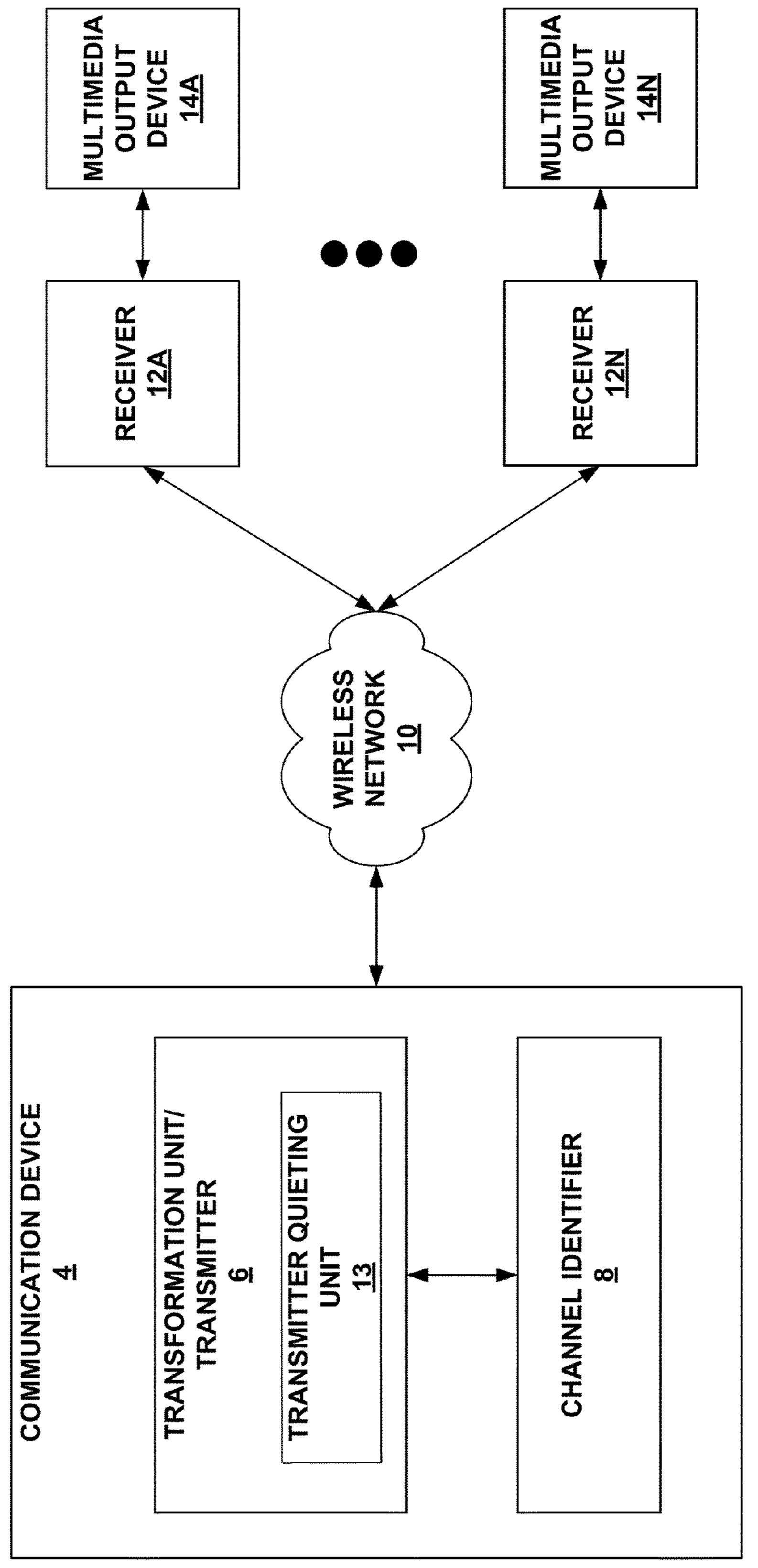
FIG. 2 is a block diagram illustrating an example of a communication device being communicatively coupled to one or more multimedia receivers and one or more multimedia output devices via a wireless network.

FIG. 2 is a block diagram illustrating an example of a communication device 4, which includes a channel identifier 8 and transformation unit/transmitter 6, being communicatively coupled to one or more communication receivers 12A-12N and one or more multimedia output devices 14A-14N via a wireless network 10. Communication device 4 is capable of sending data (e.g., multimedia data) to one or more of receivers 12A-12N. In some cases, the data may comprise multimedia data including at least one of audio data, video data, image data, text data, speech data, and graphics data. In some examples, wireless network 10 may comprise a network that provides support for data transmission that is compliant with the ATSC standard.

In the particular example of FIG. 2, transformation unit/transmitter 6 and channel identifier 8 are included within one particular device, namely communication device 4. As described previously, however, with respect to FIG. 1, transformation units/transmitters and channel identifiers in general may be included within one or more devices, including one or more peripheral devices, within a communication system.

Similar to wireless network 7 of FIG. 1, wireless network 10 may comprise a network providing support for communications across a broadcast spectrum for a digital broadcast format, such as ATSC, DVB, T-DMB, ISDB-T, or MPEG-TS, to name only a few. Communication device 4 may comprise a fixed device, which transmits or receives data at a specified location, or a mobile device. Communication device 4 may comprise a stand-alone device or may be part of a larger system. For example, communication device 4 may comprise, or be part of, a wireless multimedia communication device (such as a wireless mobile handset), a digital camera, digital TV, a video camera, a video telephone, a digital multimedia player, a personal digital assistant (PDA), a video game console, a personal computer or laptop device, or other video device. Communication device 4 may also be included within one or more integrated circuits, or chips/chip sets, which may be used in some or all of the devices described above.

As shown in FIG. 2, communication device 4 includes transformation unit/transmitter 6, which is coupled to channel identifier 8. For purposes of illustration only in FIG. 2, it will be assumed that these components 6, 8 are part of communication device 4.

Communication device 4 is capable of receiving, processing, and generating data, including multimedia data. For example, communication device 4 may receive data over any of many possible radio or access networks, including cellular, local wireless, or broadcast format, including ATSC, DVB, ISDB-T, or T-DMB.

Communication device 4 is further capable of broadcasting data to one or more other devices, such as multimedia output devices 14A-14N, through wireless network 10. Transformation unit/transmitter 6 is capable of transforming data into a particular digital broadcast format. For example, digital transformation unit/transmitter 6 may be capable of encoding multimedia data that complies with a particular digital broadcast format (e.g., ATSC, DVB, ISDB-T, T-DMB, MPEG-TS), and modulating the encoded multimedia data.

Channel identifier 8 is able to identify at least one available channel of a spectrum, where the identification is initiated by communication device 4. In some cases, channel identifier 8 may identify multiple available channels that may be needed for transmission based upon any specific requirements or needs of applications or services that are executed on communication device 4. For example, some applications or services may require or request multiple channels over which data may be sent to one or more receivers.

Upon identification of the one or more available channels by channel identifier 8, transformation unit/transmitter 6 may transmit the transformed (e.g., encoded, modulated) data to one or more of multimedia output devices 14A-14N, via wireless network 10, using the at least one identified available channel. In certain cases, communication device 4 will perform one or more of the above-described actions, either automatically or via user input, based upon the execution of one or more services, or applications, locally running on communication device 4.

In one example, an application may determine to broadcast specified multimedia content solely to multimedia output device 14A via wireless network 10. Receiver 12A may receive the broadcast data, and may include a tuner that tunes receiver 12A to the appropriate channel through which data is being broadcast from communication device 4. Receiver 12A then provides the received data to multimedia output device 14A for processing (e.g., for display).

In another example, an application may determine to broadcast specified multimedia content to multiple ones of multimedia output devices 14A-14N. In this case, receivers 12A-12N may each receive the broadcasted data, and may each include a tuner that tunes in to the appropriate channel (e.g., frequency or frequency band) through which data is being broadcast from communication device 4. Each receiver 12A-12N then provides the received data to its corresponding multimedia output device 14A-14N for processing.

In some cases, receivers 12A-12N may include functionality for demodulating and/or decoding the received broadcast data from communication device 4. In some cases, multimedia output devices 14A-14N may include such functionality. One or more of multimedia output devices 14A-14N may each comprise an external device with respect its corresponding receiver 12A-12N. In some instances, one or more of multimedia output devices 14A-14N may each be part of, or integrated within, its corresponding receiver 12A-12N.

As described above, channel identifier 8 is able to identify at least one available channel of a broadcast spectrum for the particular digital broadcast format. In one example, channel identifier 8 may include a spectrum sensor that is used to identify the at least one available channel by sensing signal information within one or more channel ranges, or bands, within the broadcast spectrum. In one example, channel identifier 8 may access a database (e.g., a digital TV bands database, such as the one shown in FIG. 6) to identify the at least one available channel.

For instance, communication device 4 may include geo-location functionality, whereby communication device 4 is capable of determining its geographic location, e.g., by using a Global Positioning System (GPS) or other similar component, pilot signal or other location techniques. In this instance, communication device 4 may provide such location information to a digital TV bands database. The digital TV bands database may be populated with channel information based upon location, and may be able to provide communication device 4 with a list of any available channels within the geographic region currently occupied by communication device 4.

In some examples, communication device 4 may be capable of determining its geographic location via location estimation using an Internet Protocol (IP) address of communication device 4. Geo-location by IP address is a technique of determining a geographic latitude, longitude, and also potentially city and state of communication device 4 by comparing public IP address of communication device 4 with IP addresses of other electronically neighboring servers, routers, or other devices having known locations. In these examples, communication device 4 may provide its IP address to an external server (e.g., via wireless communication).

The external server may access a database containing IP addresses of other devices having known locations. The external server may use techniques to obtain an estimate of the location of communication device 4 by comparing the IP address of communication device 4 to the IP addresses of the devices having known locations within the database, and may then provide this estimated location back to communication device 4. The external server may, in some cases, perform the comparison by determining which devices within the database have IP addresses that most closely match or resemble the IP address of communication device 4.

The broadcast of data from communication device 4 to one or more of multimedia output devices 14A-14N may provide certain advantages. For example, local broadcasts from communication device 4 to multimedia output devices 14A-14N can be created similar to a distributed transmitter network. Thus, in one scenario, a user may utilize communication device 4 to broadcast multimedia data to other collocated or non-collated multimedia output devices 14A-14N. For instance, a user may set up a wireless network in the user's home to couple communication device 4 to other devices. Communication device 4 may comprise, in one example, a personal, laptop or tablet computer, or a handheld portable computing device such as a personal digital media player, mobile telephone handset, or the like.

The user may wish to transmit multimedia data (e.g., a personal presentation, a television show or movie, web content, streaming video, digital photographs, or the like), as processed by communication device 4, to one or more output devices 14A-14N. If one of output devices 14A-14N comprises a display and one of receivers 12A-12N comprises a television tuner coupled to the display, where such tuner and display comprise a television, for instance, communication device 4 may identify one or more available channels to broadcast such multimedia data to the television, providing a convenient way to extend content from a computer to a television (e.g., large screen and/or high-definition television) without the need for using any wires or other physical connections. A display device may, in various examples, comprise a flat panel Liquid Crystal Display (LCD), a flat panel plasma display, a projection display device, a projector device, or the like. Though shown as separate devices in FIG. 2, any of receivers 12A-12N may be included within, or part of, corresponding output devices 14A-14N.

Data transformation unit/transmitter 6 includes a transmitter quieting unit 13, which may operate similarly to transmitter quieting unit 2 shown in FIG. 1. If channel identifier 8 includes spectrum sensing functionality, transmitter quieting unit 13 may provide transmission quieting intervals during which time data transformation unit/transmitter 6 refrains from transmitting data via wireless network 10, such as by temporarily disabling or even turning off the data transmission functions of data transformation unit/transmitter 6. In one example, channel identifier 8 may detect, during at least one time interval, whether at least one channel of a spectrum is available for use. During this at least one time interval, transmitter quieting unit 13 may refrain from transmitting any data, as will be described in further detail below.

Figure 3:
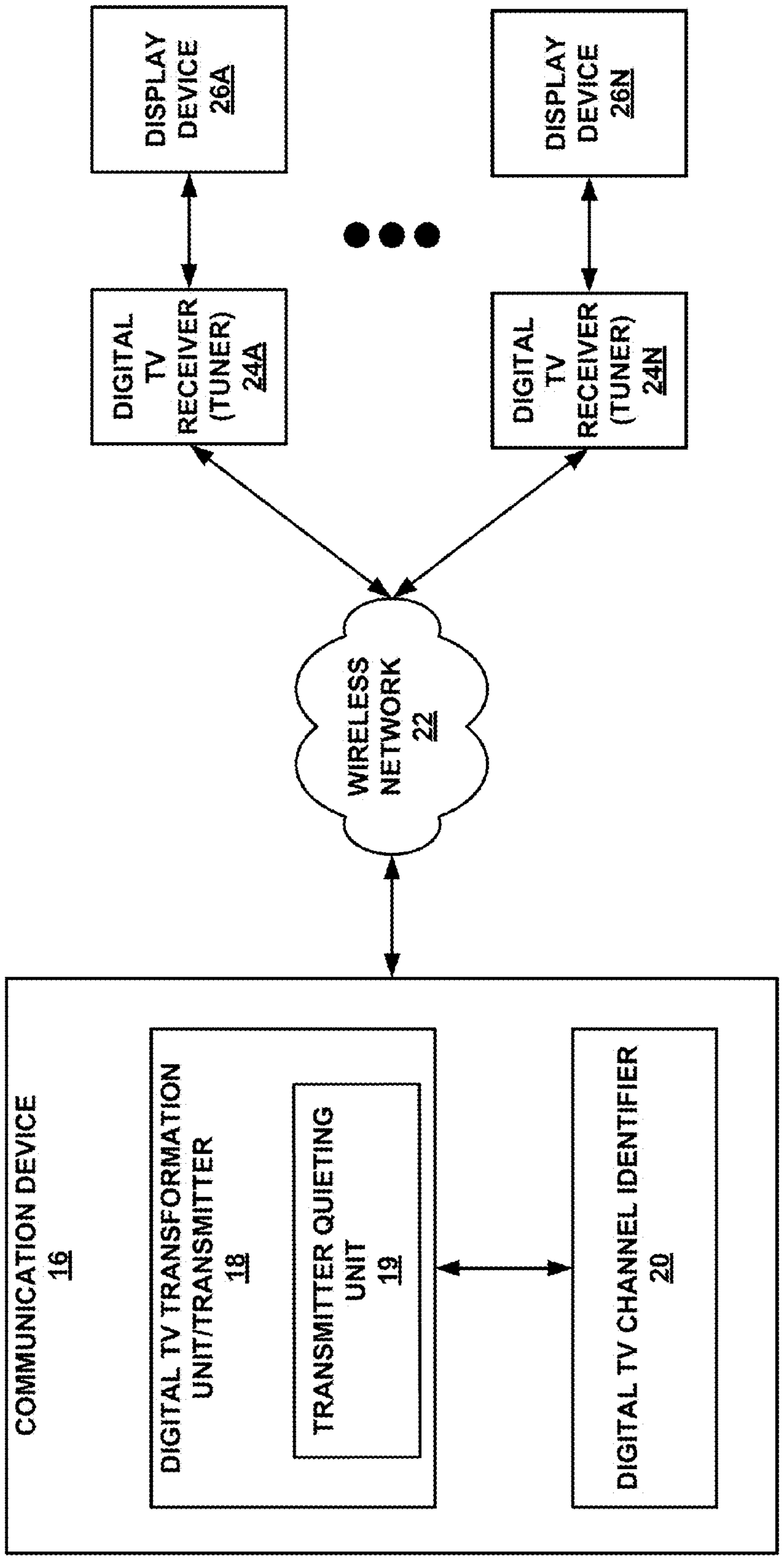
FIG. 3 is a block diagram illustrating an example of a communication device being communicatively coupled to one or more digital television (TV) receivers and one or more display devices via a wireless network.

FIG. 3 is a block diagram illustrating an example of a communication device 16, which may include a digital TV channel identifier 20 and digital TV transformation unit/transmitter 18, being communicatively coupled to one or more digital TV receivers 24A-24N and one or more display devices 26A-26N via a wireless network 22. In FIG. 3, digital TV channel identifier 20 of communication device 16 is one example of a channel identifier, such as channel identifier 8 of communication device 4 shown in FIG. 2. Display devices 26A-26N are examples of multimedia output devices, such as multimedia output devices 14A-14N shown in FIG. 2.

In FIG. 3, digital TV transformation unit/transmitter 18 and digital TV channel identifier 20 are shown to be included within the same communication device 16. However, in some alternate examples, these components 18, 20 may be included within a communication system that includes one or more separate devices, including one or more peripheral devices.

Communication device 16 is capable of receiving, processing, and generating multimedia data. Communication device 16 is further capable of broadcasting multimedia data to one or more other devices, such as display devices 26A-26N, through wireless network 22. Digital TV transformation unit/transmitter 6 is capable of transforming multimedia data into a digital broadcast format, e.g., encoding multimedia data that complies with a particular digital broadcast TV format, such as ATSC, and modulating the encoded multimedia data.

Digital TV channel identifier 20 is able to identify at least one available TV channel in an unused portion of a broadcast TV spectrum for the particular digital broadcast TV format, where such identification is initiated by communication device 16. In some cases, digital TV channel identifier 20 may identify multiple available channels that may be needed for multimedia broadcast based upon any specific requirements or needs of applications or services that are executed on communication device 16.

Upon identification of the one or more available channels, transformation unit/transmitter 18 may transmit the transformed data (e.g., encoded, modulated multimedia data) to one or more of display devices 26A-26N, via wireless network 22, using the at least one identified available channel. In some cases, communication device 16 will initiate one or more of the above-described operations, either automatically or via user input, based upon the execution of one or more services, or applications, locally running on communication device 16. The content transmitted by transformation unit/transmitter 18 may include a wide variety of multimedia content, including but not limited to audio content, video content and combinations of audio and video content.

Digital TV transformation unit/transmitter 18 also includes a transmitter quieting unit 19. If channel identifier 20 includes spectrum sensing functionality, transmitter quieting unit 19 may provide transmission quieting intervals during which time transformation unit/transmitter 18 refrains from transmitting data via wireless network 22, such as by temporarily disabling or even turning off the data transmission functions of data transformation unit/transmitter 18. In one example, channel identifier 20 may detect, during at least one time interval, whether at least one channel of a spectrum is available for use. During this at least one time interval, transmitter quieting unit 19 may refrain from transmitting any data, as will be described in further detail below.

Figure 4:
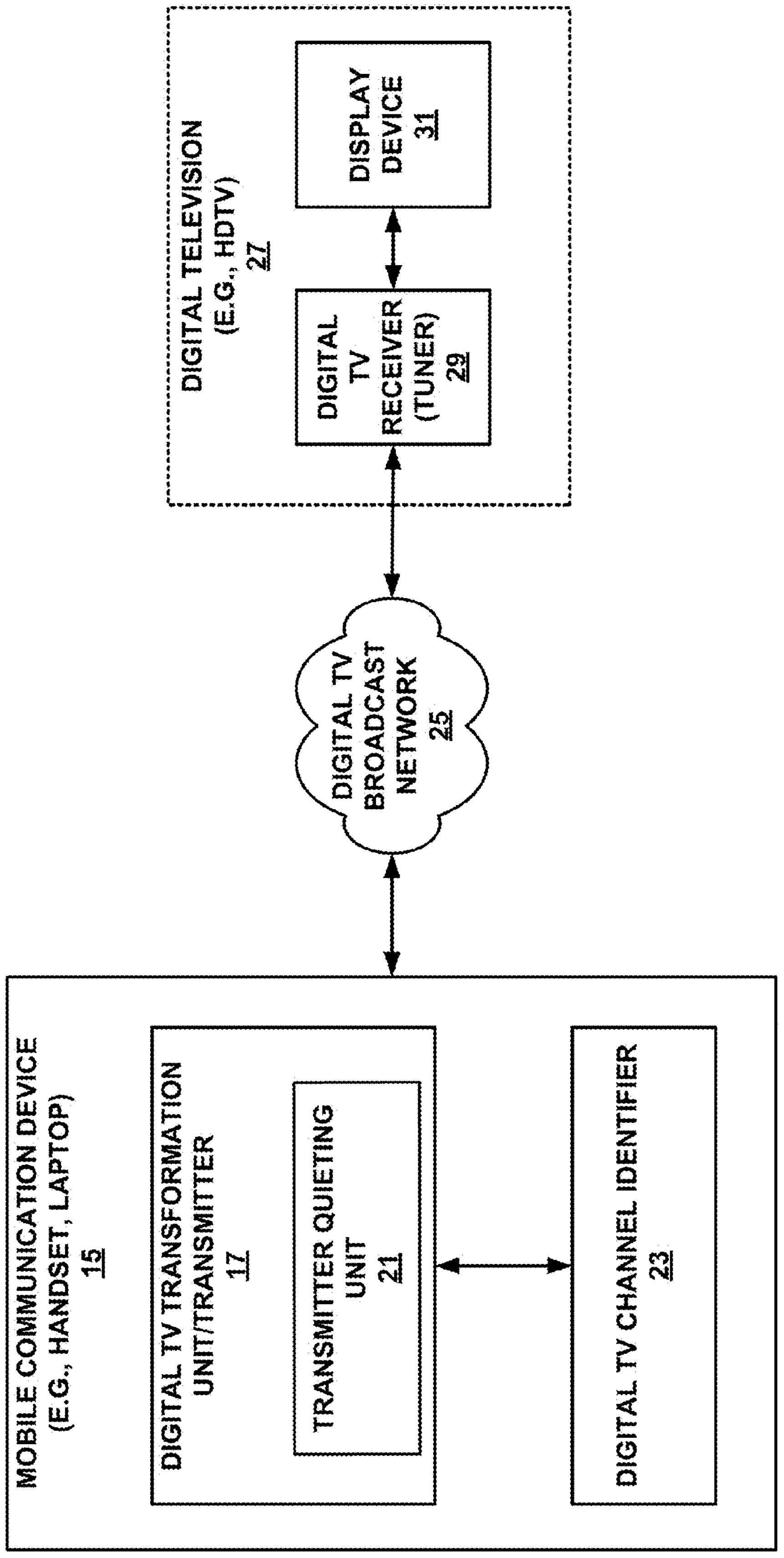
FIG. 4 is a block diagram illustration an example of a mobile communication device being communicatively coupled to a digital TV receiver and a display device, which may be included within a digital TV.

FIG. 4 is a block diagram illustration an example of a mobile communication device 15 (e.g., a mobile handset, a laptop computer) being communicatively coupled to a digital TV receiver 29 and a display device 31, which may be included within a digital TV 27 (e.g., a high-definition television). Mobile communication device 15 may comprise any form of mobile device, such as a mobile communication handset, a personal computer or laptop computer, a digital multimedia player, a personal digital assistant (PDA), a video game console, or other video device.

In FIG. 4, digital TV transformation unit/transmitter 17 and digital TV channel identifier 23 are shown to be included within the same mobile communication device 15. However, in some alternate examples, these components 17, 23 may be included within a communication system that includes one or more separate devices, including one or more peripheral devices.

Mobile communication device 15 is capable of receiving, processing, and generating multimedia data. Mobile communication device 15 is further capable of broadcasting multimedia data to digital TV 27 through digital TV broadcast network 25. Digital TV transformation unit/transmitter 17 is capable of transforming multimedia data into a digital broadcast format, e.g., encoding multimedia data that complies with a particular digital broadcast TV format, such as ATSC, and modulating the encoded multimedia data.

Digital TV channel identifier 23 is able to identify at least one available TV channel in an unused portion of a broadcast TV spectrum for the particular digital broadcast TV format, where such identification is initiated by mobile communication device 15. In some cases, digital TV channel identifier 23 may identify multiple available channels that may be needed for multimedia broadcast based upon any specific requirements or needs of applications or services that are executed on mobile communication device 15.

Upon identification of the one or more available channels, transformation unit/transmitter 17 may transmit the transformed data (e.g., encoded, modulated multimedia data) to digital TV receiver 29, via broadcast network 25, using the at least one identified available channel. In some cases, mobile communication device 15 will initiate one or more of the above-described operations, either automatically or via user input, based upon the execution of one or more services, or applications, locally running on mobile communication device 15. In some cases, digital TV receiver 29 may be included within digital TV 27.

Digital TV transformation unit/transmitter 17 also includes a transmitter quieting unit 21. If channel identifier 23 includes spectrum sensing functionality, transmitter quieting unit 21 may provide transmission quieting intervals during which time transformation unit/transmitter 17 refrains from transmitting data via broadcast network 25, such as by temporarily disabling or even turning off the data transmission functions of data transformation unit/transmitter 17. In one example, channel identifier 23 may detect, during at least one time interval, whether at least one channel of a spectrum is available for use. During this at least one time interval, transmitter quieting unit 21 may refrain from transmitting any data, as will be described in further detail below.

As shown in FIG. 4, mobile communication device 15 may identify one or more available channels to broadcast multimedia data from mobile communication device 15 to digital television 27, providing a convenient way to extend content from a mobile device to a television (e.g., large screen and/or high-definition television) without the need for using any wires or other physical connections. Display device 31 may, in various examples, comprise a flat panel Liquid Crystal Display (LCD), a flat panel plasma display, a projection display device, a projector device, or the like.

Figure 5:
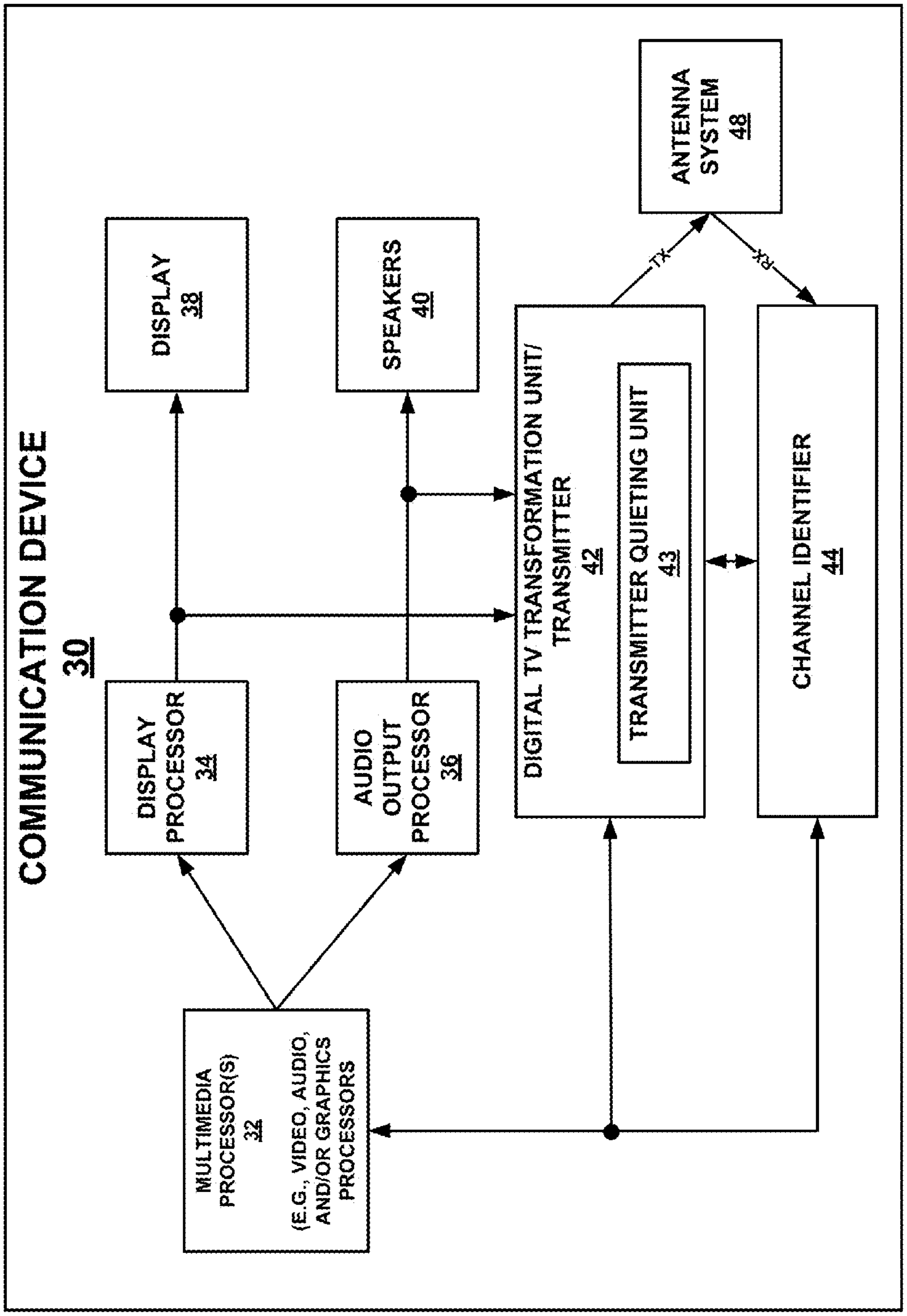
FIG. 5 is a block diagram illustrating an example of a communication device that may be used as the communication device shown in FIG. 2 and/or FIG. 3.

FIG. 5 is a block diagram illustrating an example of a communication device 30 that may be used as the communication device 4 shown in FIG. 2 and/or the communication device 16 shown in FIG. 3. Communication device 30 may, in some examples, comprise a mobile device, such as a wireless communication device or handset.

As shown in the example of FIG. 5, communication device 30 includes various components. For example, in this particular example, communication device 30 includes one or more multimedia processors 32, a display processor 34, an audio output processor 36, a display 38, speakers 40, a digital TV transformation unit/transmitter 42, and a channel identifier 44. Multimedia processors 32 may include one or more video processors, one or more audio processors, and one or more graphics processors. Each of the processors included within multimedia processors 32 may include one or more decoders.

Multimedia processors 32 are coupled to both display processor 34 and audio output processor 36. Video and/or graphics processors included within multimedia processors 32 may generate image and/or graphics data that is provided to display processor 34 for further processing and display on display 38. For example, display processor 34 may perform one or more operations on the image and/or graphics data, such as scaling, rotation, color conversion, cropping, or other rendering operations. Any audio processors included within multimedia processors 32 may generate audio data that is provided to audio output processor 36 for further processing and output to speakers 40. A user of communication device 30 is thus able to view and hear representations of the multimedia data via display 38 and speakers 40.

In addition to providing output multimedia data to display 38, display processor 34 may also provide its output to digital TV transformation unit/transmitter 42. Further, audio output processor 36 may provide its output to digital TV transformation unit/transmitter 42. As a result, digital TV transformation unit/transmitter 42 is capable of processing multiple streams of multimedia data. In some instances, display processor 34 and/or audio output processor 36 may store corresponding output multimedia data in one or more buffers, which are then accessed by digital TV transformation unit/transmitter 42 to retrieve the data. Digital TV transformation unit/transmitter 42 may include various components, as described in more detail below with reference to FIG. 6, for transforming multimedia data into a particular digital broadcast form (e.g., encoding, modulating the data), and transmitting the transformed data to another device via a wireless network in one or more identified available channels. Digital TV transformation unit/transmitter 42 may transmit data via antenna system 48, which may comprise one or more antennae.

In some cases, digital TV transformation unit/transmitter 42 may transform and/or encapsulate multiple received streams of multimedia data from display processor 34 and audio output processor 36 into individual single program transport streams that may be transmitted over multiple broadcast channels. In some cases, the multiple streams of multimedia data may be encapsulated in the same transport stream and transmitted in a single channel. One multimedia stream may be transmitted as a picture-in-picture (PIP) data path that includes supplemental multimedia information or metadata with respect to the multimedia data. Metadata may include, for example, one or more of text, notification messages, program guide information, or menu information. In certain cases, digital TV transformation unit/transmitter 42 may receive data directly from multimedia processors 32. In these cases, digital TV transformation unit/transmitter 42 may transform and/or encapsulate the data received directly from multimedia processors into transport streams that may be transmitted.

In order for communication device 30 to be able to broadcast or otherwise transmit multimedia data in one or more streams to a remote device via a wireless network, communication device 30 identifies one or more available channels in an unused portion of a spectrum upon initiation by communication device 30. Channel identifier 44 is capable of identifying these one or more available channels.

Channel identifier 44 may identify available channels in one or more ways. For example, channel identifier 44 may utilize a spectrum sensor, such as the spectrum sensor shown in FIG. 6 or FIG. 7, which is able to dynamically sense available channels in one or more frequency bands via antenna system 48. The spectrum sensor may be able to assign certain quality values with respect to the sensed signals (e.g., interference levels, signal-to-noise ratios) in order to determine the quality of any available channels within the spectrum for data transmission. The sensing algorithm may be carried out periodically and may be based on the format of a particular video stream being processed.

Channel identifier 44 may also utilize, either in conjunction with spectrum sensing or independently, geo-location functionality. Geo-location refers to the capability of communication device 30 to determine its geographic coordinates through the use of a geo-location sensor (such as the one shown in FIG. 6), which may comprise, in one example, a GPS sensor. Channel identifier 44 may query an external digital channel database (e.g., a digital TV bands database, such as the one shown in FIG. 6) to obtain a list of available channels via wireless communication. Typically, such an external database may be maintained by one or more external devices or sources, but may be updated based upon requests and data flow from various devices, such as communication device 30.

In one example, channel identifier 44 may send geo-location coordinates regarding the location of communication device 30 to the external digital channel database, such as via a network (e.g., wireless network) connection. Channel identifier 44 may then receive, from the external database, a list of available channels for a geographic region associated with the location of communication device 30, as indicated by the geo-location coordinates. Channel identifier 44 may then select one or more of the identified channels for use, and send data back to the external database regarding the intended use of these frequency channels by communication device 30. The external database may therefore be updated accordingly based upon the received data from communication device 30.

In some cases, the external database, once updated, may indicate that the selected channels are in use by communication device 30 until communication device 30 sends a subsequent message to the external database indicating that the channels are no longer needed or being used. In other cases, the external database may reserve the selected channels for device 30 only for a defined interval of time. In these cases, communication device 30 may need to send a message to the external database within the defined interval of time indicating that device 30 is still using the selected channels, in which case the external database will renew the reservation of the selected channels for a second interval of time for use by device 30.

In some instances, channel identifier 44 may select one or more of the available channels for use based upon the bandwidth demands or needs of any services or applications that are executing on communication device 30, as indicated by, for example, by one or more of multimedia processors 32 during execution. For example, a particular multimedia application may require multiple broadcast streams each having high bandwidth demands. In this situation, channel identifier 44 may allocate multiple different available channels for transmission to accommodate the bandwidth requirements for these multiple broadcast streams.

Channel identifier 44 may, in some cases, identify one or more available channels based upon information received from multiple sources. For example, if channel identifier 44 utilizes both a spectrum sensor and geo-location functionality, channel identifier 44 may need to process channel information from both of these sources when determining which channels may be available for use. Different channels may have different white space availability for use, depending on the geo-location. Channel identifier may store or download associations of channels and geo-locations so that different channels may be defined and searched depending on the geo-location of communication device 30 at any given time.

Upon identification of one or more available transmission channels by channel identifier 44, digital TV transformation unit/transmitter 42 may then broadcast or otherwise transmit the multimedia content or data to an external device via a network using the identified transmission channel(s). Communication device 30 may initiate the broadcast transmission directly with such an external device.

Digital TV transformation unit/transmitter 42 includes a transmitter quieting unit 43. If channel identifier 44 includes spectrum sensing functionality, transmitter quieting unit 43 may provide transmission quieting intervals during which time digital TV transformation unit/transmitter 42 refrains from transmitting data, such as by temporarily disabling or even turning off the data transmission functions of digital TV transformation unit/transmitter 42. In one example, channel identifier 44 may detect, during at least one time interval, whether at least one channel of a spectrum is available for use. During this at least one time interval, transmitter quieting unit 43 may refrain from transmitting any data.

Figure 6:
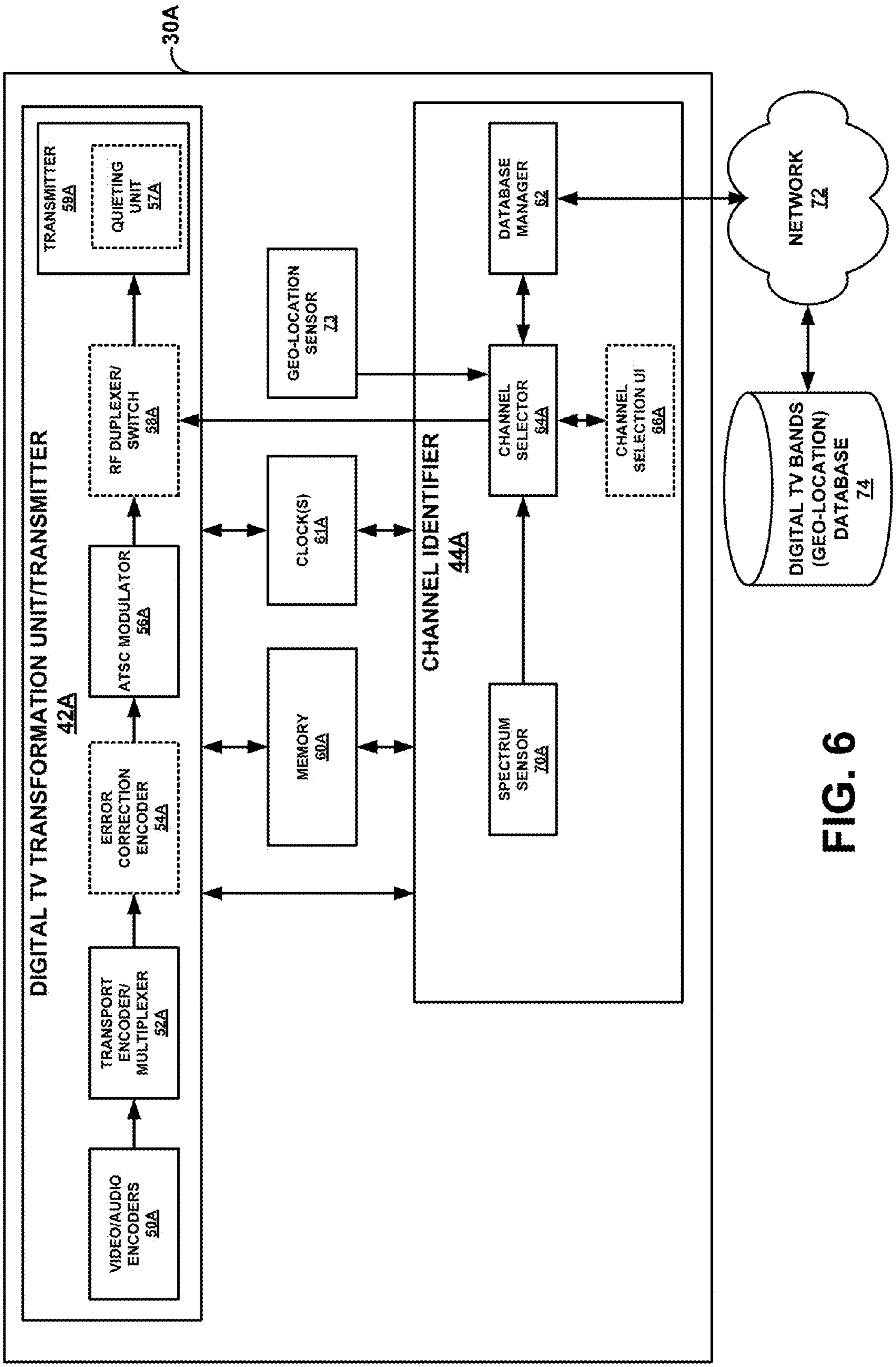
FIG. 6 is a block diagram illustrating an example of a digital TV transformation unit/transmitter, in conjunction with a channel identifier, which may be implemented within a communication device, such as the communication device shown in FIG. 5.

FIG. 6 is a block diagram illustrating an example of a digital TV transformation unit/transmitter 42A, in conjunction with a channel identifier 44A, which may be implemented within a communication device 30A. In FIG. 6, digital TV transformation unit/transmitter 42A may be one example of digital TV transformation unit/transmitter 42 shown in FIG. 5, while channel identifier 44A may be one example of channel identifier 44 shown in FIG. 5. In the particular example of FIG. 6, communication device 30A is capable of broadcasting multimedia data according to a specific digital broadcast format, ATSC. However, communication device 30A may be configured to broadcast according to other formats or standards. Accordingly, the description of ATSC is for purposes of illustration and should not be considered limiting.

Communication device 30A may facilitate low-power transmission to an ATSC-ready external device, such as a high-definition or flat-panel television. In this case, the ATSC-ready device may comprise one of the multimedia output devices 14A-14N shown in FIG. 2. The ATSC-ready device may, in some examples, include both a display device and a tuner/receiver. In these examples, the ATSC-ready device may comprise one of digital TV receivers 24A-24N and one of corresponding display devices 26A-26N.

As shown in FIG. 6, digital TV transformation unit/transmitter 42A may include various components, such as video and/or audio encoders 50A, transport encoder/multiplexer 52A, error correction encoder 54A, ATSC modulator 56A, radio frequency (RF) duplexer/switch 58A, and transmitter 59A. These components help support data transmission over a spectrum implementing the ATSC standard. The ATSC standard is a multi-layered standard that provides layers for video encoding, audio encoding, transport streams, and modulation. In one example, RF duplexer/switch 58A may comprise an ultrahigh frequency (UHF) duplexer/switch. A duplexer may allow for signals to be received for sensing purses and to be transmitted for communication purposes. Although ATSC modulator 56A is illustrated for exemplary purposes, other types of modulators according to other modulation standards could also be used.

Video/audio encoders 50A may include one or more video encoders and one or more audio encoders to encode video and/or audio data into one or more streams. For example, video/audio encoders 50A may include a Moving Picture Experts Group-2 (MPEG-2) encoder or a H.264 encoder (from the Telecommunication Standardization Sector, ITU-T) to encode video data. Video/audio encoders 50A may also include a Dolby Digital (Dolby AC-3) encoder to encoder audio data. An ATSC stream may contain one or more video programs and one or more audio programs. Any of the video encoders may implement a main profile for standard definition video or a high profile for high-definition resolution video.

Transport (e.g., MPEG-2 Transport Stream, or TS) encoder/multiplexer 52A receives the encoded data streams from video/audio encoders 50A and is capable of assembling these data streams for broadcast, such as into one or more packetized elementary streams (PESs). These PESs may then be packetized into individual program transport streams. Transport encoder/multiplexer 52A may optionally, in some instances, provide the output transport streams to an error correction encoder 54A (e.g., a Reed-Solomon encoder), which may perform error correction encoding functionality by adding one or more error correction codes associated with the transport streams. These error correction codes may be used by a data receiver (e.g., data receiver 9 containing error correction unit 11) for error correction or mitigation.

ATSC modulator 56A is capable of modulating the transport streams for broadcast. In some example cases, for instance, ATSC modulator 56A may utilize 8 vestigial side band (8VSB) modulation for broadcast transmission. RF duplexer/switch 58A may then duplex the transport streams, or act as a switch for the transport streams. Transmitter 59A is capable of broadcasting one or more transport streams to one or more external devices using one or more available channels that are identified by channel identifier 44A.

Channel identifier 44A includes a database manager 62, a channel selector 64A, an optional channel selection user interface (UI) 66A, and a spectrum sensor 70A. Both channel identifier 44A and digital TV transformation unit/transmitter 42A are coupled to a memory 60A, which may comprise one or more buffers. Channel identifier 44A and digital TV transformation unit/transmitter 42A may exchange information directly, or may also exchange information indirectly through the storage and retrieval of information via memory 60A.

Channel identifier 44A includes a spectrum sensor 70A. As discussed previously, a spectrum sensor, such as spectrum sensor 70A, is capable of sensing signals in one or more frequency bands within a broadcast spectrum for a particular digital TV format, such as ATSC. Spectrum sensor 70A may determine channel availability and signal strengths based upon its ability to identify any data that occupies one or more used channels within the spectrum. Spectrum sensor 70A may then provide information to channel selector 64A as to the channels that are currently unused, or available. For example, spectrum sensor 70A may detect that a particular channel is available if it does not detect any data being broadcast on this channel by any external, separate devices. In this case, spectrum sensor 70A may indicate to channel selector 64A that the channel is available, allowing channel selector 64A to select the channel for data transmission. Alternatively, if spectrum sensor 70A detects that data is being broadcast on this channel, then the spectrum sensor 70A may indicate to channel selector 64A that the channel is unavailable.

As shown in FIG. 6, channel selector 64A may also receive information from digital TV bands (geo-location) database via network 72 and database manager 62. Digital TV bands database 74 is located external to communication device 30A and includes information regarding channels that are currently in use or available within the broadcast spectrum for a particular digital TV format, such as ATSC. Typically, the digital TV bands database 74 is updated dynamically as channels are put into use or freed for use by other devices. In some instances, digital TV bands database 74 may be organized by geographic location/region or by frequency bands (e.g., low VHF, high VHF, UHF).

In order for channel identifier 44A to obtain channel availability information from digital TV bands database 74, channel identifier 44A may, in some cases, provide geo-location information as input into digital TV bands database 74. Channel identifier 44A may obtain geo-location information or coordinates from geo-location sensor 73, which may indicate the geographic location of communication device 30A at a particular point in time. Geo-location sensor 73 may, in some examples, comprise a GPS sensor.

Upon receipt of geo-location information from geo-location sensor 73, channel selector 64A may provide such information, as input, to digital TV bands database 74 via database manager 62. Database manager 62 may provide an interface to digital TV bands database 74. In some cases, database manager 62 may store a local copy of selected contents of digital TV bands database 74 as they are retrieved. In addition, database manager 62 may store select information provided by channel selector 64A to digital TV bands database 74, such as geo-location information.

Upon sending geo-location information pertinent to communication device 30A, channel selector 64A may receive from digital TV bands database 74 a set of one or more available channels as presented listed within digital TV bands database 74. The set of available channels may be those channels that are available in the geographic region or location presently occupied by communication device 30A, as indicated by geo-location sensor 73. Blanking of transmitter 59A may occur during spectrum sensing. As outlined in greater detail below, non-essential data may be encoded or inserted into the bitstream for a blanking interval so that data loss does not occur during transmitter blanking This non-essential data may be alternatively referred to as miscellaneous data, and may comprise redundant data or null data. The non-essential data may be encoded by video/audio encoders 50A, or inserted by any multiplexer downstream of video/audio encoders 50A. Different examples may provide different advantages. As explained in greater detail below, non-essential data may be inserted by a multiplexer associated with video/audio encoders (e.g., transport encoder/multiplexer 52A), or may be inserted by a multiplexer associated with ATSC modulator 56A (or other modulator for other modulation standards or techniques). Other multiplexers could also be used (or even specifically defined) for the insertion of non-essential data during a blanking interval. In some cases, it can be challenging to ensure that any inserted non-essential data properly aligns between two field synchronization markers (e.g., field syncs) of the modulated physical layer, i.e., to ensure that a demodulator and decoder that receive the data do not lose synchronization. Additional details of several example implementations for the insertion of non-essential data are discussed in greater detail below.

Upon receipt of available channel information from either or both of spectrum sensor 70A and digital TV bands database 74, channel selector 64A may select one or more available channels, either automatically or via user input via channel selection UI 66A. Channel selection UI 66A may present available channels within a graphical user interface, and a user of a service or application may select one or more of these available channels.

In some instances, channel selector 64A may automatically select or identify one or more of the available channels that are to be used for broadcast transmission by communication device 30A. For example, channel selector 64A may utilize information provided by one or more of multimedia processors 32 (FIG. 5) to determine which one or more of available channels to identify for broadcast transmission. In some cases, channel selector 64A may select multiple channels based upon the demands or needs of the services or applications that are executing. One or more transport streams associated with these services or applications may be broadcast across one or more of the identified channels by transmitter 59A.

In some cases, database 74, once updated, may indicate that the selected channels are in use by communication device 30A until communication device 30A sends a subsequent message to database 74 indicating that the channels are no longer needed or being used. In other cases, database 74 may reserve the selected channels for communication device 30A only for a defined interval of time. In these cases, communication device 30A may send a message to database 74 within the defined interval of time indicating that device 30A is still using the selected channels, in which case database 74 will renew the reservation of the selected channels for a second interval of time for use by communication device 30A.

One or more clocks 61A may be included within communication device 30A. As shown in FIG. 6, clocks 61A may be utilized by, or drive the operation of, digital TV transformation unit/transmitter 42A and channel identifier 44A. Clocks 61A may be configured or set by communication device 30A. In some cases, clocks 61A may be configured by or synchronized to a clock that is external to device 30A. For example, device 30A may receive clock or timing information from an external device (e.g., via geo-location sensor 73) and may configure or synchronize clocks 61A based upon the received information.

For example, in some scenarios, communication device 30A may implement clock functionality that is common with a receiving device (e.g., data receiver 9 of FIG. 1, for example). In these scenarios, both communication device 30A and the receiving device may receive clock or timing information from an external device and synchronize their own internal clocks based upon the received information. In such fashion, communication device 30A and the receiving device may effectively operate using a common clock.

Digital TV transformation unit/transmitter 42A and channel identifier 44A may also utilize clocks 61A to synchronize or align certain operations. For example, as will be described in further detail below, quieting unit 57A and spectrum sensor 70A may utilize a common clock (in clocks 61A) to synchronize or align transmission quieting operations with spectrum sensing operations, such that transmitter 59A refrains from transmitting data when spectrum sensor 70A is scanning one or more channels of a spectrum, in order to minimize interference issues.

As also shown in FIG. 6, transmitter 59A optionally includes a quieting unit 57A. Quieting unit 57A may provide transmission quieting intervals during which time digital TV transformation unit/transmitter 42A refrains from transmitting data, such as by temporarily disabling or even turning off transmitter 59A. In one example, channel identifier 44A may detect, during at least one time interval, whether at least one channel of a spectrum is available for use. During this at least one time interval, quieting unit 57A may cause transmitter 59A to refrain from transmitting any data.

In some examples, quieting unit 57A may be included, or part of, another functional block within digital TV transformation unit/transmitter 42A. For example, rather than being part of transmitter 59A, quieting unit 57A may be part of modulator 56A. In this example, quieting unit 57A may temporarily turn off or disable modulator 56A during the transmission quieting intervals. As will be described in further detail below, the transmission quieting intervals may, in many cases, occur with a static or dynamically defined frequency over time. The duration of the transmission quieting intervals may be the same or may change over time. In some examples, the frequency and duration of the transmission quieting intervals may be based upon the corresponding frequency and duration of the spectrum sensing intervals implemented by spectrum sensor 70A, as described further below.

Figure 7:
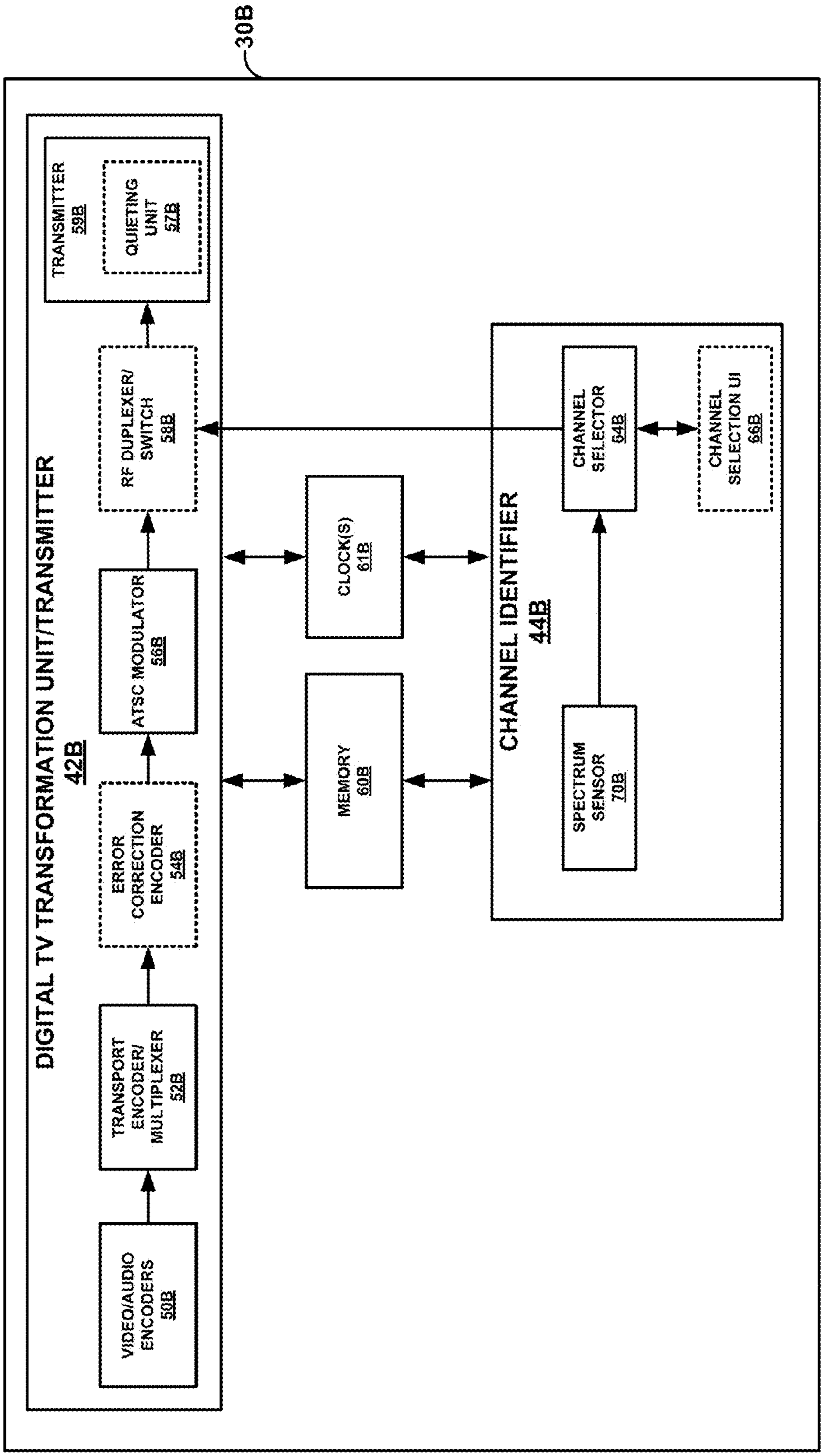
FIG. 7 is a block diagram illustrating another example of a digital TV transformation unit/transmitter, in conjunction with a channel identifier, which may be implemented within a communication device, such as the communication device shown in FIG. 5.

FIG. 7 is a block diagram illustrating another example of a digital TV transformation unit/transmitter 42B, in conjunction with a channel identifier 44B, which may be implemented within a communication device 30B. In FIG. 7, digital TV transformation unit/transmitter 42B may be one example of digital TV transformation unit/transmitter 42 shown in FIG. 5, while channel identifier 44B may be one example of channel identifier 44 shown in FIG. 5. Digital TV transformation unit/transmitter 42B and channel identifier 44B may each store and retrieve information from memory device 60B. Similar to digital TV transformation unit/transmitter 42A, digital TV transformation unit/transmitter 42B includes one or more video/audio encoders 50B, a transport encoder/multiplexer 52B, an error correction encoder 54B, an ATSC modulator 56B, an RF duplexer/switch 58B, and transmitter 59B, which optionally includes a quieting unit 57B. In some examples, quieting unit 57B may be part of modulator 56B. One or more clocks 61B may be utilized by both digital TV transformation unit/transmitter 42B and channel identifier 44B. Although ATSC modulator 56B is illustrated for exemplary purposes, other types of modulators according to other modulation standards could also be used.

Channel identifier 44B of FIG. 7 differs from channel identifier 44A of FIG. 6 in that channel identifier 44B does not include a database manager interfacing to a digital TV bands database. In FIG. 7, channel identifier 44B includes only a spectrum sensor 70B. Because no geo-location functionality is implemented in the example of FIG. 7, communication device 30B does not include a geo-location sensor. Channel selector 64B identifies one or more available channels for broadcast transmissions based upon the input received from spectrum sensor 70B. Channel selector 64B may also receive a user selection of a channel from a list of available channels via channel selection UI 66B. The list of available channels may be presented on the channel selection UI 66B based upon the sensed signal information provided by spectrum sensor 70B.

Figure 8:
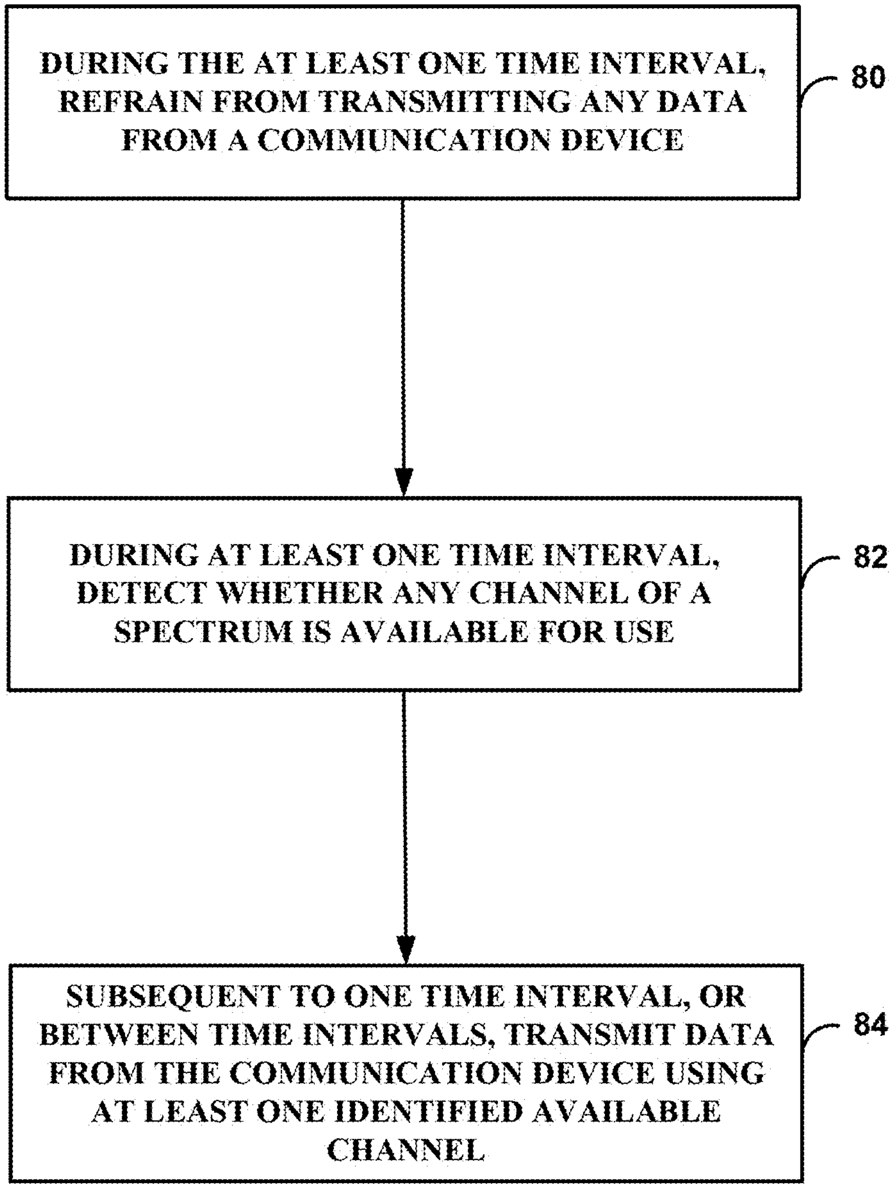
FIG. 8 is a flow diagram illustrating an example of a method that may be performed by a communication device, such as one or more of the communication devices shown in FIGS. 1-5, to perform transmitter quieting during spectrum sensing.

FIG. 8 is a flow diagram illustrating an example of a method that may be performed by a communication device, such as one or more of the communication devices shown in FIGS. 1-5, to perform transmitter quieting during spectrum sensing, although transmitter quieting may also be performed in accordance with this disclosure for other sensing or non-sensing reasons. For purposes of illustration only in the description below of FIG. 8, it will be assumed that the method of FIG. 8 may be performed by communication device 30 shown in FIG. 5.

Figure 10:
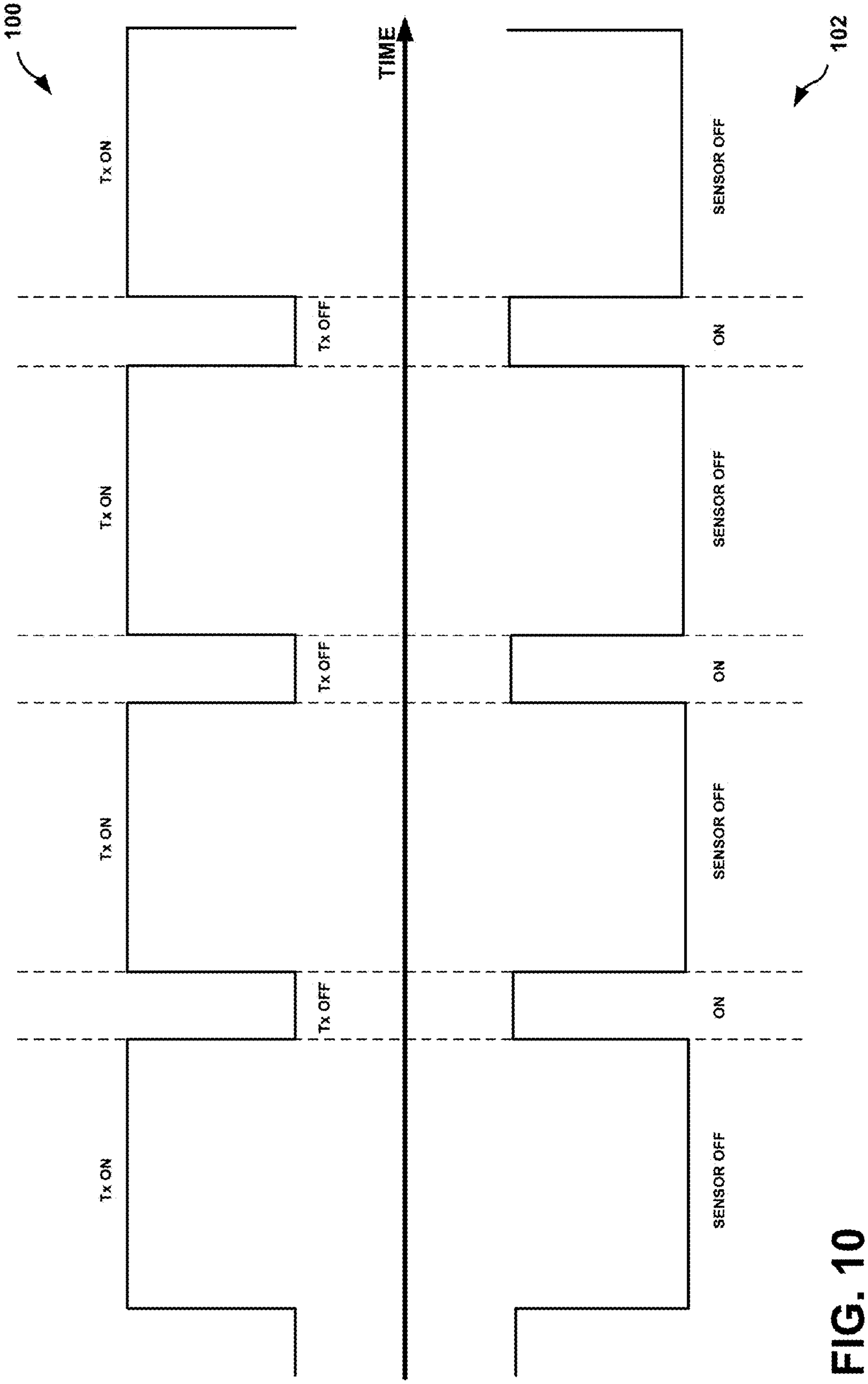
FIG. 10 is a timing diagram illustrating example data transmission and channel sensing duty cycles, such as for one of the communication devices of FIGS. 1-5.
Figure 11:
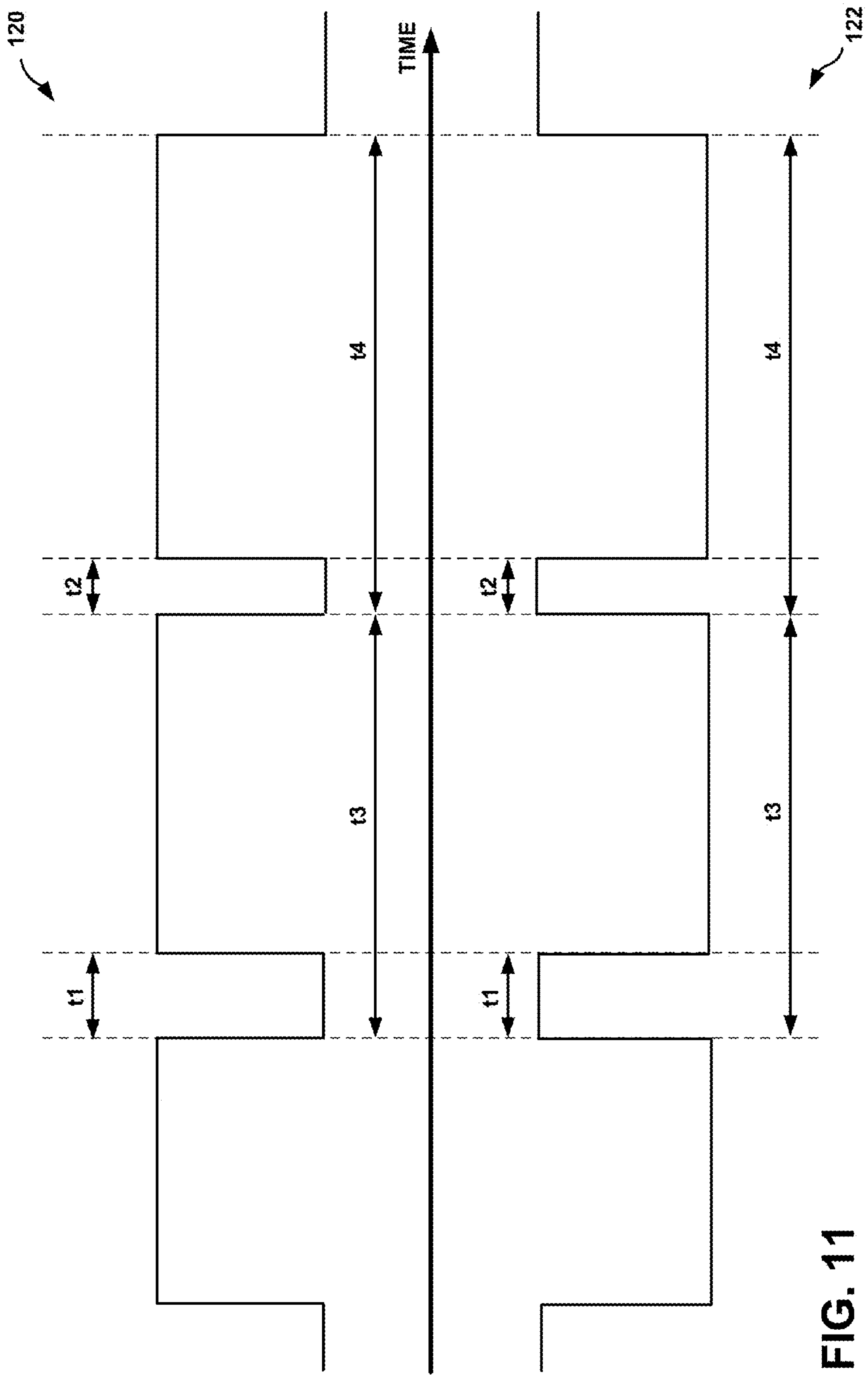
FIG. 11 is a timing diagram illustrating another example of data transmission and channel sensing duty cycles, such as for one of the communication devices of FIGS. 1-5.

Communication device 30 may refrain, during at least one time interval, from transmitting any data from the communication device (80), such as, for example, to help minimize or avoid potential signal interference between data transmission and spectrum sensing operations. Communication device 30 may detect, during the at least one time interval, whether any channel of a spectrum is available for use (82). During the at least one time interval, communication device may identify at least one available channel in the spectrum. Subsequent to one time interval during which spectrum sensing is performed, or in between time intervals during which spectrum sensing is performed, communication device 30 may transmit data of a digital broadcast format in the at least one identified available channel (84). FIGS. 10 and 11 show further exemplary details of these features, and will be described in further detail below.

Communication device 30 may comprise a multimedia communication device having multimedia capabilities, and the data may comprise multimedia data including at least one of audio data, video data, text data, speech data, and graphics data. In some examples, the digital broadcast format may be an ATSC format, a T-DMB format, a DVB format, an ISDB-T format, or an MPEG-TS format (to name only a few examples), though various other digital formats may also be utilized. Device 30 may use one or more video and/or audio encoders (e.g., video/audio encoders 50A shown in FIG. 6 or video/audio encoders 50B shown in FIG. 7) and/or multiplexers, along with one or more modulators/duplexers/switches, when transforming the multimedia data. Transforming the multimedia data may include encoding the multimedia data to comply with the digital broadcast format, and modulating the encoded multimedia data.

Device 30 may identify at least one available channel of a spectrum (e.g., using a channel identifier, such as channel identifier 44 of FIG. 5). Such identification may, in some cases, be initiated by the device 30. For example, device 30 may use a spectrum sensor (e.g., spectrum sensor 70A of FIG. 6 or spectrum sensor 70B of FIG. 7) and/or information accessed from a digital TV bands database (e.g., digital TV bands database 74 of FIG. 6) to identify the at least one available channel. In some cases, device 30 may identify the at least one available channel in an unused portion of a broadcast spectrum, such as a broadcast television spectrum. In some cases, the at least one available channel may comprise television band white space. The digital broadcast format may comprise an ATSC format, a T-DMB format, a DVB format, an ISDB-T format, or an MPEG-TS format, to name only a few non-limiting examples.

In some examples, device 30 may utilize a channel identifier to identify at least one other available channel for subsequent transmission and/or broadcasting of data if the at least one available channel becomes occupied (e.g., by a licensed user). In some cases, device 30 may use a channel identifier to detect, during at least one subsequent time interval, whether the at least one identified available channel is still available or has become occupied by another user. Device 30 may use a spectrum sensor and/or access a geo-location database, in some cases, when making a determination as to whether any channel or channels of the spectrum is/are available for use based on geo-location. That is, the frequencies scanned for availability may be determined based on the geo-location of device 30.

Thus, in one example, device 30 determines geographic coordinates associated with device 30, determines one or more particular frequencies available in a white space based on the geographic coordinates of device 30, performs white space sensing at the one or more particular frequencies based on the geographic coordinates of device 30 to determine whether the one or more particular frequencies are available for use, and transmits data via a transmitter at the one or more particular frequencies subject to determining that the one or more particular frequencies are available for use. Device 30 may blank it transmitter when performing the white space sensing, as described herein.

In one example, device 30 may include a geo-location sensor (e.g., geo-location sensor 73 of FIG. 6) to determine geographic coordinates of device 30. Device 30 may then provide the geographic coordinates as input to the digital TV bands database. Available channels may be geographically defined in some cases, and therefore, white space sensing may likewise be based on the geographic coordinates associated with device 30 at any given time.

When device 30 utilizes a spectrum sensor, device 30 may assign one or more quality values to a first group of channels based upon qualities of detected signals associated with the first group of channels. The quality values may be based on noise levels, interference (e.g., from extraneous signals or unauthorized/unlicensed users), or other factors. For example, device 30 may utilize the spectrum sensor to obtain certain quality values for each individually sensed channel within a defined frequency range or band, such as interference levels or signal-to-noise ratios that may be associated with the channels.

Device 30 may utilize meta information provided by these quality values to assess the quality of each channel (e.g., low quality, medium quality, high quality). For example, if the quality values for an available channel indicate that the channel would have a high signal-to-noise ratio with a low amount of interference, device 30 may determine that the channel may be a high-quality channel. On the other hand, if the quality values for the available channel indicate that the channel would have a low signal-to-noise ratio or have a high amount of interference, device 30 may determine than the channel may be a low-quality channel.

After device 30 has identified at least one available channel, device 30 may transmit (e.g., via transmitter 59A of FIG. 6 or transmitter 59B of FIG. 7) the transformed data (e.g., to one or more separate, external devices) in the at least one identified available channel. For example, device 30 may initiate a broadcast transmission to one or more external multimedia output devices, such as television devices, upon request of device 30.

Figure 9:
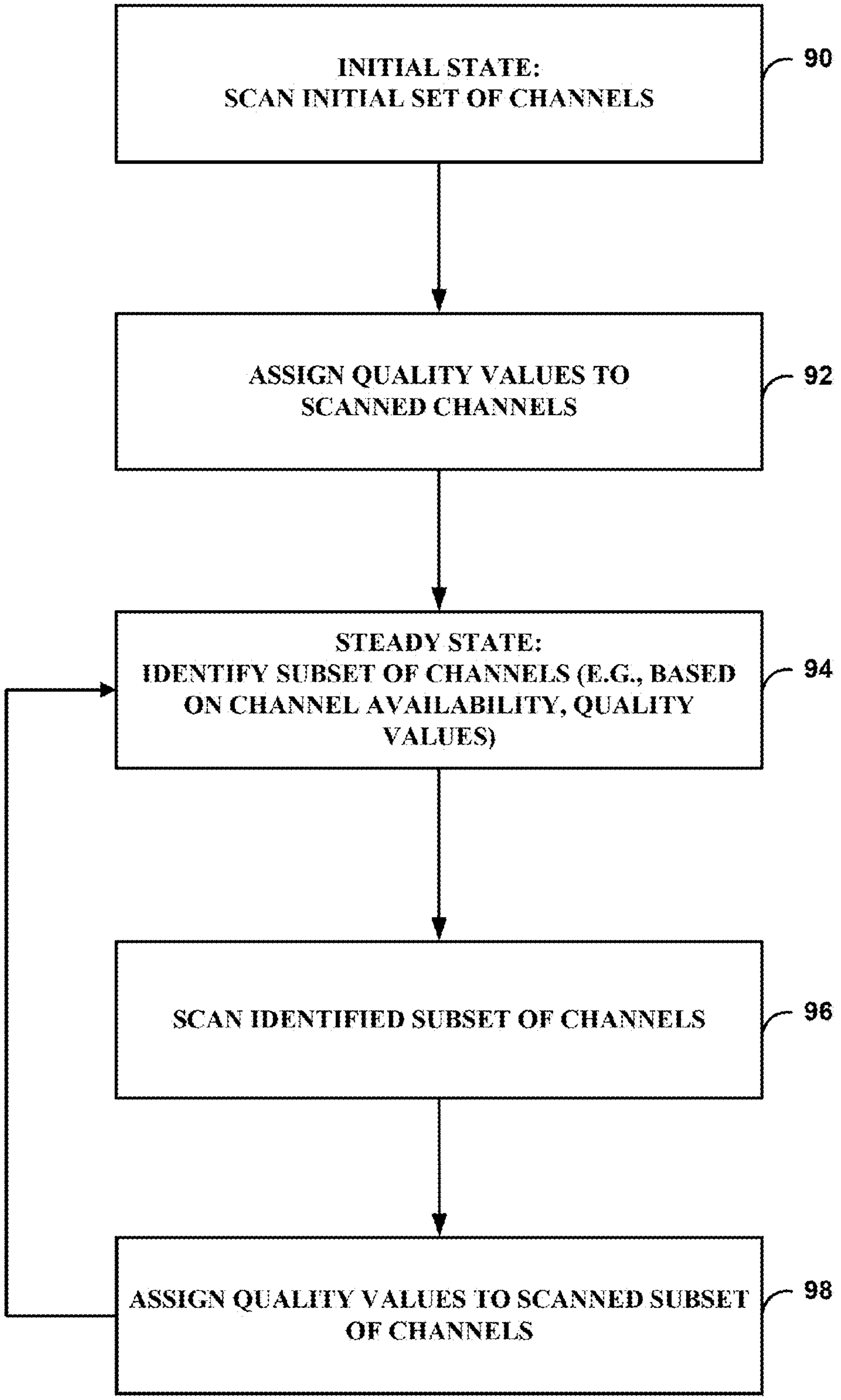
FIG. 9 is a flow diagram illustrating an example of a method that may be performed by a communication device, such as one or more of the communication devices shown in FIGS. 1-5, to perform spectrum sensing.

As noted above, device 30 may assign one or more quality values to a first group of channels based upon qualities of detected signals associated with the first group of channels. In some instances, device 30 may utilize its channel identifier to detect, during a first time interval, whether the first group of channels are available for use, detect, during a second and subsequent time interval, whether a second group of channels are available for use, where the second group of channels comprises a subset of the first group of channels. Device 30 may select the second group of channels based upon the quality values assigned to the first group of channels. FIG. 9 shows further details and examples related to such channel detection.

In some examples, device 30 may detect, during multiple distinct time intervals, whether any channel of the spectrum is available for use, and refrain (e.g., using a quieting unit, such as the one shown in FIG. 6 or FIG. 7), during each of the multiple distinct time intervals, from transmitting any data from device 30. The multiple distinct time intervals may or may not have the same time duration. For example, at least two of the multiple distinct time intervals may be of different duration. Furthermore, device 30 may change a frequency at which the detecting occurs. In some examples, communication device 30 may turn off or disable transmission functionality of the communication device during the at least one time interval.

In some examples, device 30 may generate a data stream that includes transmission data and miscellaneous data, and may refrain, during the at least one time interval (e.g., the "quiet time"), from transmitting the miscellaneous data of the data stream. As will be described in further detail below, the miscellaneous data may, in certain instances, comprise non-essential data including null data, padded data, or even redundant data, as described further below. In general, such data is non-essential in that the data is not needed by a decoder to decode multimedia data carried by the transmission data. Device 30 may refrain, during at least one other time interval, from detecting whether any channel of the spectrum is available for use, and may transmit, during the at least one other time interval, the transmission data of the data stream.

In some cases, communication device 30 may select the at least one time interval to occur prior to a scene change or acquisition point (e.g., one or more intra coded frames) in the transmission data of the data stream, as will be described in more detail below. In some cases, communication device 30 may insert one or more error correction codes into the transmission data of the data stream for use by a data receiver (e.g., data receiver 9 of FIG. 1) upon receipt of the transmission data.

FIG. 9 is a flow diagram illustrating an example of a method that may be performed by a communication device, such as one or more of the communication devices shown in FIGS. 1-5, to perform spectrum sensing. For purposes of illustration only, in the description below of FIG. 9, it will be assumed that the method shown in FIG. 9 is performed by communication device 30 shown in FIG. 5.

During an initial state, communication device 30 may scan an initial set of channels in an effort to identify one or more available channels for transmission (90). For example, communication device 30 may utilize its channel identifier 44, including a spectrum sensor (e.g., spectrum sensor 70A of FIG. 6 or spectrum sensor 70B of FIG. 7), to scan the initial set of channels and identify one or more available channels in the set. For example, channel identifier 44 may scan all of the channels in a particular frequency band or range upon initialization, or may scan all of the channels that channel identifier 44 has determined may be available based upon previously received or pre-programmed information. For instance, channel identifier 44 may be pre-programmed to scan a defined group of channels in this initial state. In other situations, channel identifier 44 may have received information from a geo-location database (e.g., geo-location database 74 of FIG. 6) specifying which channels should or may be available.

After scanning the initial set of channels, communication device 30 may assign quality values to the scanned channels (92). For example, communication device 30 may assign a particular quality value to each of the scanned channels. The quality values may be based on signal levels, noise levels, signal to noise levels, received signal strength indication (RSSI), interference (e.g., from extraneous signals or unauthorized/unlicensed users), or other factors. For example, communication device 30 may utilize its spectrum sensor to assign certain quality values for each individually sensed channel within a defined frequency range or band, such as interference levels or signal-to-noise ratios that may be associated with the scanned channels.

Subsequently, during steady-state operation, communication device 30 may identify a subset of channels (94). For example, communication device 30 may identify the subset of channels based upon one or more criterion, such as channel availability and/or quality values assigned to the channels. In some cases, communication device 30 may include any channels that were previously identified as available within the subset of channels. In some cases, communication device 30 may include channels within the subset based upon the quality values that were previously assigned to the channels. For instance, communication device 30 may include channels that were assigned high quality values, with respect to other channels, during initialization, e.g., based upon low interference levels or high signal-to-noise ratios for these channels. In one particular scenario, communication device 30 may select a previously identified available channel and another group of channels having high quality values as the subset of channels.

Upon identification of the subset of channels, communication device 30 may then scan those channels within this subset (96), such as by using a spectrum sensor. Device 30 may then assign new quality values to each of the channels in the scanned subset of channels (98), thereby updating the quality values of the channels based upon the updated spectrum sensing information. During steady-state operation, communication device may repeat these operations, as shown in FIG. 9, to perform spectrum sensing.

Thus, as is shown in FIG. 9, communication device 30 may scan various different groups of channels at different points to perform spectrum sensing operations. The actual channels that are scanned may vary. In the example shown, communication device 30 may scan an initial set of channels during initialization, but may scan a smaller subset of channels during steady-state operation. As will be described in more detail below, communication device 30 may vary the length of time that it performs spectrum sensing over various iterations, and may also vary the frequency at which it performs spectrum sensing, as well.

FIG. 10 is a timing diagram illustrating example data transmission and spectrum sensing duty cycles. Example spectrum sensing duty cycle 102 indicates when spectrum sensing operations may be turned on or off, or when such operations are enabled or disabled. As shown in FIG. 10, spectrum sensing operations may be turned on ("ON") for defined intervals of time, and may also be turned off ("SENSOR OFF") for defined intervals of time, such as during steady state operation. A spectrum sensor of a communication device (e.g., spectrum sensor 70A of FIG. 6, spectrum sensor 70B of FIG. 7) may utilize or implement such a spectrum sensing duty cycle 102 when performing spectrum sensing operations. As a result, the spectrum sensor may scan groups of channels, e.g., during initialization or steady state, for certain lengths of time. The length or interval of time during which channels are scanned, and the frequency at which scanning occurs, may vary over time, and may define duty cycle 102.

Example data transmission duty cycle 100 indicates when data transmission operations may be turned on or off, or when such operations are enabled or disabled. As shown in FIG. 10, data transmission operations may be turned on ("Tx ON") for defined intervals of time, and may also be turned off ("Tx OFF") for defined intervals of time. A transmitter of a communication device may utilize or implement such an example data transmission duty cycle 100 when performing data transmission operations. For example, quieting unit 57A (FIG. 6) or quieting unit 57B (FIG. 7) may turn off or disable transmission of data based upon a transmission duty cycle, such as data transmission duty cycle 100. The length or interval of time during which quieting occurs, and the frequency at which quieting occurs, may vary over time, and may define duty cycle 100.

As shown in the example of FIG. 10, the communication device may synchronize or otherwise align spectrum sensing and transmission quieting operations, such that the communication device turns off or disables data transmission operations while performing spectrum sensing. In FIG. 10, while spectrum sensing is turned on or enabled, data transmission functionality is turned off or disabled (e.g., quieted). Conversely, while spectrum sensing is turned off or disabled, data transmission is turned on or enabled. In such fashion, the communication device does not transmit data while it performs spectrum sensing in order to avoid potential interference issues.

In order to synchronize or align the spectrum sensing and transmission quieting operations, a common clock may be used. For example, as shown in FIG. 6, quieting unit 57A and spectrum sensor 70A may utilize clock 61A during operation. Similarly, as shown in FIG. 7, quieting unit 57B and spectrum sensor 70B may utilize clock 61B.

The communication device may change or configure the duty cycles 100 and 102 shown in FIG. 10 over time. For example, the device may alter the length or interval of time that spectrum sensing and transmission quieting occurs, and may also alter the frequency at which such operations are performed, as shown in the example of FIG. 11.

In one example scenario, the communication device may transmit or broadcast data to a data receiver using one or more available channels according to an ATSC format. In this scenario, the communication device may utilize a spectrum sensor to detect for licensed use signals for specified time intervals and at a particular frequency, either of which may be statically or dynamically configured. The maximum frame rate supported by ATSC may be approximately thirty frames per second, which amounts to approximately thirty three milliseconds per frame. If the communication device utilizes quieting intervals of ten milliseconds, any errors introduced into the transported stream may be recoverable through standard error recovery and/or concealment techniques in a data receiver (e.g., data receiver 9 of FIG. 1), given the duration of the quieting intervals with respect to the frame rate. The communication device may insert or add extra error correction codes into the broadcast stream for use by the data receiver. The intervals corresponding to "Tx Off" and sensor "ON" (or other time intervals) may also include transition periods or so-called soft periods where the sensor and the transmitter are on or off.

FIG. 11 is a timing diagram illustrating another example of data transmission and spectrum sensing duty cycles. In this example, spectrum sensing duty cycle 122 includes various different time intervals. During a first time interval ("t1"), a spectrum sensor may perform spectrum sensing to scan for one or more available channels. During a subsequent, second time interval ("t2"), the sensor may again perform spectrum sensing. In this example, the second time interval is less than the first time interval, indicating that the spectrum sensor spends a shorter interval of time scanning for available channels during the second time interval in this particular, non-limiting example. In addition, the spectrum sensor may scan the same or different groups of channels during these intervals. For instance, the sensor may scan a first set of channels during the first time interval, but scan a second set of channels during the second time interval. The second set of channels may include fewer channels than the first set, though certain channels may be included within the first and second sets.

In general, FIG. 11 is meant to illustrate that the time intervals during which sensing is performed may vary over time. In addition, the channels that are scanned during these intervals may also vary. For instance, as stated earlier, during initialization, a large group of channels may be initially scanned. However, during subsequent steady-state operation, a smaller group of channels may be scanned during spectrum sensing operations. The communication device may select or be configured to use any number of different intervals when performing spectrum sensing over the course of time.

FIG. 11 shows that, during these same two time intervals "t1" and "t2", data transmission operations may be quieted, as shown in transmission duty cycle 120. Thus, similar to the spectrum sensing intervals, the transmission quieting intervals may also vary over time.

In addition, FIG. 11 shows that the frequency at which spectrum sensing and transmission quieting occurs may also vary over time. In FIG. 11, a third time interval ("t3") occurs between consecutive sensing/quieting events. A fourth time interval ("t4") occurs between another group of consecutive sensing/quieting events, where the fourth time interval is longer than the third time interval. In this example, the frequency at which spectrum sensing and transmission quieting occurs has decreased. In general, FIG. 11 illustrates one example of how such a frequency can vary over time. In some instances, it may be desirable to vary the length of time spectrum sensing occurs (e.g., the sensing intervals) and/or the frequency at which sensing is performed in order to obtain diverse sensing samples over time.

A communication device may be configured to select or determine the various time intervals of sensing or quieting, or the frequencies at which these events occurs. In some situations, the communication device may dynamically change these time intervals or frequencies over the course of time based upon one or more factors. For example, if varying number of channels need to be scanned, the time intervals during which sensing occurs may be altered. Also, in some cases, based upon needs or demands of applications executed by the communication device, the time intervals of sensing/transmission may be dynamically altered to meet such needs or demands. In certain situations, the device may wish to perform spectrum sensing more frequently if the device has determined that various channels have low quality values, with the goal of subsequently identifying and selecting channels that may have higher quality values.

Because the transmitter may be quieted, however, during various time intervals, it is possible that the data receiver (e.g., data receiver 9 of FIG. 1) may receive a discontinuous stream of data that may potentially include gaps in the data flow. In certain cases, the data receiver may include an error correction unit to perform error correction or concealment in order based upon the discontinuous data flow. In these cases, the communication device containing the transmitter may include additional error codes that may be used by such an error correction unit in the receiver. However, in some examples, the communication device, in conjunction with its transmitter, may actually create or engineer the transmitted data stream by taking into account the quieting intervals, as shown in FIG. 12.

Figure 12:
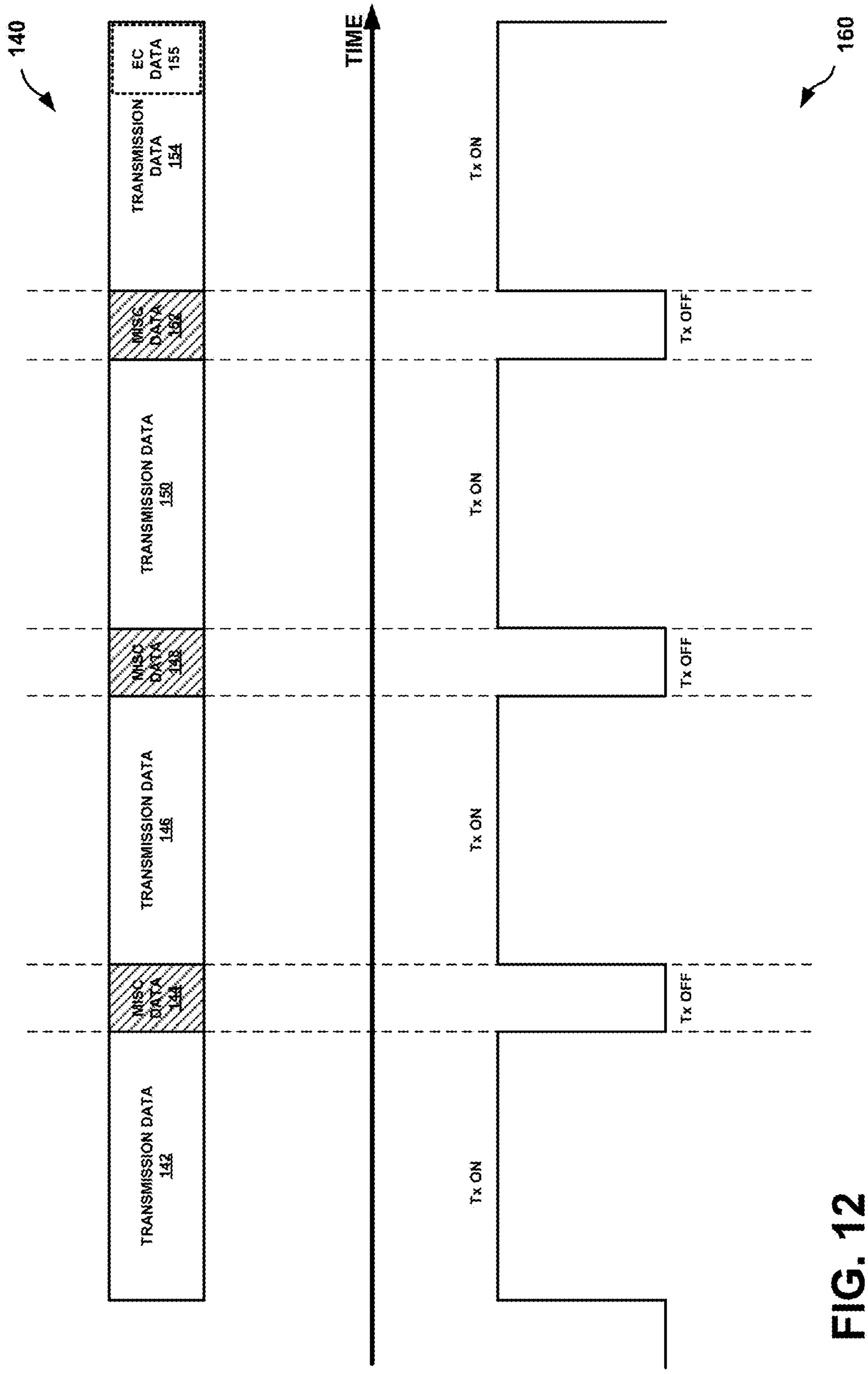
FIG. 12 is a conceptual diagram illustrating an example data transmission duty cycle and corresponding data stream that may be transmitted by a communication device.

FIG. 12 is a conceptual diagram illustrating an example data transmission duty cycle 160 and corresponding data stream 140 that may be transmitted by a communication device, such as by one of the communication devices shown in FIGS. 1-5. The transmission duty cycle 160 shows various different quieting intervals ("Tx OFF"). Data stream 140 includes a continuous stream of data including various transmission data 142, 146, 150, and 154. Data stream 140 also includes miscellaneous data 144, 148, and 152 interspersed between the transmission data 142, 146, 150, and 154. In certain cases, miscellaneous data 144, 148, and 152 may comprise null data, padded data, redundant data, or other data not necessarily needed by a data receiver to decode and process the transmission data 142, 146, 150, and 154.

As shown in FIG. 12, data stream 140 may be sent by a transmitter of a communication device over an interval of time during which the transmitter may be quieted (e.g., turned off, disabled) according to duty cycle 160. When the transmitter is on, the transmitter may first transmit data 142, which is part of data stream 140. When the transmitter is then quieted, the transmitter will not transmit miscellaneous data 144, which is included between data 142 and data 146 in stream 140. In some examples, miscellaneous data may comprise null data. In some examples, as described further below, the miscellaneous data may comprise redundant data, or pad data, that may not be required or necessary for decoding data stream 140.

Because the communication device knows that certain data included within stream 140 will not actually be transmitted due to the timing of the quieting intervals, the communication device is capable of intelligently inserting miscellaneous data into stream 140 that may not needed by a data receiver to decode or otherwise process relevant data from stream 140.

The length or size of miscellaneous data 144, 148, and 152 may be based upon the duration of the quieting intervals and the rate at which data within stream 140 is transmitted.

As one example, video/audio encoders 50A (FIG. 6) or 50B (FIG. 7) and/or transport encoder/multiplexer 52A or 52B may generate information to be included within stream 140. Thus, in certain cases, the engineering or generation of stream 140 may be performed at an application or transport level, in which case transmission data 142, 146, 150, and 154 may be broken down further into smaller-size physical data units. Packet buffers may be used (e.g., within memory 60A of FIG. 6 or memory 60B of FIG. 7) for storing any of the data that is to be included within stream 140. Video/audio encoders (50A or 50B) and/or transport encoder/multiplexer (52A or 52B) may access these buffers in order to control the size of transmission and other miscellaneous packets, and may also control the timing at which the data within stream 140 is processed, based upon the quiet time intervals and frequencies.

Stream 140 may include multiplexed data. For example, stream 140 may include one or more packetized streams of audio, video, graphics, text, speech, and other data. Transport encoder/multiplexer 52A or 52B is capable of multiplexing various data streams, including audio and video streams. Transport encoder/multiplexer 52A or 52B is further capable of multiplexing miscellaneous (e.g., null) data with transport stream data to form multiplexed data to be included within stream 140.

For example, a digital TV transformation unit/transmitter (e.g., transformation unit/transmitter 42A of FIG. 6, transformation unit/transmitter 42B of FIG. 7) may selectively insert miscellaneous data 144, 148, and 152 into data stream 140 at identified locations within data stream 140 that is not needed by a data receiver in order to process transmission data 142, 146, 150, and 154. Thus, based upon data transmission duty cycle 160 and the indicated quieting intervals, the transformation unit/transmitter may transmit data 142, 146, 150, and 154, but will not transmit miscellaneous data 144, 148, and 152. In various examples, the miscellaneous data may comprise null, padded, redundant, or other non-essential data not needed for decoding or otherwise processing transmission data 142, 146, 150, and 154. The miscellaneous data may be encoded into the bistream by a multimedia encoder or inserted by one of several possible multiplexers downstream from the encoder. In some cases, an application layer multiplexer is used to insert data and in other cases a physical transport layer multiplexer is used. For example, a multiplexer that produces an MPEG-2 transport stream (TS) may be used to insert the miscellaneous data into a multiplexed transport stream that includes video and audio data. These different examples are discussed below, and may have different features, advantages and drawbacks.

The transformation unit/transmitter may be able to accurately engineer or create data stream 140 based upon defined information related to the data transmission in general, such as the transmission rate, data transmission and/or sensing duty cycle information, and quieting interval/duration information. Based upon such information, the transformation unit/transmitter is capable of generating the example data stream 140 shown in FIG. 12, with miscellaneous data 144, 148, and 152 interspersed between data 142, 146, 150, and 154.

For instance, in one example scenario, data 142 may comprise 990 milliseconds worth of substantive data that is to be transmitted, and miscellaneous data 144 may 10 milliseconds worth of null video and audio packets that will not be transmitted due to the corresponding quieting interval shown in transmission duty cycle 160. Packet data 142 may include time stamps corresponding to the coded frame rate in video and/or audio frame packet headers.

In another example scenario, miscellaneous data 144 may include padded data, such as user-defined video object layer data. Alternatively, miscellaneous data 144 may include redundant data instead of null data (e.g., redundant slice data based upon highest entropy data for error recovery). In some examples, audio packets may be appended with null data encapsulated in user-defined headers. Miscellaneous data 148 and 152 may include data similar to miscellaneous data 144.

The communication device may create or utilize data stream 140 in various instances to minimize the impact of transmission quieting during the quieting interval by including miscellaneous data 144, 148, and 152. For example, when sending the data to a remote data receiver, it is possible that the communication device and the remote data receiver are not synchronized to, or otherwise operate according to, a common clock. In this case, the communication (i.e., transmitting) device may create stream 140 for transmission based upon its own internal clock and the duty cycle 160, which includes known quieting intervals and frequencies. As a result, the communication device is capable of intelligently inserting miscellaneous data 144, 148, and 152 into stream 140 based upon the timing of the quieting intervals, such that the miscellaneous data 144, 148, and 152 is not sent to the remote data receiver.

As shown in FIG. 12, transmission data (e.g., transmission data 154 or other data elements) may optionally include additional error correction data 155. Error correction data 155 may include one or more additional error codes transmitted along with packetized data. An error correction encoder (e.g., error correction encoder 54A of FIG. 6, error correction encoder 54B of FIG. 7) may insert such additional error correction codes into error correction data 155. These error correction codes may be used by a device that receives stream 140 (e.g., data receiver 9 of FIG. 1) to perform error correction or concealment techniques that minimize the impact of transmission quieting. In some instances, the transmitting communication device may include error correction data within a data stream without including miscellaneous data, such as miscellaneous data 144, 148, and 152.

Figure 13:
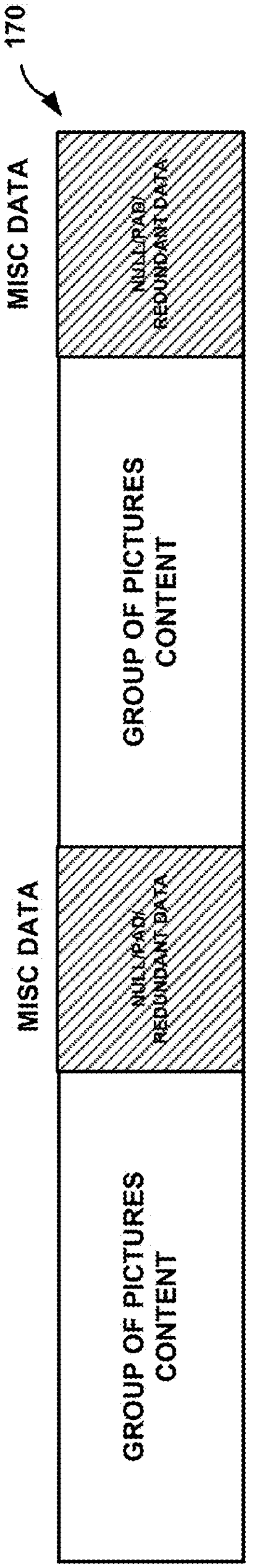
FIG. 13 is a diagram illustrating an example stream of data, including data content for multiple groups of pictures separated by miscellaneous data, where the miscellaneous data may not be transmitted during transmission quieting intervals.

FIG. 13 is a diagram illustrating an example stream of data 170, including data content for multiple groups of pictures separated by miscellaneous data, where the miscellaneous data may not be transmitted during transmission quieting intervals. In this example, the group of pictures (GOP) content may, in some cases, comprise multiple frames of data, including I (intra, or intra-coded) frames, P (predictive) frames, and B (bi-directional predictive) frames. In many instances, a GOP may include one I frame followed by multiple P or B frames, although any individual GOP may include more than one I frame in certain cases. As known by those of skill in the art, I frames, P frames, and B frames may comprise encoded video data that may be transmitted to a data receiver, such as, for instance, data receiver 9 shown in FIG. 1.

As shown in the example of FIG. 13, each GOP is separated by miscellaneous data within stream 170. Similar to the miscellaneous data shown in FIG. 12, the miscellaneous data within stream 170 of FIG. 13 may not be transmitted to a data receiver due to the timing of transmission quieting intervals (e.g., as per a transmission duty cycle, such as duty cycle 160 of FIG. 12). In various examples, the miscellaneous data may comprise null data, padded data, or redundant data that is not needed by a data receiver to decode or otherwise process the received GOP content within stream 170.

In some examples, each GOP may comprise a fixed GOP length for video encoding, with an I frame at the beginning of each GOP. For example, in one specific scenario, a communication device may utilize application or transport level coding to include an I frame at the beginning of each defined time interval (e.g., at the beginning of each second) and insert miscellaneous data, such as null data, at the end of each defined time interval (e.g., at the end of each second) to align with the quieting interval. The length of the miscellaneous data may be based upon the duration of the quieting intervals and the rate at which data within stream 170 is transmitted.

The communication device may determine the defined time interval according to a clock that is synchronized or aligned with a remote device that receives data stream 170 upon its transmission. Because both the communication device (i.e., transmitting device) and the remote receiving device are aligned to a common clock (e.g., a global positioning satellite clock source), the communication device is capable of inserting I frames and miscellaneous data at the defined time intervals, which may then be appropriately processed by the remote receiving device. For instance, the remote device is capable of decoding the GOP content and ignoring the miscellaneous (e.g., null) data.

These time intervals may be determined or programmed by the communication device. In some cases, the communication device may communicate the duration of the time intervals to the remote device dynamically in an initial data communication. In other cases, the remote device may be pre-programmed to operate according to predefined time intervals that have also been pre-programmed into the transmitting communication device.

A transmitting communication device is capable of configuring or even dynamically changing sensing and transmission duty cycles, along with the ordering and content of information included within a data stream (e.g., stream 170), in order to provide transmission quieting just before acquisition points or in between GOP content. By inserting miscellaneous data between GOP content, the communication device is capable of keeping the coding/decoding system clock operational and may help minimize any timing jitter in stream 170, thereby allowing more seamless operation at the data receiver upon receipt of the GOP content of stream 170. Thus, the communication device is capable of statically or dynamically configuring the quieting duty cycle such that quieting intervals are strategically aligned before on acquisition point, new GOP content, or even a scene change, as shown in FIG. 14.

Figure 14:
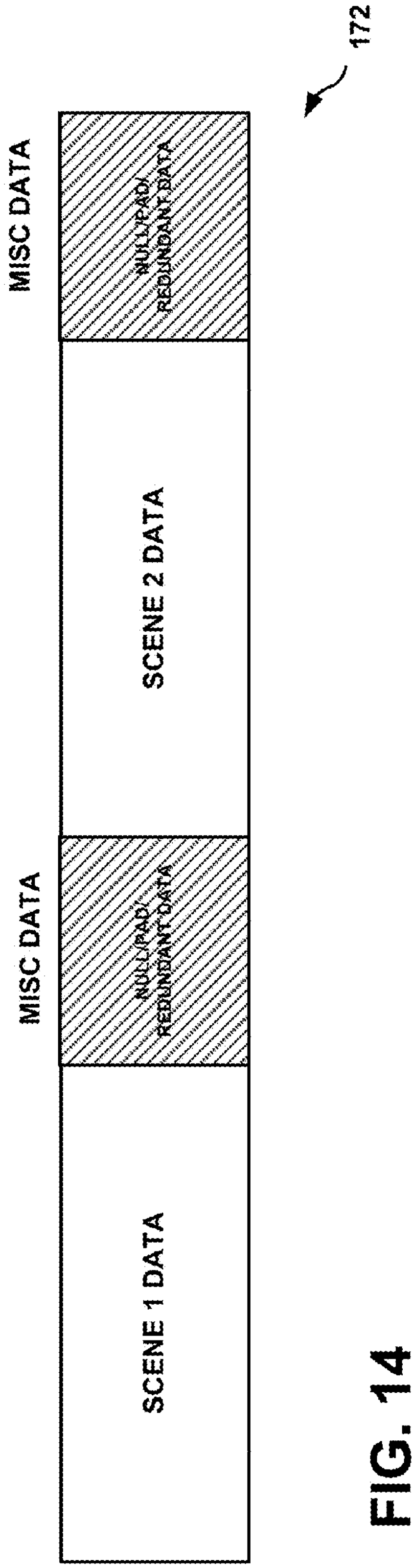
FIG. 14 is a diagram illustrating an example stream of data, including data content for multiple scenes separated by miscellaneous data, where the miscellaneous data may not be transmitted during transmission quieting intervals.

FIG. 14 is a diagram illustrating an example stream of data 172, including data content for multiple scenes separated by miscellaneous data, where the miscellaneous data may not be transmitted during transmission quieting intervals. FIG. 14 illustrates an example in which the communication device is capable of configuring or even dynamically changing sensing and transmission duty cycles, along with the ordering and content of information included within a data stream (e.g., stream 172), in order to provide transmission quieting just before a scene change (e.g., a multimedia or video scene change).

FIG. 14 shows different scenes (e.g., data associated with a first scene, data associated with a second scene) separated by miscellaneous data. The placement and size of the miscellaneous data may be based upon the quieting intervals of a transmission duty cycle and the frequency at which the quieting intervals occur. In the example of FIG. 14, the data of a first scene is transmitted, and the data of the second scene is subsequently transmitted after a quieting interval. The miscellaneous data within stream 172 is not transmitted to a data receiver.

Thus, the transmitting communication device is capable of configuring or even dynamically changing sensing and transmission duty cycles, along with the ordering and content of information included within a data stream (e.g., stream 172), in order to provide transmission quieting just before a scene change. As a result, the duty cycles may be modified based upon the actual content of the data to be transmitted. In addition, the communication device may insert miscellaneous data into the stream 172 at select points. The length or size of the miscellaneous data may be based upon the quieting interval and the rate at which data within stream 172 is transmitted.

Figure 15:
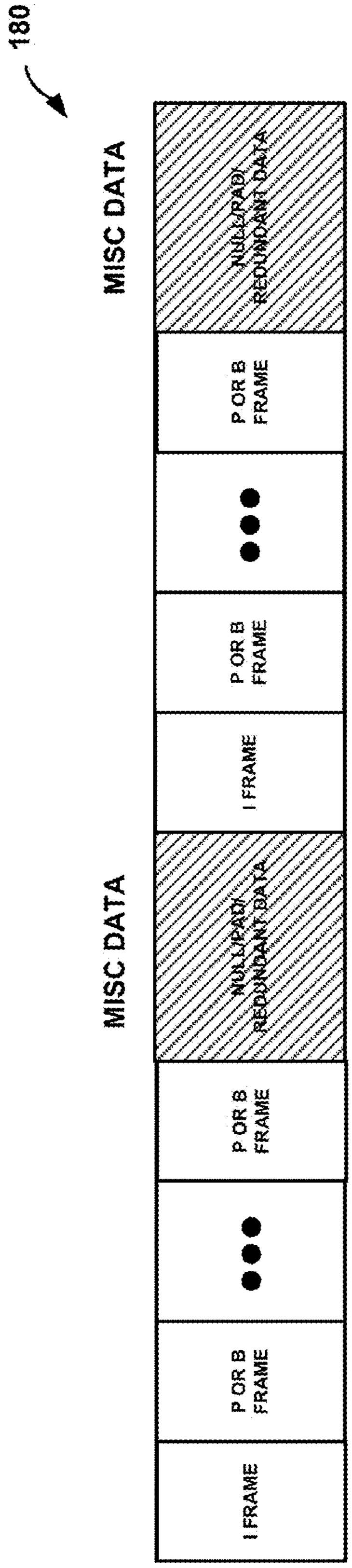
FIG. 15 is diagram illustrating an example stream of data, including multiple frames of data separated by miscellaneous data, where the miscellaneous data may not be transmitted during transmission quieting intervals.

FIG. 15 is diagram illustrating an example stream of data 180, including multiple frames of data separated by miscellaneous data, where the miscellaneous data may not be transmitted during transmission quieting intervals. In this example, one or more of the frames may comprise a GOP. As shown in FIG. 15, a first group of frames may comprise an I frame followed by one or more P or B frames, collectively comprising a first GOP. A second GOP may include another I frame followed by one or more P or B frames. In this example, the miscellaneous data, which is not transmitted, may be located just before an acquisition point (e.g., just before an I frame).

In some cases, a GOP may include more than one I frame, though many GOPs may include just one I frame. The miscellaneous data may include null or redundant data. For example, the redundant data could comprise one or more redundant I, P, or B frames. The redundant data may, in some cases, be based upon the highest entropy data within individual GOPs.

In some examples, a transmitting communication device may utilize application or transport level coding to include an I frame at the beginning of each defined time interval (e.g., at the beginning of each second) and insert miscellaneous data, such as null data, at the end of each defined time interval (e.g., at the end of each second) to align with the quieting interval. The length of the miscellaneous data may be based upon the duration of the quieting intervals and the rate at which data within stream 180 is transmitted. The transmitting device may implement such an algorithm in certain cases where its operating clock is synchronized or otherwise aligned with the operating clock of a device that receives stream 180.

Figure 16:
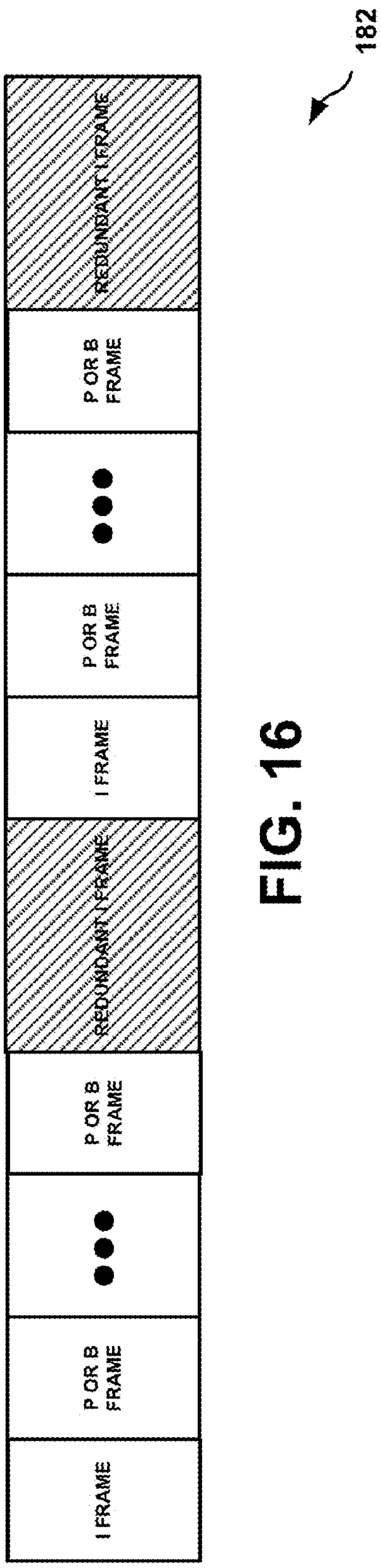
FIG. 16 is a diagram illustrating an example stream of data, including multiple frames of data separated by redundant frame data, where the redundant frame data may not be transmitted during transmission quieting intervals.

FIG. 16 is a diagram illustrating an example stream of data 182, including multiple frames of data separated by redundant frame data, where the redundant frame data may not be transmitted during transmission quieting intervals. Stream 182 is a particular example of stream 180 shown in FIG. 15. In stream 182, the miscellaneous data that separates GOP content comprises redundant I frame data, such as complete or partial I frame data. Such redundant data may, in some cases, comprise redundant slice data that may be based, for instance, on highest entropy data within data stream 182.

This disclosure presents a variety of additional techniques for quieting data transmission to promote reliable sensing of one or more available channels of a spectrum, such as a white space spectrum. These additional techniques may be used independently or in various combinations with one another or with techniques described elsewhere in this application. In some implementations, such techniques may be helpful in promoting media quality, reduced latency, efficient bandwidth usage, and/or overall quality of experience for users when transmitter quieting operations are performed for spectrum sensing.

Transmitter quieting operations generally involve turning the transmitter off for short intervals of time. During a transmitter quieting interval, the transmitter does not transmit multimedia data, such as audio and/or video data, to a receiver. Transmitter quieting operations could result in generation of errors, loss of data, and/or increased latency, e.g., at the application layer. Alternatively, or additionally, transmitter quieting operations could result in loss of synchronization, e.g., at the physical layer.

The additional techniques described in this disclosure may include techniques for adaptive video encoding, reduced latency, synchronous modulation, and/or coordinated control of video coding, sensing, and/or modulation. Examples of these techniques are described below, in some cases with reference to FIGS. 17-27. In some examples, the techniques may support a low latency design for transmitter quieting with reduced impact to performance (e.g., latency, audio-video (AV) quality, quality of experience, and/or bandwidth efficiency) and real-time operation, e.g., in an ATSC system, using adaptive video encoding. However, an ATSC system is described below for purposes of example. The techniques described in this disclosure may be applied to other modulation systems.

In an ATSC system, as an example, a service multiplexer (MUX) multiplexes encoded video packets, encoded audio packets, and ancillary data packets to form an MPEG-2 transport stream (TS). Ancillary data may include closed caption data for the hearing impaired, program and system information protocol (PSIP) data, or other data. An ATSC modulator receives the transport stream, and increases the bit rate of the data, if necessary, e.g., to 19.4 Mbps. This bit rate may be necessary for the components of the ATSC modulator to function properly. The reference to ATSC is as an example. Concepts and methods described can be extended and apply to other broadcast technologies as well.

Spectrum sensing to determine whether a channel is currently available or remains available may be performed periodically. Spectrum sensing may also be performed at arbitrary instances that may occur at an opportune time aligned to various operations within the system. For example, spectrum sensing may be performed during black fades in content, or when interference levels are high, at arbitrary times and for different durations. In some cases, spectrum sensing may be performed at least once per minute. During a spectrum sensing operation, there may be a loss by the receiver of transmit packets because the transmitter is quieted or, in other words, blanked. The loss of transmit packets, at the application layer, can produce data errors and latency, as discussed above.

At the physical layer, a receiver may be designed with a phase locked loop (PLL) or other hardware that latches onto synchronization signals in the transmitted data stream. When the transmitter is quieted, i.e., turned off during a transmitter quieting interval for spectrum sensing, synchronization signals (e.g., field synchronization signals in ATSC) may be unavailable. Hence, quieting of the transmitter during spectrum sensing may result in the loss of a number of synchronization signals sufficient to cause the receiver to lose synchronization.

Loss of synchronization may require the receiver to perform resynchronization after the transmitter again becomes active following the end of the transmitter quieting interval. Resynchronization can require some amount of time, resulting in loss of data, or add delays in the system resulting in large latencies. Loss of data can cause data errors and latency, which can result in reduced quality of experience for users on the receiver side. Accordingly, it may be desirable to mitigate or avoid resynchronization.

Adaptive multimedia coding techniques may be applied to control placement of null data in a coordinated manner with transmission quieting intervals and with portions of the transport data stream received by a modulator. The null data may contain null packets that each contain null data, such as zero-valued bits, or other miscellaneous data. Other examples of null data may include redundant I frame data, such as complete or partial I frame data, redundant slice data, or other data. Hence, the null packets may include zero-valued data but could include other types of miscellaneous data such as redundant data, pad data, or the like, as described in this disclosure. The miscellaneous data may be non-essential in the sense that it is not required by a decoder to reproduce the multimedia data. As described above, the null packets may be placed in a data stream at intervals substantially coincident with transmitter quieting intervals. Uncontrolled placement of the null packets by the modulator could disrupt performance.

In one example of adaptive video coding to support transmitter quieting, a video encoder may be configured at the application layer to apply a reduced bit rate over a series of video frames, such as a group of pictures (GOP) or another type of rate control unit (such as one or more frames or portions of a frame). The reduced coding rate for the video data may be distributed across frames (i.e., pictures) in the GOP to provide coding "headroom" in the coded video data. In some instances, a reduced coding rate could alternatively or additionally be applied to the audio data. However, application of the reduced coding rate to the video data may be sufficient, and may avoid degradation of audio quality.

The coded video data may be combined with coded audio data, as well as ancillary coding data and program/control data in some cases, e.g., at a multiplex layer. The multiplexed data provides a transport stream of data for modulation by a modulator, such as an ATSC modulator. The modulator may have a fixed bit rate requirement for the input transport stream in order for various components or circuitry of the modulator to properly modulate the input transport data stream to produce an output modulated data stream. In ordinary operation, the modulator may insert null packets into the transport stream to produce a data stream at the required bit rate. In some examples described in this disclosure, however, adaptive video encoding can be applied to intentionally reduce the bit rate of encoded video so that space can be provided in the transport stream for controlled placement of null packets (or other miscellaneous or non-essential data) at a location corresponding to activation of a transmitting quieting interval.

If the transport stream has a reduced bit rate, e.g., as a result of the application of an adaptive video coding (and/or adaptive audio coding) process that applies a reduced bit rate at the application layer, the modulator may add null bytes to the transport stream so that the modulator can produce an input data stream that adheres to the required bit rate or output data rate for proper modulator operation. At the same time, however, the reduced bit rate applied by the video encoder produces headroom that permits controlled insertion of at least some of the null bytes by the modulator at a position corresponding to a transmitter quieting interval.

In other words, the modulator may be configured to place the null bytes at various locations in the modulated data stream to fill space and thereby increase the effective bit rate, as discussed above. Hence, the headroom in the encoded video creates space for insertion of null packets by the modulator. In addition, the modulator may be specially configured to place some of the null bytes at a location in the data stream at which a transmitter quieting interval will be applied. In this manner, at least some of the null bytes may be placed coincident with the transmitter quieting interval, so that the transmitter quieting interval is less likely to adversely impact performance.

In some examples, the null bytes may occupy a time interval having a length that is greater than or equal to the length of the transmitter quieting interval. If the reduced coding rate is distributed across multiple video frames in a GOP, either evenly or unevenly, each frame may create space for insertion of null bytes in the transport stream. The modulator may trigger the transmitter quieting interval in response to a clock signal, such as a once per second clock signal pulse, so that transmitter quieting is performed approximately once per second. This clock pulse may be referred to as a quieting trigger pulse.

As an illustration, if the transport stream packets are transformed into data segments, and the data segments are divided into data fields separated by field synchronization markers, which may be referred to as field syncs, the modulator could place a portion of the null bytes and trigger the transmitter quieting interval approximately once per second, e.g., as measured by 42 field syncs, which are each approximately 24.02 milliseconds (ms) apart from one another in an ATSC implementation. In other words, the quieting trigger pulse could be generated in response to a counting of 42 field syncs. Alternatively, transmitter quieting may be performed less frequently or more frequently, as well as at regular periodic intervals, irregular intervals, or intervals that are varied over time or based on user input, content types or channel conditions.

In this example technique for adaptive video encoding, it may be advantageous to reduce the bit rate for all or most of the frames in a GOP so that each frame provides space for insertion of null bytes, if necessary. The frames in the GOP and the packets in the transport stream at the modulator, in some cases, may not be easily or readily synchronized or aligned. By reducing the bit rate for all frames, the null bytes may be placed at any of a variety of points along the transport stream. These points may be coincident with data corresponding to any of the various frames, each of which provides space for the null bytes by the modulator. In this manner, it is not necessary to have alignment or synchronization between one of the video frames and the transport stream packets or segments processed in the modulator. Instead, the null bytes may be placed arbitrarily by the modulator and still align with empty space for one of the frames, because all of the frames are encoded at a reduced bit rate to provide empty space for insertion of null bytes by the modulator.

This approach may involve reduction of bit rate for all or most of the frames in a GOP, but provides flexibility for the modulator, driven or as required by the sensor, to place the null bytes and corresponding transmitter quieting interval at any of various points along the transport stream without the need for synchronization between the modulator and the video encoder. Although bit rate may be reduced for all or most of the video frames in a GOP, in some examples, an initial I frame in the GOP may be preferentially encoded with a higher bit rate than P and B frames in the GOP. Hence, all of the temporally predictive (P or B) frames may be encoded with a reduced bit rate, and the reduction in bit rate may be the same or different for each of those frames. An I frame may be reduced or not reduced in encoding bit rate, but may be allocated more bits than the P and/or B frames.

As an illustration, if each of a plurality of video frames in a GOP is ideally coded at a bit rate of X to support the normal bit rate requirements of the modulator, adaptive video coding may be applied to instead code the video frames at a bit rate of X minus Delta to provide space or headroom for insertion of null bytes by the modulator. The Delta may be subtracted in fixed, even amounts from the bit rate allocated to each frame. Alternatively, some frames may be allocated different Delta amounts of bit rate reductions, or the same Delta but different initial X bit rate levels. Again, in some examples, an I frame may be allocated more bit rate than P or B frames in the GOP. Also, in some examples, some P or B frames that are more temporally remote from the I frame may be allocated more bits than frames that are temporally close to the I frame. In each case, however, the purposeful reduction of bit rate for frames in the GOP may result in headroom or "slack" that can be used by the modulator to insert at least some of the null bytes necessary to increase the bit rate level of the data stream to a required level in a controlled manner coincident with a transmitter quieting interval.

Again, the insertion point for the null bytes and the transmitter quieting interval can be selected in a controlled manner by the modulator in response to a clock signal. In one example, the clock signal may be triggered by the counting of 42 field syncs, which is approximately equal to one second. Each frame in the video stream may be encoded at the reduced bit rate. For this example, there generally may be no need for coordination or timing between the video encoder and the modulator. Instead, the modulator receives, from a multiplexer, a transport stream that has a bit rate less than is necessary to support the required bit rate for the modulator. The modulator, when presented with this reduced bit rate transport stream, may then insert null bytes generally independently of the operation of the video encoder, providing a simple solution for incorporation of null bytes to support transmitter quieting intervals.

The modulator may insert null bytes at various points to fill space, but a segment comprising at least a portion of the null bytes may be intelligently placed at a position corresponding to the transmitter quieting interval. The length of the null bytes may be slightly larger than the length of the transmitter quieting interval. The modulator may insert the null bytes at regular or irregular intervals in the transport stream such that the transmitter is quieted during such intervals. In particular, in the presence of null bytes in the modulated output data stream, the transmitter may be turned off, providing a transmitter quieting interval. Spectrum sensing may be performed in some or all of the transmitter quieting intervals provided by the null bytes. In this manner, the modulator can quiet the transmitter at a point in the data stream where there is null data, which may result in reduced errors and loss of data.

The length of the null byte segments forming the transmitter quieting intervals may be selected to be sufficiently long for effective spectrum sensing but sufficiently short so that a receiver does not lose synchronization. A GOP ordinarily may be approximately 1 second in length and include 30 frames. By distributing a bit rate reduction over multiple frames in a GOP, there may be several different opportunities to add null bytes to the transport stream. However, the modulator may be configured to group at least some of the null bytes together, e.g., for a transport stream that includes a GOP, to form a null byte segment sufficient to support transmitter quieting interval of a length appropriate for spectrum sensing. In this manner, a null byte segment can be inserted in the transport stream approximately once per GOP, which may correspond to approximately once per second in response to a quieting trigger pulse, e.g., generated every 42 field sync signals (or a factor of once every 42 field sync signals) as discussed above. The resulting transport stream presents a higher effective bit rate and then can be modulated to produce an output modulated data stream with the required bit rate.

The length of the transmitter quieting interval, in some examples, may be not more than approximately 10 milliseconds in length, e.g., to prevent loss of synchronization by a receiver or violation of PCR (program clock reference) constraints. Also, in some examples, it may be desirable that the length of the transmitter quieting interval is not less than approximately 6 milliseconds, e.g., to provide a sufficient time for reliable spectrum sensing to be performed. To support transmitter quieting (i.e., "blanking") for approximately 6 to 10 milliseconds, it may be desirable to place a sufficient number of leading null bytes to flush an interleaver associated with the modulator, e.g., 4 milliseconds of null bytes, followed by approximately 6 to 10 milliseconds of null bytes for transmitter quieting. Quieting duration and frequency may vary if a different modulation method is used for transmission of the content.

In some examples, in addition to a leading segment of null bytes, it may be desirable to insert a trailing segment of null bytes, e.g., 4 milliseconds, 8 milliseconds or 12 milliseconds in length, after the transmitter quieting interval, although this may not be necessary. Data from the transport stream may be buffered just before the insertion of null bytes for the transmitter quieting interval to permit recovery of data after the transmitter quieting interval. In some examples, the length of time between the insertion of null bytes in advance of the transmitter quieting interval and the recovery of data from the buffer should be sufficiently short that a program clock reference (PCR) tolerance for the data is not violated.

In the above example of adaptive video coding, the video encoder may be configured to purposefully apply a reduced bit rate to all or most of the frames in a GOP in order to permit the modulator to introduce null bytes at any of a variety of locations to accommodate a transmitter quieting interval. In this sense, the video encoder is configured to indirectly contribute empty space to the transport stream to accommodate the transmitter quieting interval in the modulator data stream. The modulator does not necessarily coordinate creation of null bytes with the video encoder in the above example, but rather reacts to the reduced bit rate transport stream that results from the reduced bit rate video coding stream generated by the video encoder, and reacts to the periodic transmit quieting pulse to intelligently place null bytes for the transmitter quieting interval. In this example, a multiplexer associated with the modulator (e.g., a physical layer multiplxer) may be used to add non-essential data (e.g., miscellaneous data such as null data or redundant data) to a physical transport layer bitstream.

In another example, a video encoder may be configured to more directly provide empty space at targeted locations in a coded video bitstream. In particular, the video encoder may allocate a reduced bit rate to one frame or a small number of frames in a GOP, instead of all or most of the frames in the GOP. In contrast to the first example of adaptive video encoding, where the modulator and video encoder are relatively unsynchronized, in this second example, the modulator and video encoder may be synchronized, e.g., by a quieting trigger pulse, so that the modulator inserts segments of null bytes at a particular location or locations corresponding to the empty space created by the video encoder in the transport stream. In this case, one or a few frames in a GOP can be selectively coded at a reduced bit rate, instead of all or most of the frames.

For example, the video encoder may be configured to selectively allocate coding bits for a GOP such that a selected frame in the GOP receives all or a substantial portion of a bit rate reduction, relative to other frames. In this case, with synchronization between the video encoder and the modulator, the video encoder, rather than only the modulator, may actively select a position for insertion of null bytes by the modulator. The null bytes may be inserted in empty space created by the reduced bit rate applied to the selected video frame. As an illustration, the last frame in a GOP may be coded with a reduced bit rate relative to other frames in the GOP, creating space in the last frame for insertion of null bytes to support application of a transmit quieting interval. Selection of the last frame may be desirable, in some examples, as the last frame may precede the next I frame in the next GOP. In this example, a multiplexer associated with the encoder (e.g., an application layer multiplxer) may be used to add non-essential data (e.g., null data or redundant data) to an application layer bitstream. Again, this may require some synchronization so that the non-essential data in the application layer is properly aligned in the physical layer so as to correspond to a quieting interval when transmitter blanking occurs.

In general, for this second adaptive video encoding technique, many of the frames in the GOP may be coded at an ordinary bit rate, rather than a reduced bit rate, such that an application layer multiplexer does not necessarily need to insert null bytes in many of the frames to compensate for headroom that has been purposefully introduced into the transport stream. Rather, empty space may be present as a result of the reduced bit rate coding of a selected frame, such as the last frame in the GOP. The application layer multiplexer may then insert null bytes in creating the transport stream, and may insert the null bytes at a position corresponding to the empty space in the selected video frame, thereby supporting placement of a transmitter quieting interval coincident with, or within the area of, the empty space created in the data stream by the null bytes.

In this second example, frame level rate control can be used to selectively allocate coding bit rate to various frames in a rate control unit, such as a GOP. For example, a bit budget for a GOP may be allocated across a series of frames in the GOP with the knowledge that at least one selected frame will be a reduced bit rate frame. The reduced bit rate frame may be a short frame that carries video data at a reduced bit rate and provides space for empty data. The video encoder may assign a higher level of quantization to the frame to allocate a reduce bit rate. The bit rate allocated to the given frame for video coding may be reduced by approximately the amount of null data to be included in the frame.

The rate control techniques applied for the first adaptive video encoding technique described above, and this second adaptive video encoding technique, may work in association with other rate control techniques that control bit rate allocated to GOPs or individual frames based on channel conditions, video texture, motion, quality of service or other channel or video characteristics. The amount of null data may be selected as a function of the spectrum sensing interval, which may correspond substantially to the transmit quieting interval. In this manner, the video encoder may be configured, in effect, to apply packet shaping to accommodate a known instance of channel loss, i.e., a planned transmit channel outage for the transmit blanking interval during which the transmitter is turned off and the spectrum is sensed to determine channel availability.

In the first example technique, without synchronization, the modulator reacts to a reduced bit rate produced by the video encoder in the transport stream from the multiplexer by intelligently adding null bytes, including null bytes placed at a desired location corresponding to a transmitter quieting interval. In the second example technique, including synchronization between video encoding and modulation, the video encoder intelligently encodes a frame to selectively provide empty space for null bytes to be placed by the application layer multiplexer at a desired location in the transport stream corresponding to a transmitter quieting interval.

In some cases, reduced bit rate can be applied to audio data in addition or as an alternative to video data using adaptive coding according to the first unsynchronized example or the second synchronized example. If the application layer multiplexer is used to insert the non-essential data the transport stream from the multiplexer may use the entire available bit rate, but if the physical layer multiplexer is used, the output of the application layer multiplexer may include empty space from the video and/or audio encoder, providing space for insertion of null bytes in the data stream by a multiplexer associated with the modulator. The modulator then modulates the data stream to drive a RF transmitter.

Synchronization between the video encoder and the modulator may be based on a common clock signal, such as the quieting trigger pulse described above. For example, a clock signal can be used to align a GOP boundary with a field sync in the modulator data stream. The clock signal used to form the quieting trigger pulse may be an approximately once per second pulse derived from the field sync signals in the modulated transport stream. As discussed above, a clock pulse may be generated every 42 field syncs to trigger the modulator to insert a segment of null bytes and activate the transmitter quieting interval, and to align the GOP relative to the modulated transport stream. For example, the video encoder may align each GOP with the transmitter quieting interval such that the last frame in the GOP occurs substantially coincident with the trigger interval when the encoded video and audio are combined in the transport stream and converted into a data stream for the modulator. In some examples, time offsets from the GOP boundary may be used to synchronize the empty space in the last frame with the null bytes to be inserted by the modulator for the transmitter quieting interval.

The GOP corresponds to one second of video content, and 42 field syncs corresponds to approximately one second of video content. Because each data field between field syncs is actually 24.02 milliseconds, reliance on the field sync signals may create drift over time with respect to the one-second length of the GOP. In particular, over time, the field syncs in the transport stream may not line up exactly with a GOP boundary. However, the GOP can be realigned, if needed, periodically or opportunistically, to recalibrate the one-second GOP to the once per second quieting trigger pulse. By aligning the GOP to the field sync-based, quieting trigger pulse, the empty space in a selected encoded video frame, such as the last frame in the GOP, can be aligned with the null bytes inserted by the modulator and the transmitter quieting interval.

In a third example of adaptive video coding to support a transmitter quieting interval, the video encoder and modulator may be designed so that the video encoder encodes frames at a bit rate that is more closely matched to the bit rate necessary to produce, when multiplexed with encoded audio, ancillary data and PSIP data, a transport stream sufficient to approximate the bit rate required for modulator operation. In this example, instead of reducing the bit rate of all or most of the frames in a GOP to support unsynchronized placement of null bytes by the modulator, and instead of synchronizing video coding with modulation to support placement of null bytes by the modulator, the video encoder may encode null bytes in the encode video data bitstream. In this case, the video encoder and modulator still may be synchronized, e.g., using a quieting trigger pulse generated from field syncs, as described above. However, in this third example of adaptive video coding, the video encoder directly inserts the null bytes by encoding the null bytes instead of inserting null bytes via a multiplexer at the encoder or a multiplexer at the modulator. In this case, at a time coincident with the transmitter quieting interval, the modulator receives a segment of null bytes from the transport stream and simply modulates them like other transport stream data, thereby producing a transmitter quieting interval with in the segment of null bytes. Accordingly, the encoded data essentially drives transmitter quieting insofar as the null data may be received by the transmitter causing the transmitter to quite since the data is null.

Figure 17:
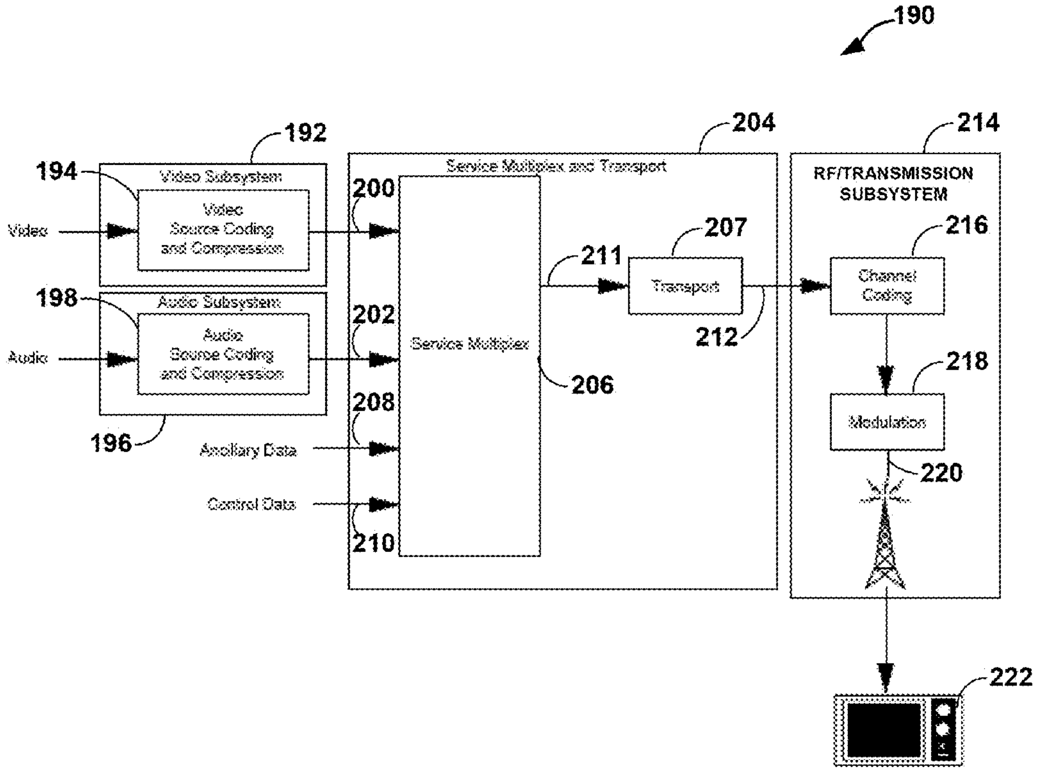
FIG. 17 is a block diagram illustrating a multimedia communication system that may be suitable for application of the various adaptive video encoding techniques described in this disclosure.

FIG. 17 is a block diagram illustrating a multimedia communication system 190 that may be suitable for application of the various adaptive video encoding techniques described in this disclosure. System 190 of FIG. 17 will be described with reference to the ATSC standard. However, the techniques described in this disclosure may be applied to other standards. An ATSC system may be designed for continuous transmission. ATSC represents a well established architecture and design framework suite for DTV broadcast applications. As shown in FIG. 17, system 190 may include a video subsystem 192 including a video source coding and compression unit 194 ("video source coding and compression 194"), which may alternately be referred to as a video encoder. System 190 may also include an audio subsystem 196 including an audio source coding and compression unit 198 ("audio source coding and compression 198"), which may alternately be referred to as an audio encoder. Video and audio subsystems 192, 196 may be configured to support MPEG-2 coding processes, which will be described for purposes of example but without limitation as to other types of coding processes, such as ITU-T H.264. Video and audio subsystems 192, 196 produce encoded video data 200 and audio data 202, respectively, for delivery to a service multiplex and transport subsystem 206 ("service multiplex and transport 204").

As further shown in FIG. 17, service multiplex and transport subsystem 204 may include a service multiplex unit 206 ("service multiplex 206") and a transport unit 207 ("transport 207"). Service multiplex unit 206 multiplexes coded video data 200 and coded audio data 202 with ancillary data 208 and program/control data 210 (e.g., PSIP data) to produce multiplexed data 211. Transport unit 207 receives multiplexed data 211 and produces a transport stream 212, which may represent, as one example, an MPEG-2 transport stream. The MPEG-2 transport stream (TS) is defined by a communication protocol for multiplexing audio, video and other data. The transport stream encapsulates packetized elementary streams (PES) and other data. As mentioned elsewhere in this disclosure, the MPEG-2 TS is defined in MPEG-2, Part 1, Systems (ISO/IEC standard 13818-1). With further reference to FIG. 17, system 190 may further include a radio frequency (RF)/transmission subsystem 214 ("RF/transmission subsystem 214"), which may include a channel coding unit 216 ("channel coding 216") and a modulation unit ("modulation 218") that respectively code and modulate multiplexed transport stream 212 to produce an output signal 220 to drive a transmitter coupled to an antenna. A receiver, such as a television 222 or other device, is equipped to receive signals transmitted by the RF/transmission subsystem 214, decode the signals to reproduce audio and video data, and present the audio and video data on an audio and video output device. The structure and operation of an ATSC system, e.g., as represented in FIG. 17 and described elsewhere in this disclosure, may generally conform to ATSC DTV Standard (A/53) adopted by the FCC. The ATSC DTV Standard defines systems, PHY, service MUX and transport, video and audio layers for an ATSC architecture. The ATSC DTV Standard A/53 is incorporated by reference in this disclosure in its entirety.

In an ATSC or other architecture, systems, video and audio having a timing model in which end-to-end delay from signal input to an encoder to the signal output from a decoder is generally constant. This delay is the sum of encoding, encoder buffering, multiplexing, communication or storage, demultiplexing, decoder buffering, decoding, and presentation delays. As part of this timing model, video pictures and audio samples are presented exactly once. Synchronization among multiple elementary streams is accomplished with Presentation Time Stamps (PTS) in the transport streams. Time stamps are generally in units of 90 kHz, but the system clock reference (SCR), the program clock reference (PCR) and the optional elementary stream clock reference (ESCR) have extensions with a resolution of 27 MHz.

Figure 18:
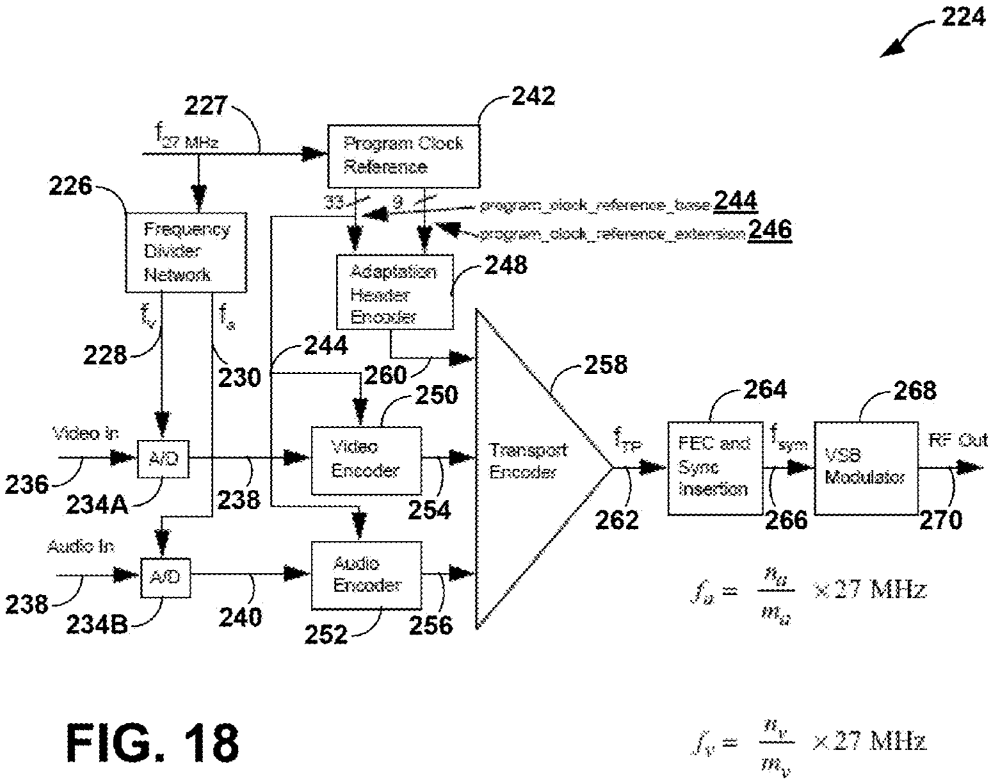
FIG. 18 is a block diagram illustrating timing in an example multimedia communication system having an ATSC architecture.

FIG. 18 is a block diagram illustrating timing in an example multimedia communication system 224 having an ATSC architecture. As shown in FIG. 18, a frequency divider network 226 receives a 27 MHz clock signal 227 ("$f_{27\ MHz}$ 228") and divides it to produce video clock signal 228 ("$f_v$ 228," which is derived according to the following equation presented in FIG. 18: $n_v/m_v$*27 MHz) and audio clock signal 230 ("$f_a$ 230," which is derived according to the following equation $n_a/m_a$*27 MHz, as shown in the example of FIG. 18) for application to analog-to-digital (A/D) converters 232A, 232B ("A/D 232A," and "AD 232B") provided to convert an analog video signal 234 ("Video In 234") and an analog audio signal 236 ("Audio In 236") to corresponding digital signals 238, 240. A program clock reference (PCR) unit 242 ("program clock reference 242") receives 27 MHz clock signal 227 and generates a program_clock_reference_base clock signal 244 ("program_clock_reference_base 244") and a program_clock_reference_extension clock signal 246 ("program_clock_reference_extension 246") that are provided to an adaptation header encoder unit 248 ("adaption header encoder 248"). These signals 244, 246 may collectively be referred to as the "PCR." In some instances, either one of signals 244, 246 may be referred to as the "PCR." Regardless of which signals 244, 246 form the PCR, the PCR represents a periodically transmitted value that provides a sample of the system time clock in the encoder. The PCR may be used to demultiplex packets from the transport stream and properly synchronize audio and video.

Video encoder 250 and audio encoder 252 receive the PCR base clock signal, i.e., program_clock_reference_base clock signal 244 in this example, and digital video and audio signals 238, 240, respectively. As further shown in FIG. 18, video and audio encoders 250, 252 generate encoded video and audio data 254, 256, respectively, that are applied to a transport encoder 258, e.g., an MPEG-2 TS encoder. Transport encoder 258 receives output 260 of adaptation header encoder unit 248 and the outputs of the video and audio encoders (i.e., encoded video data 254 and encoded audio data 256 in the example of FIG. 18) and produces a multiplexed transport stream 262 at a frequency $f_{TP}$. Hence, transport encoder 258 may include a multiplex (MUX) unit that combines encoded audio and video data 254, 256, as well as ancillary data and program/control data (e.g., PSIP data), which is referred to as output 260 in the example of FIG. 18, from adaptation header encoder 248 in the example of FIG. 18. A forward error correction (FEC) and synchronization (Sync) insertion unit 264 ("FEC and sync insertion 264") applies FEC data and inserts synchronization markers in the transport stream 262, producing an output symbol stream 266 at a frequency $f_{sym}$. Vestigial sideband (VSB) modulator 268 ("VSB modulator 268") receives the output of the transport encoder as modified by FEC and synchronization unit 264 and produces an RF output signal 270 ("RF Out 270") to drive an RF transmitter and antenna for wireless transmission of the modulated signal.

Figure 19:
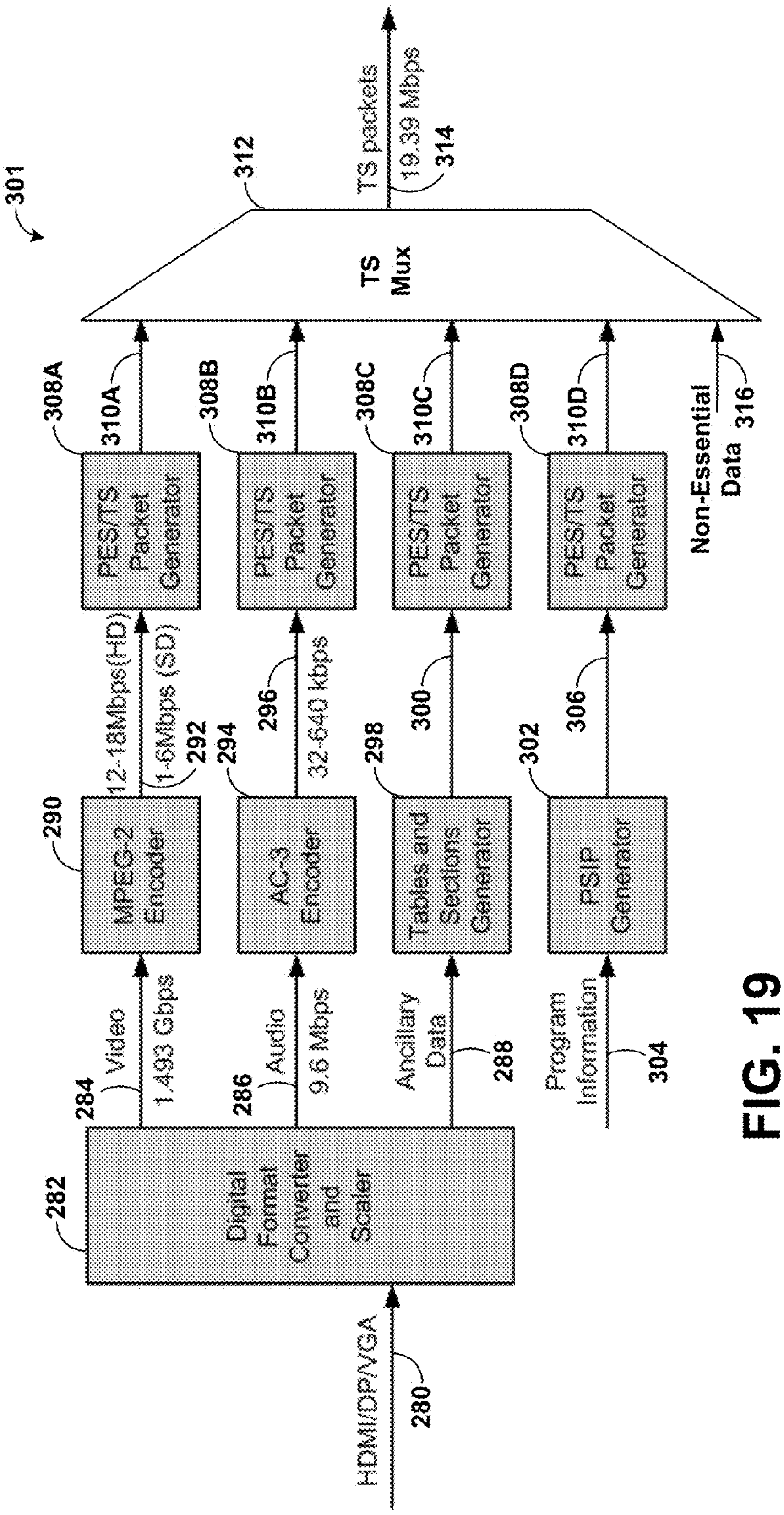
FIG. 19 is a block diagram illustrating data flow in an example multimedia communication system having an ATSC architecture.
Figure 20:
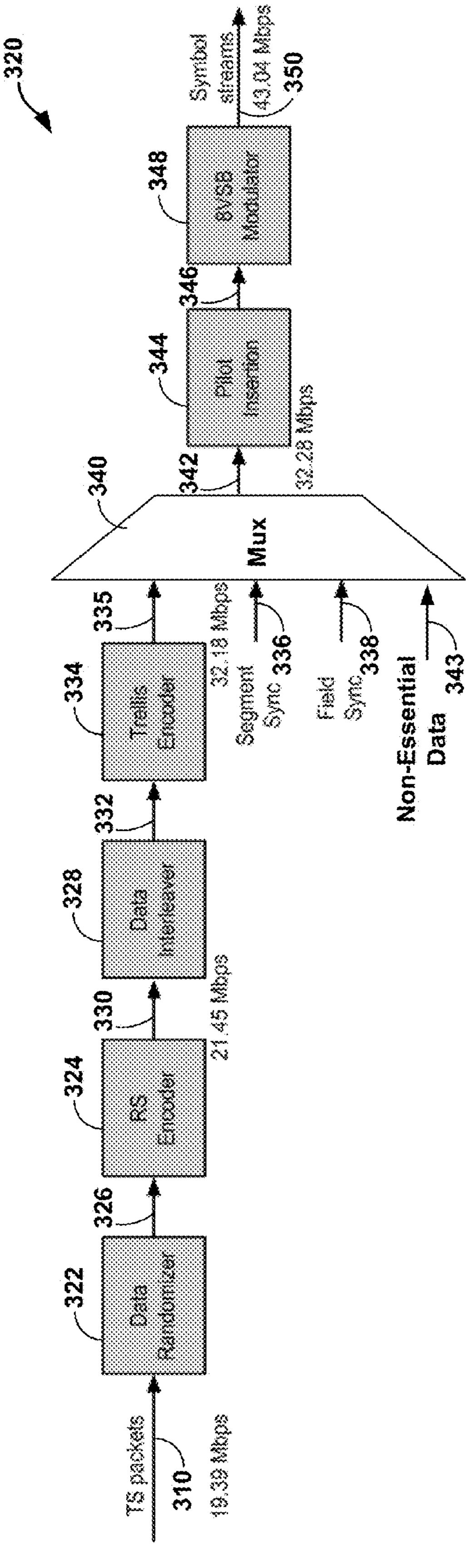
FIG. 20 is a block diagram further illustrating data flow within an ATSC modulator that receives the output of the TS MUX unit of FIG. 19.

FIG. 19 is a block diagram illustrating data flow in an example multimedia communication system 301 having an ATSC architecture. Multimedia communication system 301 may be referred to as an encoding unit, which provides encoded output to a modulator unit such as that shown in FIG. 20 and described below. FIGS. 19 and 20 are merely exemplary of ATSC, and for other cases, the bitrates, data rates, sync periods, and other features may vary depending on broadcast format or standard used. In the example of FIG. 19, source video and audio data 280, i.e., HDMI, DP, or VGA data 280 ("HDMI/DP/VGA 280") in this example, is formatted and scaled, if necessary, by a digital format converter and scaler unit 282 ("digital format converter and scaler 282"). Digital format converter and scaler unit 282 produces video data 284 (e.g., at 1.493 Gbps), audio data 286 (e.g., at 9.6 Mbps) and ancillary data 288. In this example, an MPEG-2 encoder 290 encodes video data 284 to produce encoded video data 292, which may represent high definition (HD) encoded video data encoded at 12-18 Mbps or standard definition (SD) encoded video data at 1-6 Mbps. An AC-3 encoder 294 encodes audio data 286 to produce encoded audio data 296 at 32-640 kbps. A tables and sections generator 298 processes ancillary data 288 to produce processed ancillary data 300 for incorporation in the transport stream. Although MPEG-2 and AC-3 encoding are described for purposes of example, other video and/or audio encoding techniques may be used. As further shown in FIG. 19, a program and system information protocol (PSIP) generator 302 ("PSIP generator 302") may be provided to process program information 304 to produce processed program information 306 for incorporation in the transport stream. Respective packetized elementary stream/transport stream (PES/TS) packet generators 308A-308D ("PES/TS packet generators 308") process the incoming encoded video data 292, encoded audio data 296, processed ancillary data 300 and processed program information 306 to produce individual transport packets 310A-310D ("transport packets 310"). A transport stream multiplexer (TS MUX) unit 312 ("TS/MUX 312") multiplexes transport packets 310 from PES/TX packet generators 308 to produce a transport stream 314 including transport stream (TS) packets 310 at a rate of 19.39 Mbps, which is the data rate used by the components of the ATSC modulator. TX MUX unit 312 also receives non-essential data 316, which may represent null data or redundant data, that TX MUX unit 312 inserts or interleaves into TS packets 310 that form transport stream 314.

FIG. 20 is a block diagram further illustrating data flow within an ATSC modulator 320 that receives the output, i.e., TS packets 310 that form transport stream 314 in this example, of TS MUX unit 312 of FIG. 19. ATSC modulator 320 may also be more generally referred to as a modulator unit and the techniques described herein may be used in many different wireless contexts and are not limited to use in the ATSC context. As shown in FIG. 20, the ATSC modulator 320 may include a data randomizer 322 that receives transport stream (TS) packets 310 at 19.39 Mbps, a Reed-Solomon (RS) encoder 324 ("RS encoder 324") that receives randomized data 326 and applies Reed-Solomon encoding for forward error correction (FEC), and a data interleaver 328 that applies data interleaving to data 330 output from Reed-Solomon encoder 324 to produce interleaved blocks of data 332 (which may also be referred to as "interleaved data 332").

Interleaved data 332 is applied to a trellis encoder 334, which produces output data 335 that is then combined with segment sync markers 336 and field sync markers 338 by a physical layer multiplexer 340 ("MUX 340") to produce a modulated output stream 342 at 32.28 Mbps. Multiplexer 340 also receives non-essential data 343, which may represent null data or redundant data, that multiplexer 340 inserts or interleaves into output data 335, segment sync markers 336 and field syncs 338 to form modulated output stream 310. Pilot insertion module 344 performs pilot insertion on modulated output stream 342 to produce a modified modulated output stream 346. Following pilot insertion an 8SVSB modulator 348 produces a symbol stream 350 at 43.04 Mbps. In general, 8SVSB modulator 348 adds null packets to the data stream to ensure that the data rate matches the 19.39 Mbps data rate requirement of the modulator. Modulator 348 divides the data stream into packets of 188 bytes in length. In some instances, twenty additional bytes are added to each segment for Reed-Solomon RS coding.

Figure 21:
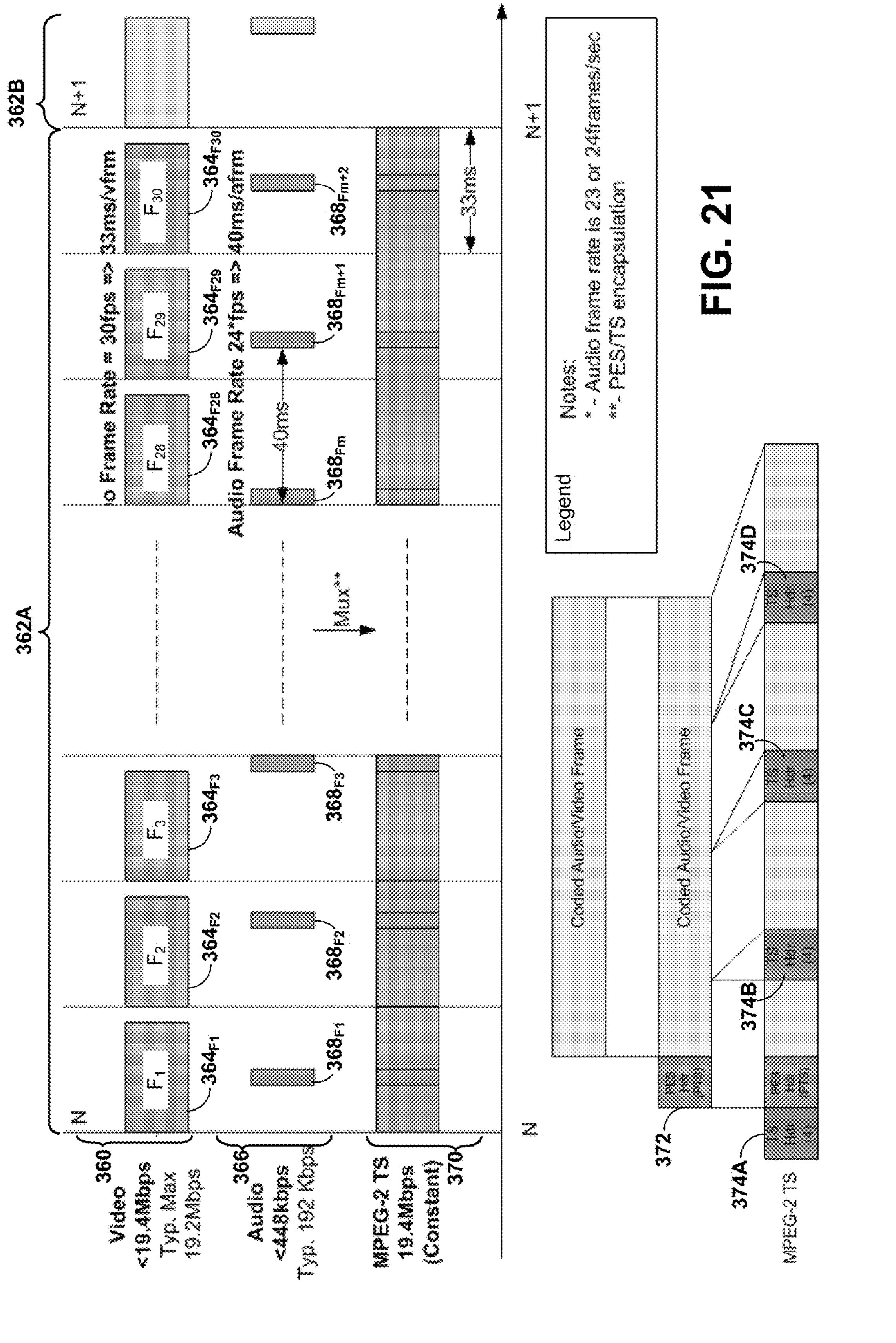
FIG. 21 is a timing diagram illustrating ATSC data rates.

FIG. 21 is a timing diagram illustrating ATSC data rates. As shown in the example of FIG. 21, encoded video data 360 is arranged in a group of pictures (GOP) 362A, which is denoted by the letter 'N' in the example of FIG. 21, and encoded at some rate less than or equal to 19.4 Mbps, but typically subject to a maximum rate of 19.2 Mbps. N designates a first GOP, and N+1 designates a next GOP 362B. The first frame in a GOP is usually an I Frame, which is followed by series of P or B frames. Each GOP, including GOPs 362A, 362B ("GOPs 362"), comprises a plurality of frames, where for example GOP 362A comprises video frames $\mathbf{364}_{F1}$-$\mathbf{364}_{F2}$ ("video frames 364"), and can be considered a rate control unit in the sense that a coding bit budget may be allocated to each GOP and then portions of the bit budget can be distributed among the frames, such as frames 364, in the GOP. For an MPEG-2 implementation, at 30 frames per second (fps), the GOP may have 30 frames. Hence, each GOP corresponds approximately to one second of video content, and each frame corresponds to approximately 33 milliseconds of video content. Audio data 366 is encoded at some rate less than or equal to 448 Kbps, and typically at 192 Kbps. In the example of FIG. 21, the audio frame rate is assumed to be 23 or 24 frames per second. Audio frames $\mathbf{368}_{F1}$-$\mathbf{368}_{Fm+2}$ ("audio frames 368") are multiplexed with the data from video frames 364 to produce an MPEG-2 transport stream (TS) 370, ordinarily at a constant rate of 19.4 Mbps. Each multiplex unit is typically 33 ms in length, where multiplex units are shown in the example of FIG. 21 as vertical lines that are separated by 33 ms. The MUX operation may further include packet elementary stream/transport stream (PES/TS) encapsulation. As further shown in FIG. 21, a PES header 372 with a presentation time stamp (PTS) may be added to each coded audio/video frame presented to the TS multiplexer. The TS multiplexer then adds transport stream headers 374A-374D to divide the coded audio/video frame into TS packets. In the example of FIG. 21, the audio frame rate may be approximately 23 or 24 frames per second, although other frame rates could be used consistent with this disclosure. PES/TS encapsulation in the multiplexing.

Figure 22:
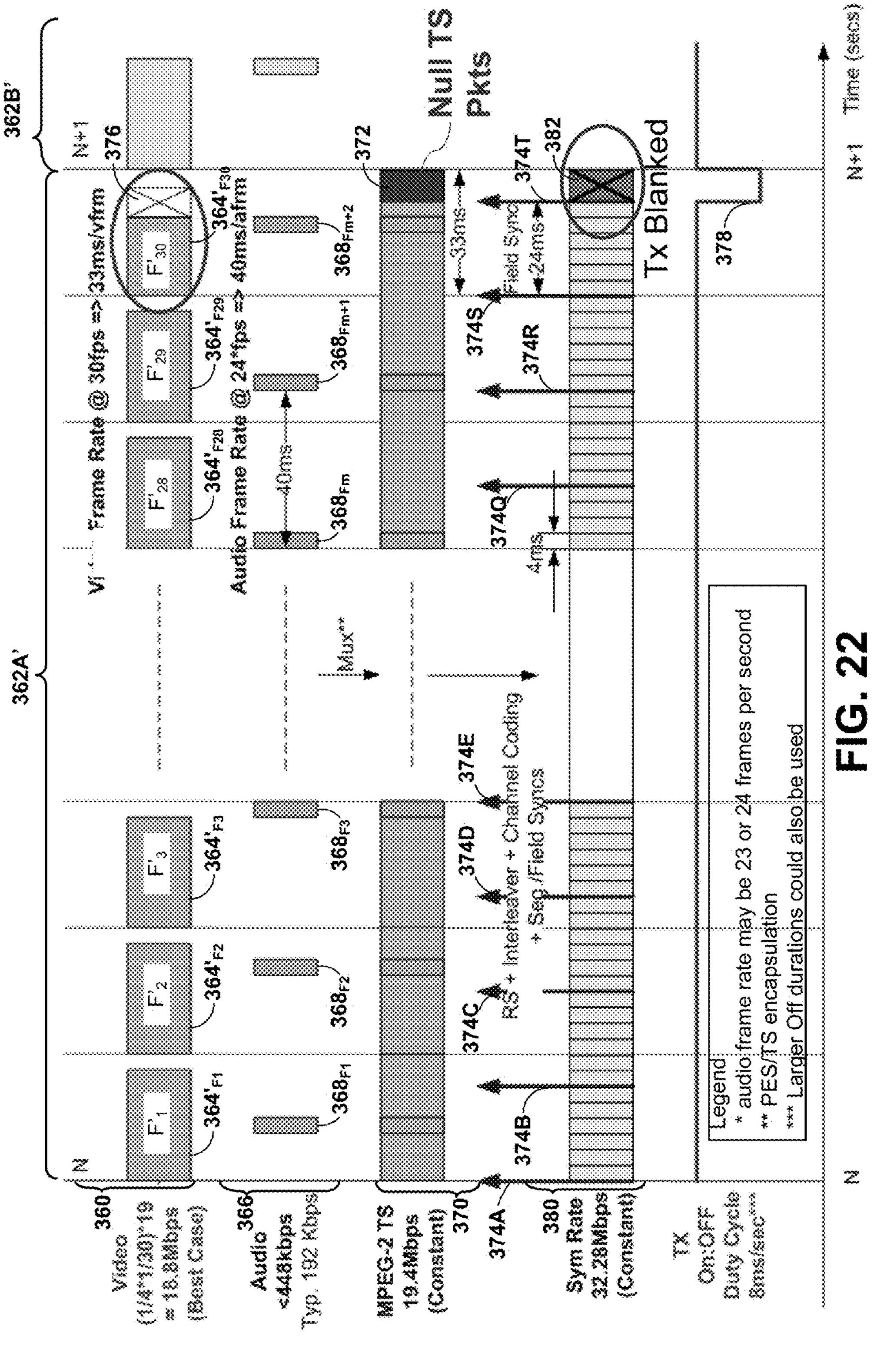
FIG. 22 is a timing diagram illustrating an example of transmitter quieting using adaptive video encoding.

FIG. 22 is a timing diagram illustrating an example of transmitter quieting using adaptive video encoding. FIG. 22 may be consistent with a scenario in which an application layer MUX (e.g., a MUX associated with the encoder) introduces non-essential data into the encoded and multiplexed transport bitstream. FIG. 22 shows timing for video encoding at 18.8 Mbps, audio encoding at 192 Kbps, MPEG-2 TS at 19.4 Mbps, modulation at a symbol rate (Sym Rate) of 32.28 Mbps, and selective deactivation of the transmitter (TX) at an ON/OFF duty cycle of 8 milliseconds per second to blank or quiet the transmitter during a spectrum sensing operation. In general, FIG. 22 may correspond to application of the second adaptive video encoding technique described above, in which the modulator, such as ATSC modulator 320 shown in the example of FIG. 20, and video encoder, such as video encoder 250 shown in the example of FIG. 18, may be synchronized so that TX MUX 312 may insert null bytes 372 for a transmitter quieting interval within empty space created in a reduced bit rate encoded video frame. In the example of FIG. 22, adaptive video encoding is applied to apply a reduced bit rate to the encoding of frame $\mathbf{364'}_{F30}$, which is the last frame in GOP 362A' in this example. The reduced bit rate could be applied to a selected frame other than the last frame.

GOP 362A' includes thirty frames $F'_1$ through $F'_{30}$, which are shown in the example of FIG. 22 as frames $\mathbf{364'}_{F1}$-$\mathbf{364'}_{F30}$ ("frames 364"), for an implementation in which video is coded at thirty frames per second. Frames 364' may be similar in format and structure to frames 364 shown in the example of FIG. 21 but differ in content or other aspects. In other implementations, higher (e.g., 60 or 120 fps) or lower (e.g., 15 fps) frame rates may be provided. It may be desirable in some examples to use last frame $\mathbf{364'}_{F30}$ as it is closest to GOP 362A' boundary. In next GOP 362B', an I frame will refresh an existing scene or present a scene change. Accordingly, the impact of encoding last frame $\mathbf{364'}_{F30}$ with a reduced coding bit rate may be less significant than the impacts of other frames 364'. However, other frames 364' could be selected for reduced bit rate encoding.

Selection of the last frame in a GOP or other rate control unit for reduced bit rate encoding may be desirable, as described above. In some examples, the frame may ideally be at a scene change boundary. Although the selected frame may have a relatively poor quality due to the reduced bit rate needed to provide empty space for insertion of null bytes, such as null bytes 372, by TS MUX 312, the presence of only a single poor quality frame may not be noticeable to a human viewer. In particular, given human temporal perception, a viewer may not readily discern a drop in the quality of the selected frame in the presence of temporally adjacent frames.

However, human spatial perception tends to be sharper. As a result, it is possible that a human viewer could perceive spatial artifacts such as blockiness in the reduced bit rate frame. For this reason, if spatial quality is substantially degraded, it may be desirable to encode the selected frame with different modes instead of encoding at the reduced bit rate. The result may be the same in terms of providing empty space of null bytes to support a transmitter quieting interval. However, different coding modes may be selectively activated when spatial distortion exceeds a threshold.

If there is substantial blockiness or other spatial distortion, for example, video encoder 250 may apply any of a variety of alternate coding modes to the selected frames, instead of encoding the frame. Examples of alternate coding modes or techniques may include declaring the selected frame to be a big frame, dropping the frame, designating the frame as a skipped frame, or adding skip modes for decoding of selected macroblocks in the frame. In each case, the decoder may apply frame repetition, frame rate up-conversion (FRUC), or other frame substitution techniques to produce a frame in place of the selected frame. Alternatively, if the selected frame is encoded, even with a low quality, the decoder will simply decode the frame.

Given a bit rate allocated to GOP 362A', the video encoder may selectively allocate portions of the bit rate to frames 364' in GOP 362A', applying frame level rate control for frames 364' in GOP 362A'. Video encoder 250 may allocate amounts of coding bit rate relatively evenly among frames 364', with the exception of one selected frame, such as last frame $364'_{F30}$. Another exception may be the allocation of additional bits to an I frame relative to P frames in GOP 362A'. Alternatively, different bit rates may be allocated to frames 364' in GOP 362A' according to any of a variety of bit rate allocation schemes, but one selected one of frames 364' may be selectively encoded with a reduced bit rate that overrides a bit rate that might otherwise be allocated to the selected one of frames 364'.

As an illustration, video encoder 250 could allocate X bits to an I frame at the beginning of GOP 362A', such as frame $364'_{F1}$, Y bits each to each of the P or B ones of frames 364' in GOP 362A' with the exception of a selected frame, and Z bits to the selected frame (e.g., last frame $364'_{F30}$), where Y is less than X, Z is less than Y, and Z is selected to provide empty space in selected frame $364'_{F30}$ for insertion of null bytes 372 to support application of a transmitter quieting interval. In other examples, instead of applying the same fixed amounts of bits to the P or B ones of frames 364' in GOP 362A', the video encoder may apply any of a variety of frame level rate control schemes, as mentioned above, to allocate different amounts of bits, e.g., based on texture, complexity, motion, channel conditions, or the like.

In each case, however, at least one of frame 364' may be selected to have a reduced bit rate, relative to other ones of frames 364', in order to provide empty space for insertion of null bytes 372 by TS MUX 312 (or another application layer MUX) in transport stream 370. Again, the selected one of frames 364' may be last frame $364'_{F30}$ in GOP 362A', or some other one of frame 364' in GOP 362A'. In other examples, multiple ones of frames 364' in GOP 362A' may have reduced coding rates to provide a cumulative amount of space for insertion of null bytes 372 to support application of a transmitter quieting interval. Also, multiple ones of frames 364' in GOP 362A' could be encoded at a reduced bit rate to provide empty space for null bytes 372 if it is desired that spectrum sensing be performed more than once per second. In many cases, a single spectrum sensing operation per second may be sufficient, such that only a single transmitter quieting interval is needed per second. In some examples, spectrum sensing may not be performed every second, but rather at n-second intervals, where n is a predetermined number typically less than 60 to permit spectrum sensing at least once per minute, as required by applicable regulations.

With further reference to FIG. 22, arrows in the Sym Rate stream denoted 374A-374T in the example of FIG. 22 indicate field syncs 374A-374T ("field syncs 374") for data fields in the data stream for the modulator, e.g., with RS, interleaver, and channel coding operations. Use of letters to denote individual field syncs 374 are not intended to indicate a actual number of field sync 374. That is, field sync 374E does not necessarily indicate the fifth field sync, just as field sync 374Q does not indicate the seventeenth field sync. Rather, letters are used generally throughout this disclosure so that one element may be distinguished from another. Consequently, use of letters to denote individual elements should not be construed as indicating a position or location with respect to other similarly labeled elements, unless context indicates that such construction is appropriate. Larger or smaller durations may be used for the blanking intervals in different examples.

In any event, frame $364'_{F30}$ is followed by an empty space 376 (indicated by the X-out region in the example of FIG. 22) that propagates into multiplexed MPEG-2 TS 370 and provides room for introduction of null TS packets 372. In particular, modulator 320 and video encoder 250 may be synchronized with a quieting trigger pulse 378, and any necessary offsets, as described above. TX MUX 312 (or transport encoder 258 in FIG. 18) may respond to quieting trigger pulse 378 by inserting Null TS packets 372 ("Null TS Pkts 372") into TS data stream 370. Null TS packets 372 coincide with empty space 376 propagated through the multiplexer from video encoder 250.

An application layer MUX, such as transport encoder 258 or TS MUX 312 may introduce null bytes in the ordinary course if TS 370 is not running at a rate sufficient to support the rate required by modulator 320. In this example, however, transport encoder 258 or TS MUX 312 is inserting null bytes as Null TS packets 372 in a controlled manner at a relatively precise location in the data stream that coincides with both empty space 376 in the encoded video data 360 and a transmit quieting interval in modulator 320. Modulator 320 modulates the resulting data stream to produce the Sym Rate stream 380, with Null data 382 (the X-out region shown in the example of FIG. 22 in Sym Rate stream 380) corresponding to Null TS packets 372 in transport stream 370. The transmitter may be turned on and off with a duty cycle of 8 milliseconds/second. In particular, the transmitter may be turned OFF at a time corresponding to null data 282 in Sym Rate data stream 380 from modulator 320. Null data could also be replaced with other types of non-essential data, such as redundant data or other data that is non-essential to a decoding process.

As further shown in FIG. 22, larger OFF durations of the transmitter may be possible, e.g., in excess of 8 ms. For example, a transmitter quieting interval of 6 ms to 10 ms in length may be used. In general, there may be no need for significant changes to the Video Buffering Verifier (VBV) buffer in this example. Also, in various examples, there may be little or no latency impact and no valid data lost with application of this adaptive video encoding technique. The empty space is aligned with Null bytes or data 382 and transmitter OFF state for the transmitter quieting interval. As a result, little or no valid data is sacrificed to perform the spectrum sensing operation.

Figure 23:
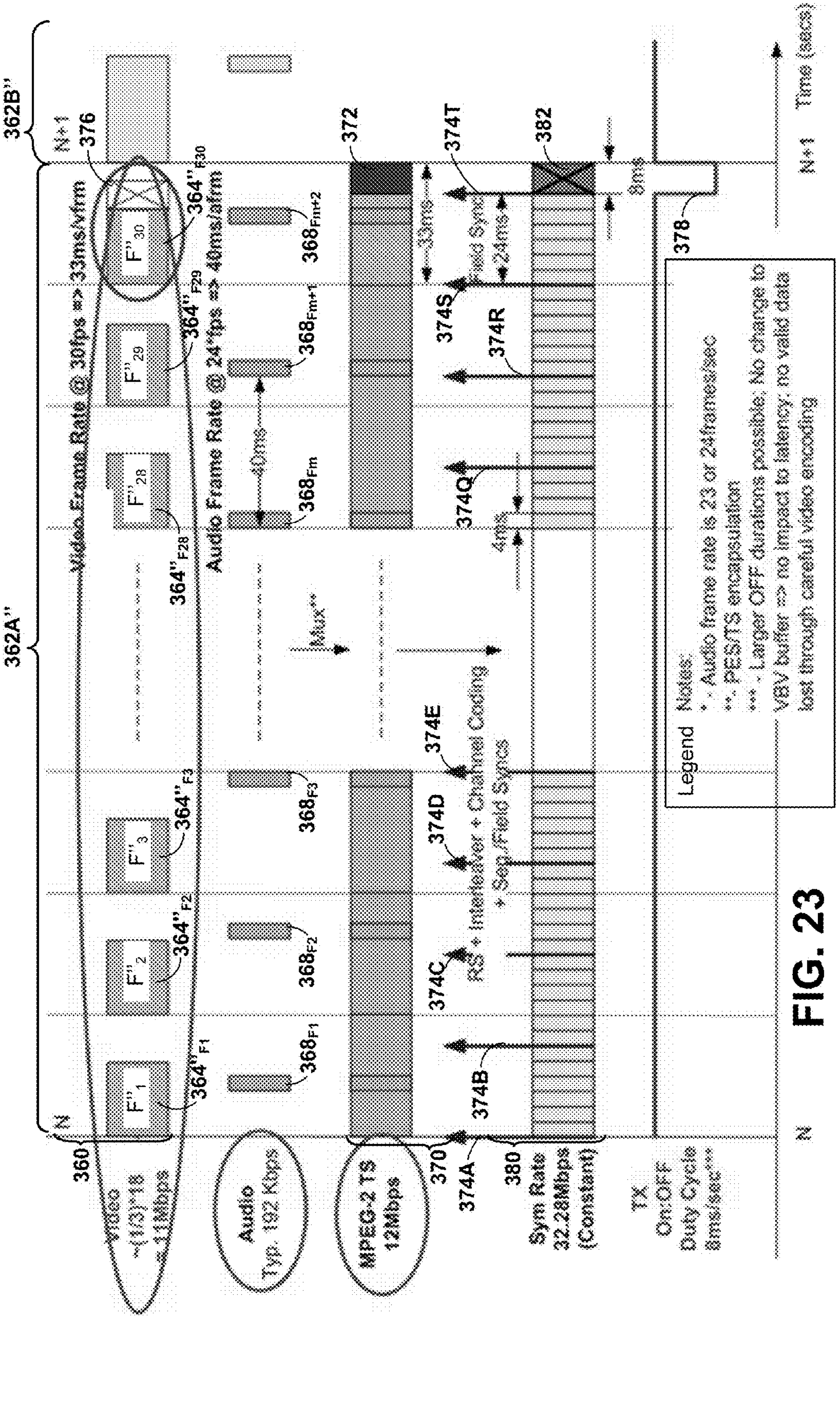
FIG. 23 is a timing diagram illustrating another example of transmitter quieting using adaptive video encoding.

FIG. 23 is a timing diagram illustrating another example of transmitter quieting using adaptive video encoding. FIG. 23 may be consistent with a scenario in which a physical layer MUX (e.g., a MUX associated with the modulator) introduces non-essential data. FIG. 23 shows timing for video encoding at a reduced bit rate of 11 Mbps, audio encoding at 192 Kbps, MPEG-2 TS at a reduced bit rate of 12 Mbps, modulation at a symbol rate (Sym Rate) of 32.28 Mbps, and selective deactivation of the transmitter (TX) at a duty cycle of 8 milliseconds per second to blank or quiet the transmitter during a spectrum sensing operation. In general, FIG. 23 is similar to the example of FIG. 22 but illustrates a scenario in which the physical layer MUX rather than an application layer MUX introduces null data or other non-essential data. In this example, a reduced bit rate is applied at the video encoder to all or most of frames $364''_{F1}$-$364''_{F30}$ ("frames 364") in a GOP 362A", so that the modulator, such as modulator 320 shown in the example of FIG. 20, may insert null bytes 382 for a transmitter quieting interval within empty space created at various locations in TS 370. Frames 364" may be similar in format and structure to frames 364 shown in the example of FIG. 21 but differ in content or other aspects. The adaptive video coding and null bytes 382 may be applied for every GOP 362A", 362B", ect. (which may be collectively referred to as GOP 362" to capture both those GOPs 362A", 362B" illustrated in FIG. 23 as well as GOPs 362" not explicitly illustrated in FIG. 23 for ease of illustration purposes), or selectively for some GOPs 362" and not others, e.g., according to a spectrum sensing duty cycle, which may change from time to time under user control or according to monitored conditions or system parameters.

In the example of FIG. 23, adaptive video encoding is performed to apply a reduced bit rate to the encoding of all of frames 364". As a result, each frame in GOP 362A" creates empty space for insertion of null packets 372 by modulator 320. There is generally no need to synchronize the video encoder, such as video encoder 250 shown in the example of FIG. 18, and modulator 320 to place null bytes at a particular location. Instead, there are multiple locations for insertion of null bytes because multiple ones of frames 364", instead of a single selected one of frames 364", introduce empty space in to the TS data stream. As discussed above, reduced bit rate coding can be applied to all of frames 364" in GOP 362A", or a substantial number of frames 364" in GOP 362A", with the possible exception of an initial I frame of frames 364" in GOP 362A". Also, the amount of bit rate allocated to each of frames 364" may be the same or different. However, it may be desirable that all or most of frames 364" provide at least a minimum amount of empty space to permit insertion of null bytes 382 for transmitter quieting.

As in the example of FIG. 22, the example of FIG. 23 may permit larger OFF durations of the transmitter, e.g., in excess of 8 ms. For example, a transmitter quieting interval of 6 ms to 10 ms in length may be used. In general, there may be no need for significant changes to the Video Buffering Verifier (VBV) buffer in this example. Also, in various examples, there may be little or no latency impact and no valid data lost with application of this adaptive video encoding technique. Again, the empty space is aligned, or synchronized via a common clock, with the Null bytes and transmitter OFF state for the transmitter quieting interval, such that little or no valid data is sacrificed to perform the spectrum sensing operation.

Although the first adaptive video coding technique illustrated in FIG. 23 may readily support transmitter quieting without loss of data, the reduced data rate of encoded video 360 (e.g., at 11 Mbps) and resulting TS 370 (e.g., at 12 Mbps) could impact performance in terms of video quality. The use of reduced bit rates may avoid or reduce the need to buffer data from video encoder 250 for incorporation in TS 370. Although 11 Mbps may be approximately a minimum level to support HD video at 720P, it may be desirable to provide a higher bit rate for encoded video 360. In some examples, the video coding bit rate could be increased while still avoiding loss of data due to transmitter quieting if the input buffer depth of the encoder, such as video encoder 250, is increased. This modification may add some latency, but may provide enhanced quality while still keeping the quiet period within a null byte segment of less than one data field (e.g., 24.02 seconds defined by successive field syncs). Hence, increased buffer depth at the encoder, e.g., to accommodate two, three or more frames, may support an implementation with higher video encoding bit rates. For video clip playback, the added latency may be tolerable. For more interactive media applications, such as online gaming, added latency may be undesirable. Accordingly, there may be different trade-offs between latency and quality for different media applications, and hence different buffer depth settings that may be applied. Buffer depths and encoding parameters may be adjusted, in some cases, to control latency in multimedia demodulation, decoding and playback. In some cases, buffer depths and/or encoding parameters may be configured (or possibly adjusted dynamically) so as to achieve desired latency even in the presence of transmit blanking Transmit blanking, for example, may add additional latency to the demodulation, decoding and playback, and techniques of this disclosure may account for this additional latency with commensurate changes in buffer depth setting and/or encoding parameters to reduce latency.

Figure 24:
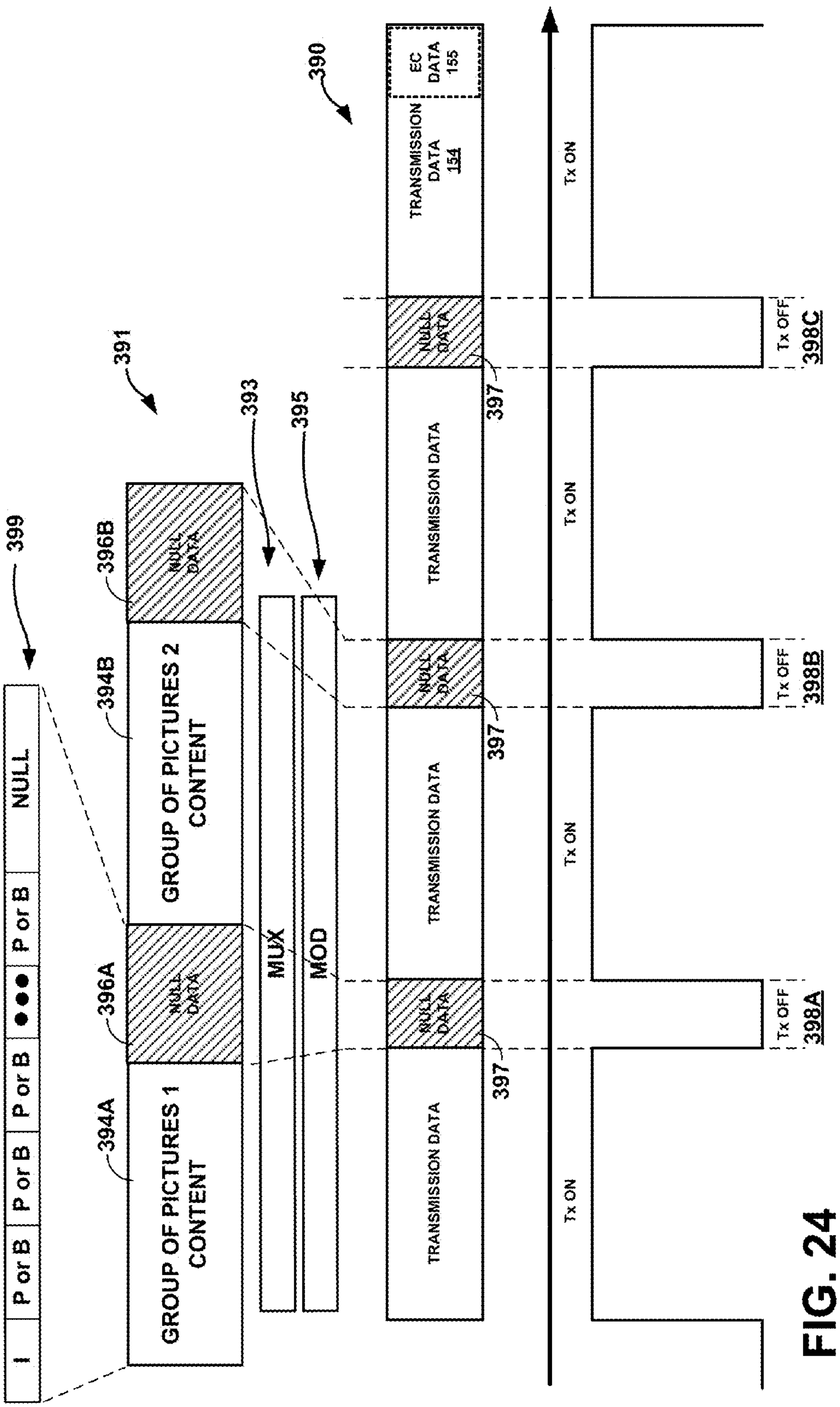
FIG. 24 is a diagram illustrating an example stream of data, including data content for multiple groups of pictures separated by miscellaneous data synchronized with transmission quieting intervals.
Figure 25:
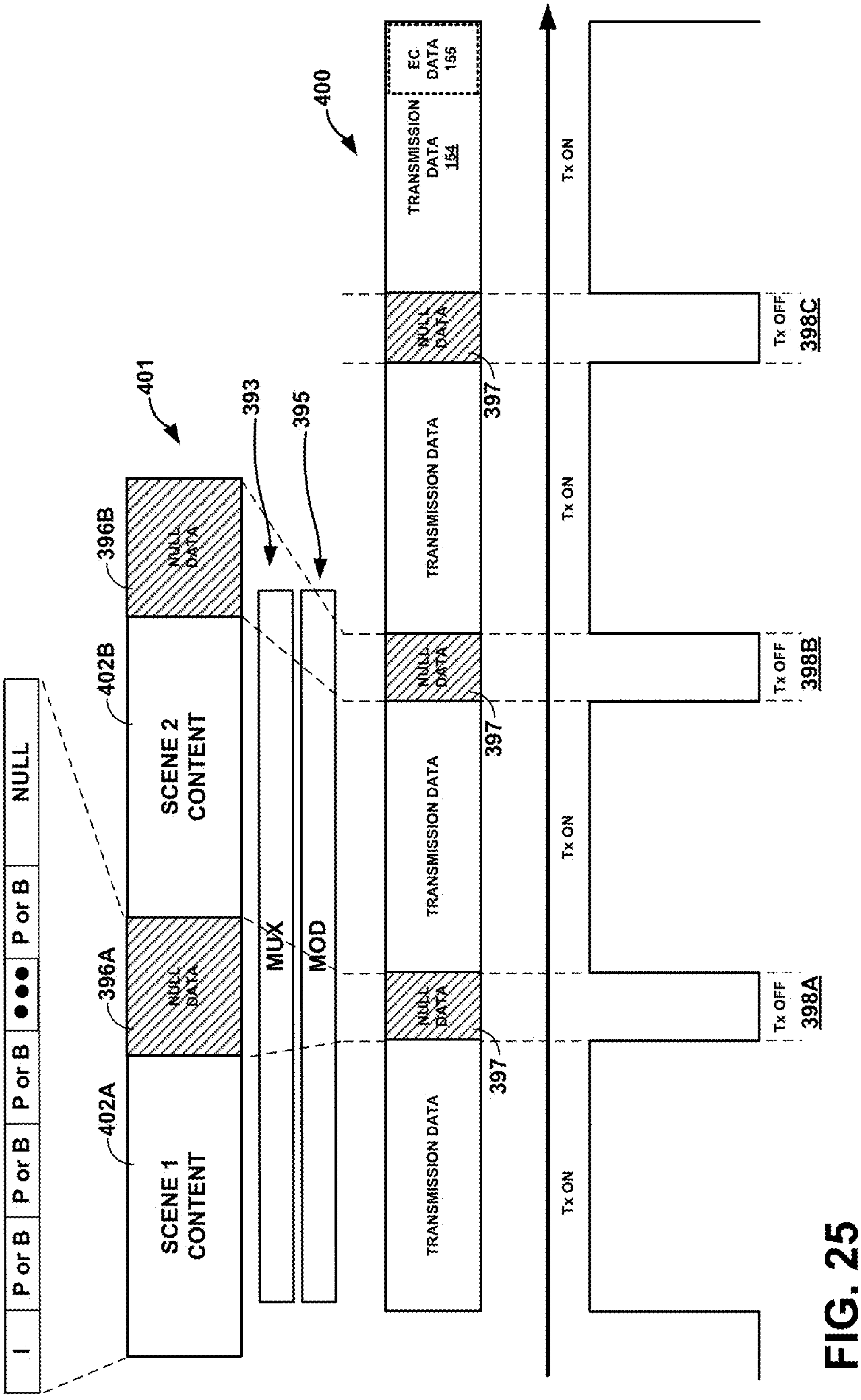
FIG. 25 is a diagram illustrating an example stream of data, including data content for multiple scenes separated by miscellaneous data synchronized with transmission quieting intervals.

FIG. 24 is a diagram illustrating an example stream of data 390, including data content for multiple groups of pictures 394A, 394B separated by miscellaneous data 396A, 396B (in this case null data) synchronized with transmission quieting intervals 398A-398C. One specific example 399 of GOP 394A and miscellaneous data 396A is also shown. Miscellaneous data may comprise non-essential data as described herein, although the miscellaneous data is labeled in FIG. 24 as "null data." FIG. 25 is a diagram illustrating an example stream of data 400, including data content for multiple scenes 402A, 402B separated by miscellaneous data 404A, 404B synchronized with transmission quieting intervals 398A-398C. Each of FIGS. 24 and 25 illustrates propagation of encoded video data 391/401 for a group of pictures 394A, 394B/402A, 402B through transport stream multiplexing 393 and modulation 395 to produce a transmission data stream 390/400 having null data 397 that is substantially synchronized with transmitter quieting intervals 398A-398C during which the transmitter is turned off (Tx OFF) to permit spectrum sensing. In the example of FIG. 24, null data 397 is placed at the end of each group of pictures (GOP). In the example of FIG. 25, null data 397 is placed at the end of each group of pictures (GOP) in alignment with a scene change boundary, such that the encoded video data 401 in a GOP for each scene may be separated by null data 397 to support transmitter quieting. Each GOP may be characterized by an I-coded frame followed by several P or B frames and a segment of null data.

Figure 26:
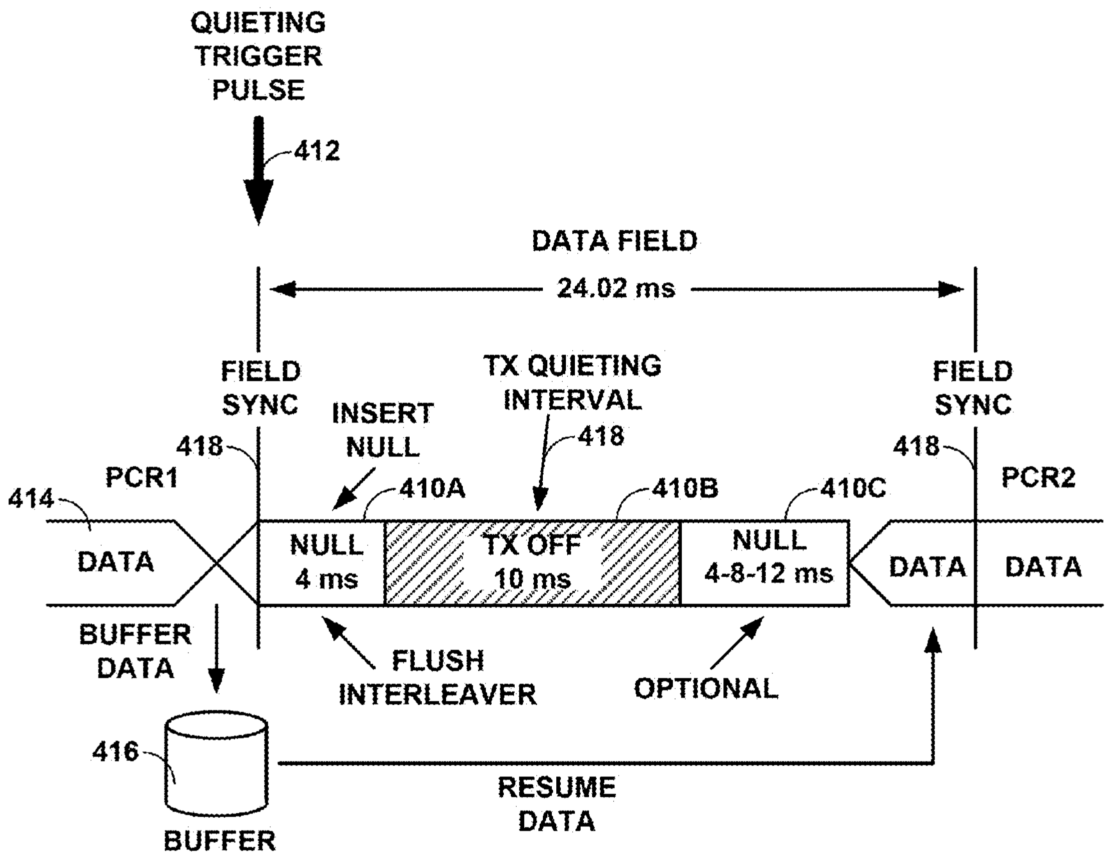
FIG. 26 is a timing diagram illustrating an example of insertion of null bytes by the modulator in response to a quieting trigger pulse.

In general, for each the adaptive video coding techniques described above, the modulator, such as modulator 320, may be configured to track interleaver blocks and field syncs 418, which may be similar to field syncs 374 shown in the examples of FIGS. 22, 23, to effectively quiet or blank the transmitter using null bytes, such as null bytes 382. FIG. 26 is a timing diagram illustrating an example of insertion of null bytes 410A-410C (which may be referred to as "null bytes 410" or "null data 410") by the modulator, such as modulator 320 shown in the example of FIG. 20, in response to a quieting trigger pulse 412. Null bytes 410 may be substantially similar to null bytes 382. Likewise, quieting trigger pulse 412 may be similar to quieting trigger pulse 378 shown in the examples of FIGS. 21, 22. As shown in FIG. 26, in response to quieting trigger pulse 412, modulator 320 may begin buffering transport stream data 414 in a buffer 416, and insert a lead 4 ms segment of null data 410A after corresponding field sync 418 into data stream 414 to flush the interleaver, such as data interleaver 328 of modulator 320. Upon flushing interleaver 328 with 4 ms null segment 410A, modulator 320 may selectively turn off the transmitter, e.g., for 6-10 ms (10 ms in the example of FIG. 26). Thus, the transmitter blanking, in this example, occurs between physical layer synchronization markers (e.g., field syncs), which is desirable to avoid data loss, avoid loss of synchronization at the demodulator and decoder side, and maintain low decoding and demodulation latency.

Modulator 320 may turn off the transmitter by feeding the transmitter null data 410B in the form of zero valued bits to cause the transmitter to quiet transmitting during transmitter quieting interval 418. In some examples, modulator 320 may insert a series of null values that ramp down in level gradually to prevent the transmitter from abruptly turning OFF and creating RF transient activity that may be undesirable. Then, the transmitter can be turned OFF for the duration of transmitter quieting interval 418. During transmitter quieting interval 418, no valid data is transmitted, and spectrum sensing can be activated to determine whether an identified channel is available for use by the communication system.

After transmitter quieting interval 418 (which is also shown in the example of FIG. 26 as "TX OFF"), modulator 320 may optionally insert a trailing segment of null data 410C into the data stream. Trailing null segment 410C could be, for example, 4 ms, 8 ms or 12 ms in length. In some examples, trailing null segment 410C may provide a guard segment between transmitter quieting interval 418 and the resumption of data 414. However, this guard segment may not be necessary. After transmitter quieting interval 418, or after optional trailing null segment 410C, modulator 320 may resume insertion of buffered data 414 from the buffer and continue to process the transport data stream.

As shown in FIG. 26, in this example, the transmitter quieting operation may be accomplished within a data field between two successive field syncs 418, i.e., a data field of approximately 24.02 ms. Again, 42 field syncs can be used to time approximately one second for generation of the quieting trigger pulse. In general, it may be desirable to use a transmitter quieting interval 418 that is less than some maximum time in order to ensure that PCR jitter tolerance remains intact. In an ATSC system, the maximum time for transmitter quieting interval 418 may be approximately 10 ms. In this manner, by keeping transmitter quieting interval 418 at less than 10 ms, buffered data 414 does not become stale. Rather, with this limited period of time, data 414 remains valid and the PCR tolerance is satisfied. For example, in FIG. 26, the gap between packet time stamps associated with PCR1 and PCR2 is sufficiently small to avoid violating PCR tolerance, ensuring proper decoder operation.

In addition to the adaptive video coding techniques described above, this disclosure contemplates latency reduction techniques to support or maintain performance in a system that makes use of transmit quieting operations for spectrum sensing. End-to-end latency in a communication system as described in this disclosure may be characterized by the contributions of various components between a media source and a media output device. When a transmit quieting interval is added periodically, latency may become a more significant concern in terms of its impact on performance, especially for latency-sensitive applications such as gaming or other interactive media applications.

Latency contributions between source and output may be a sum of delays introduced by the following components: on the transmit side, the media source, front-end scaling and formatting, video encoder, multiplexer, modulator, and RF transmitter, and on the receiver side, the RF receiver, demodulator, demultiplexer, video decoder, post processing unit, and display processing unit. Interleaving in the modulator and deinterleaving in the demodulator each may introduce a 4 ms delay. Frame buffers associated with the encoder and decoder may introduce additional delay. To avoid substantial buffer delay, it may be desirable to have the encoder and decoder synchronized to the one second clock.

An example of a technique for reducing latency in this system may be to switch to a 60 frame per second (fps) (or higher) encoding instead of 30 fps encoding. In this case, the video encoder only buffers 17 ms frames instead of 33 ms frames. If the frame buffer is designed to store only one frame of data, with a higher frame per second rate, there is a lower time per frame, reducing latency in processing individual frames. Hence, as a technique to reduce latency, the video encoder and decoder may be configured to code frames at a higher frame rate. Such latency reductions may be performed in conjunction with transmit blanking, and may be adaptive or constant.

As another example technique to reduce latency, the video encoder can be configured to encode half-frames, or other partial (i.e., fractional) frames, so that the encoding process does not need to wait for loading of an entire frame to commence motion estimation and other encoding processes. A video encoder may use fractional frames to incrementally perform motion estimation for P or B coding for fractional portions of a frame to be coded versus corresponding portions of a reference frame or frames. I coding also may be applied with respect to fractional portions of frames rather than entire frames. If slices are arranged to correspond to contiguous portions of a frame, the buffer could be configured to store a slice of data as the fractional portion of a frame. Again, such latency reductions may be performed in conjunction with transmit blanking, and may be adaptive or constant.

As another example technique, the video encoder may be configured to limit the encoder picture buffer to storing only a single frame. In this manner, it is not necessary to load the buffer with multiple frames before proceeding to encode a given frame. With this modification, it may be desirable to eliminate bi-directional predictive coding, i.e., B coding. In some examples, elimination of B coding may permit the encoder picture buffer to be modified to include only one frame so that latency can be reduced. In this case, I and P coding may be permitted, but B coding may be eliminated. In some examples, an encoder may be configured to selectively eliminate B coding, and only use I and P coding, when the encoder is used in conjunction with a media application that requires spectrum sensing and associated transmitter quieting intervals. Alternatively, the encoder may have a fixed configuration that eliminates B coding.

Figure 27:
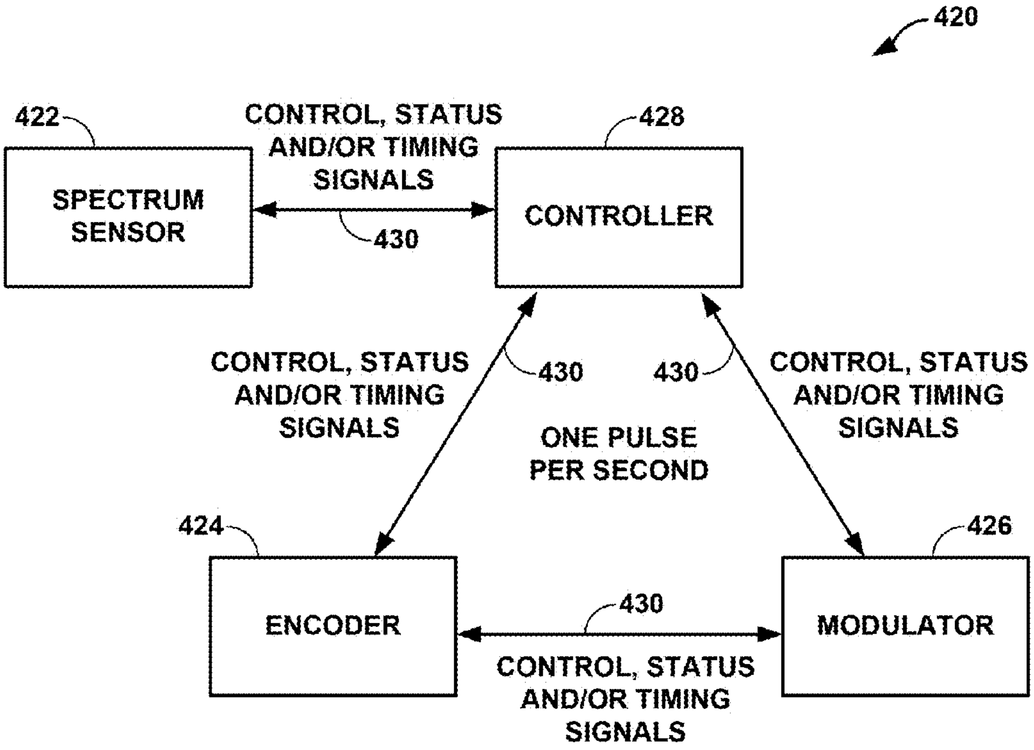
FIG. 27 is a block diagram illustrating coordinated synchronization of spectrum sensing, encoding, and modulation in a media communication system.

This disclosure further contemplates strategies for coordinated synchronization of spectrum sensing, encoding, and modulation in a media communication system as described in this disclosure. FIG. 27 is a block diagram illustrating coordinated synchronization of spectrum sensing, encoding, and modulation in a media communication system 420. In particular, FIG. 27 shows a spectrum sensor 422, encoder 424, modulator 426 and controller 428. To support coordinated synchronization, controller 428 may be configured to be responsive to control, status and/or timing signals from any of spectrum sensor 422, encoder 424 or modulator 426. Encoder 424 may comprise a video encoder, an audio encoder, an image encoder, combinations of audio and video encoders, or any multimedia encoder or combinations thereof. In some examples, controller 428 may generate approximately one pulse per second, e.g., in response to one of spectrum sensor 422, encoder 424 or modulator 426, to control the others of spectrum sensor 422, encoder 424, or modulator 426 to synchronize spectrum sensing, null byte generation, and/or transmit quieting.

For example, controller 428, in response to such signals from spectrum sensor 422, encoder 424 or modulator 426, may generate control, status or timing signals 430 for communication to the other units (i.e., spectrum sensor 422, encoder 424 or modulator 426). As an illustration, controller 428 may be configured (e.g., statically or programmably) to receive signals from encoder 424 and, in response to such signals, generate signals 430 that are transmitted to control modulator 426 and spectrum sensor 522. In this case, control is video- or media-centric in the sense that controller 428 is responsive to encoder 424. Video encoder 424 may provide control, status and/or timing signals 430 indicating placement of null bytes. Controller 428 then may control modulator 426 and spectrum sensor 422 to activate a transmit blanking interval and sense the spectrum, respectively, at a time substantially coincident with the timing of the placement of the null bytes from encoder 424 (via the multiplexed transport stream provided to modulator 426) in the modulated data stream of modulator 426.

As an alternative, controller 428 may be configured to be modulator-centric in the sense that it controls encoder 424 and spectrum sensor 422 based on signals from modulator 426, e.g., indicating timing of a transmit quieting interval to be applied by modulator 426. As a further alternative, controller 428 may be configured to be spectrum sensor-centric in the sense that it controls encoder 424 and modulator 426 in response to signals from spectrum sensor 422, e.g., indicating timing of intervals during which spectrum sensor 422 will be active to sense for white space channels. In each case, overall ATSC operation may be synchronized to coordinate timing of spectrum sensing, transmit quieting and propagation of null bytes from the encoder to modulated data stream.

Media communication system 420 of FIG. 27 may include any of a variety processing hardware, which may be fixed or programmable with software or firmware, to implement control according to such strategies. In some of the examples described above, field syncs from modulator 426 may be used to generate a quieting trigger pulse. In this sense, synchronization of sensing, encoding and modulation may be considered to be at least partially modulator-driven. In this case, a quieting trigger pulse may be generated periodically based on field syncs and used to trigger the transmitter quieting interval in the modulator and transmitter, to align a GOP in the encoder with respect to the field sync in modulator 426, and to trigger activation of spectrum sensing at a time during the transmitter quieting interval. Coordinated synchronization may be achieved through one or more common clocks or derived clock signals.

In other examples, the synchronization of spectrum sensing, encoding and modulation may be encoder-driven. In this case, a clock used to generate the quieting trigger pulses could be generated based on video frame and GOP timing. For example, encoder 424 may be configured to vary rate control, GOP structures, scene change boundaries or the like based on more optimal or ideal positioning of null times in the video data stream, and then generate timing markers that can be used to synchronize modulator operation with the video coding timing. In particular, null bytes may be placed directly in the encoded video data stream or portions of the video data stream may be identified where null placement would be desired in terms of less disruption to performance or quality. Encoder 424 may selectively encode the identified portions to provide empty space for insertion of null bytes, or directly encode null bytes into those portions. The null portions selected by encoder 424 could then be used to generate timing markers for communication to modulator 426 to trigger insertion of null bytes for application of the transmitter quieting interval at times corresponding to the null positions. Spectrum sensor 422 would then be triggered to sense the spectrum during the transmitter quieting interval. In different examples, non-essential data (e.g., null data or redundant data) may be encoded into the bitstream by encoder 424, inserted into the application layer bitstream via an application layer MUX associated with encoder 424, or inserted into the physical layer bitstream via a physical layer MUX associated with modulator 426

In additional examples, the synchronization of spectrum sensing, encoding and modulation may be driven by spectrum sensor 422. In this case, a clock used to generate the quieting trigger pulses could be generated based on predetermined or dynamically generated spectrum sensing activation times. These quieting trigger pulses derived from spectrum sensor timing may be provided to modulator 426 (or to encoder 424) to trigger the insertion of null bytes for the transmitter quieting interval. In addition, the quieting trigger pulses derived from spectrum sensor timing may be provided to encoder 424 for use in adaptive video coding to selectively encode corresponding portions of the encoded video data stream to provide empty space for insertion of null bytes by a MUX associated with modulator 426 at the physical layer, or by a MUX associated with encoder 424 at the application layer. Encoder 424 and modulator 426 may be synchronized with spectrum sensor 422. Alternatively, a first one of encoder 424 or modulator 426 may be synchronized with spectrum sensor 422, and a second one of encoder 424 or modulator 426 may be synchronized from the first one of encoder 424 or modulator 426. In this case, for example, encoder 424 could be synchronized from spectrum sensor 422, and modulator 426 could be synchronized from encoder 424. Alternatively, modulator 426 could be synchronized from spectrum sensor 422, and encoder 424 could be synchronized from modulator 426.

In some examples, different synchronization strategies (e.g., encoder-drive, spectrum sensor-driven, or modulator-driven) may be selectively activated depending on different parameters, applications or conditions. A transmitter (not shown in FIG. 27) may likewise be synchronized for transmitter blanking during sensing operations performed by spectrum sensor 422. For example, if video quality is most important for a given application or user, e.g., for viewing HD movies, it may be desirable to select an encoder-driven synchronization strategy so that encoder 424 can place empty space for null bytes more intelligently within the video sequence, e.g., at scene change boundaries or other refresh points in the sequence, such as the end of a GOP. If latency is most important for a given application or user, e.g., to support interactive video gaming, it may be desirable to use a modulator-driven synchronization strategy, e.g., with reduced rate coding of the video to avoid excessive buffering. If sensing may be compromised by a noisy environment, it may be desirable use a sensor-drive synchronization strategy, so that spectrum sensing can be performed in manner that may be more reliable, e.g., more frequently.

Again, in accordance with this disclosure, there are several ways to insert null data to correspond to a transmit blanking interval. In one example, an encoder such as MPEG-2 encoder 290 is configured to encode null data and this encoded null data may be timed to correspond to a null interval at the physical layer. In a different example, an application layer MUX (such as TS MUX 312 or transport encoder 258) may be used to insert non-essential data (such as null data or redundant data) at the application layer, which may be timed to correspond to a null interval at the physical layer. The case where application layer MUX (such as TS MUX 312 or transport encoder 258) is used to insert null data has been called a synchronized case in this disclosure insofar as the non-essential data is synchronized to a physical layer boundary at the modulator.

In another case, a physical layer MUX (such as MUX 340) may be used to insert non-essential data, which has been called an unsynchronized case in this disclosure insofar as the encoder unit does not need to synchronize non-essential data with the physical layer boundaries generated downstream of the encoder unit. Instead, the physical layer MUX associated with the modulator can simply insert the non-essential data between field syncs to ensure that the non-essential data corresponds to a null interval.

It should be noted that although TX MUX 312 and MUX 340 both show the insertion of non-essential data, the use of TX MUX 312 or MUX 340 for the insertion of non-essential data may be alternatives. That is, a MUX at the application layer (e.g., TX MUX 312) could be used to insert non-essential data, or a MUX at the physical layer (e.g., MUX 340) could be used to insert non-essential data. The insertion of non-essential data would not typically occur at both TX MUX 312 or MUX 340, although such insertion of non-essential data by both TX MUX 312 and MUX 340 is also possible.

These different examples can provide different advantages. For example, insertion of non-essential data by TX MUX 312 may provide higher quality encoding by avoiding the need to reduce the encoding rate for all frames. On the other hand, insertion of non-essential data by MUX 340 may be easier to implement because, in this case, physical layer boundaries can be defined around the insertion of the non-essential data. Also, in yet another alternative, an encoder (such as such as MPEG-2 encoder 290) could be used to encode null data, and in this case, TX MUX 312 and MUX 340 may not need to insert non-essential data. Also, as yet another example, modulator 348 may be used to insert non-essential data, in which case modulator 348 may include a multiplexer for adding the null data.

The use of different units for insertion of non-essential data (redundant data or null data) may also be appreciated in FIG. 7. In this example, video/audio encoders 50B could be used to encode null data or to multiplex non-essential data into an encoded application layer. Alternatively, transport encoder/multiplexer 52B or ATSC modulator 56B could be used to insert the non-essential data. These cases are consistent with the cases discussed with respect to FIGS. 19 and 20. FIG. 7 also shows transmitter 59B), which is not shown in FIG. 19 or 20. In some examples, the output of FIG. 20 may be delivered to a transmitter similar to transmitter 59B of FIG. 7.

Referring again to FIG. 27, controller 428 may coordinate transmitter blanking Controller may generate and communicate control signals 430 to spectrum sensor 422 and a transmitter (not shown in FIG. 27) to ensure that the transmitter blanks its communication when spectrum sensor 422 senses for wireless signals. In addition, controller 428 may send control signals to encoder 424 and/or modulator 426 to coordinate the insertion of non-essential data into the encoded and modulated bitstream so that the non-essential data corresponds to the null interval when the transmitter blanks it communication. Controller 428 may be a stand alone unit, or could be implemented part of any of the units shown in FIG. 27 or part of the transmitter (not shown in FIG. 27).

The transmitter may refrain, during at least one time interval, from transmitting any data from a communication device, and spectrum sensor 422 may detect, during the at least one time interval, whether any channel of a spectrum is available for use. To coordinate this transmitter blanking, controller 428 may generate a control signal to identify a time associated with transmitter blanking In response to the control signal, the transmitter (not shown in FIG. 27) may refraining from transmitting any data from the communication device.

Figure 28:
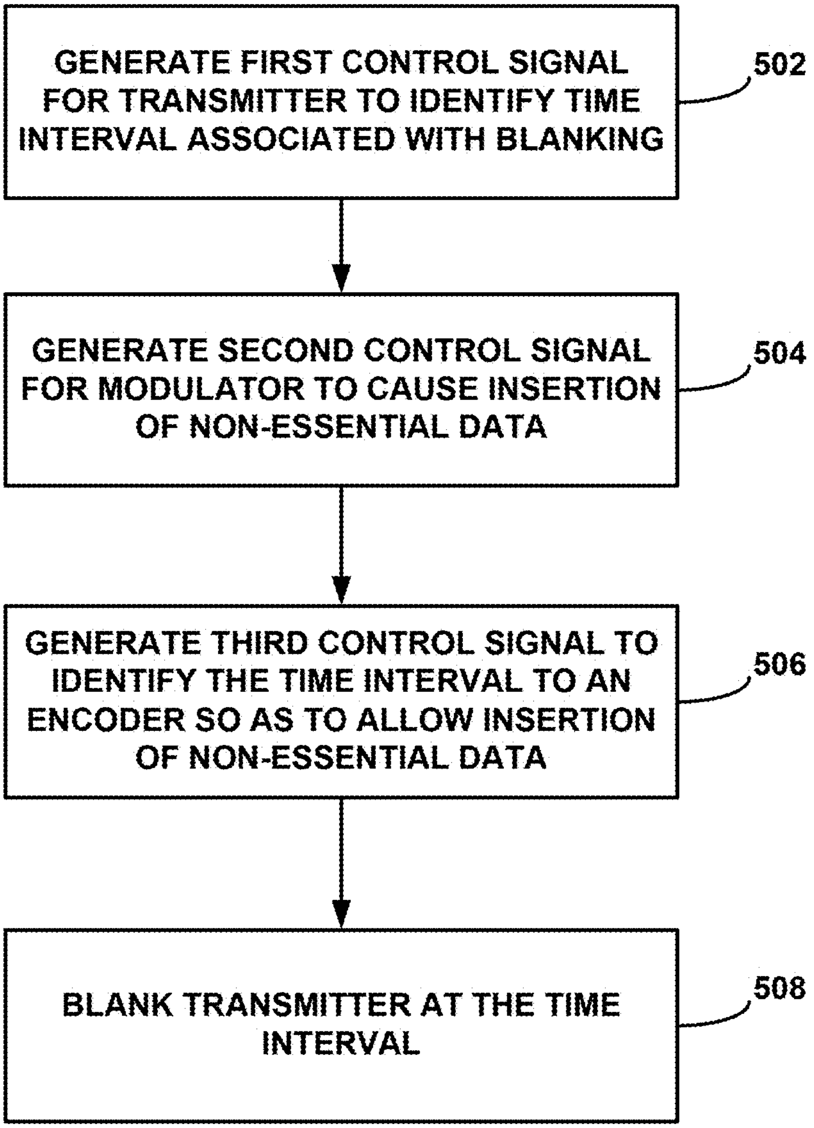
FIG. 28 is a flow diagram illustrating a technique consistent with this disclosure.

FIG. 28 is a flow diagram consistent with a technique of this disclosure. As shown in FIG. 28, controller 428 generates a first control signal for a transmitter (not shown) to identify a time interval associated with transmitter blanking (502). Controller 428 may also generate a second control signal for modulator 426 to cause insertion of non-essential data (504). The second control signal may cause modulator 426 to insert non-essential data into a modulated bitstream at a time corresponding to the time interval. Alternatively or additionally, controller 428 may generate a third control signal, wherein the third control signal identifies the at least one time interval to encoder 424 (506). The transmitter (not shown in FIG. 27) may be blanked at the time interval (508) and the control signals from controller 428 may coordinate the operation of the different units so as to ensure that non-essential data is inserted in the bitstream at the time interval corresponding to the transmitter blanking Steps 502, 504 and 506 in FIG. 28 could occur in different orders, and two or more of steps 502, 504 and 506 might also occur at the same time in some examples.

Accordingly, by generating and delivering control signals 430, controller 428 may coordinate the operation of spectrum sensor 422 and a transmitter (not shown in FIG. 27) to ensure that the transmitter blanks its communication when spectrum sensor 422 senses for wireless signals. In addition, the control signals from controller 428 may coordinate encoder 424 and/or modulator 426 such that insertion of non-essential data results in non-essential data over the interval when the transmitter blanks it communication. Again, in different cases, the non-essential data could be inserted by encoding such data via encoder 424, by multiplexing non-essential data in the application layer via a multiplexer of encoder 424, or by multiplexing the non-essential data in the physical layer via multiplexer of modulator 426. The control signals used to coordinate insertion of non-essential data with transmitter blanking may be sent to different units in these different cases. For example, in cases where non-essential data is inserted by encoder 424, it may not be necessary to send control signals to modulator 426, and in cases where non-essential data is inserted by modulator 426, it may not be necessary to send control signals to encoder 424. The control signals 430 shown in FIG. 27 are exemplary and some may not be necessary, depending on the scenario.

Figure 29:
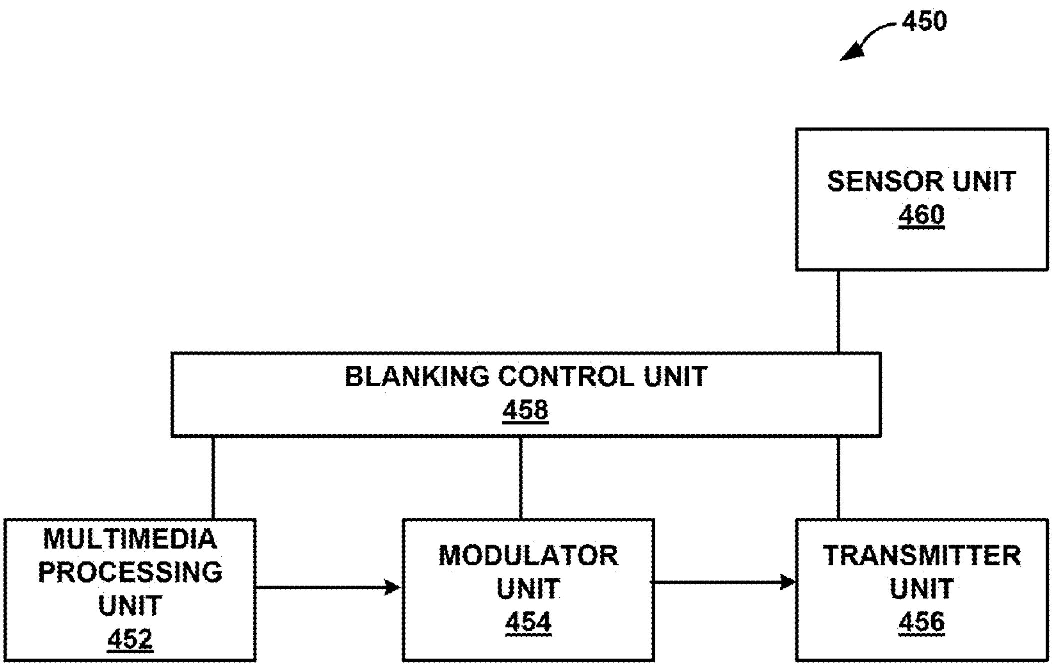
FIG. 29 is a block diagram illustrating a device consistent with this disclosure.

FIG. 29 is another block diagram illustrating an exemplary device 450 that may implement the techniques of this disclosure. FIG. 29 may be consistent with several of the examples of this disclosure. Device 450 includes a multimedia processing unit 452, which may be a multimedia encoding unit that includes one or more audio encoders, one or more video encoders, and an application layer MUX. The application layer MUX may be used to combine data from different encoders and possibly to add non-essential data to the encoded bitstream. In one example, multimedia processing unit 452 corresponds to multimedia communication system 301 of FIG. 19, although other units or configurations could also be used consistent with this disclosure.

Device 450 also includes a modulator unit 454 (also called a modulator). Modulator unit 454 may generate the physical transport stream and may include a physical layer MUX. This physical layer MUX of modulator unit 454 could be used to add non-essential data to the physical layer transport stream, e.g., between two field syncs. In one example, modulator unit 454 corresponds to modulator 320 of FIG. 20 although other units or configurations could also be used consistent with this disclosure. Device 450 of FIG. 29 also includes a transmitter unit 456 (also called a transmitter), which may comprise a wireless transmitter and an antenna to communicate according to a wireless protocols such as described herein. In addition, device 450 of FIG. 29 includes a blanking control unit 458, which may send control signals to coordinate the transmitter blanking with the insertion of non-essential data. Sensor unit 460 (also called a sensor) may be used to sense for wireless signals and transmitter unit 456 may be blanked when sensor unit 460 senses for wireless signals.

Figure 30:
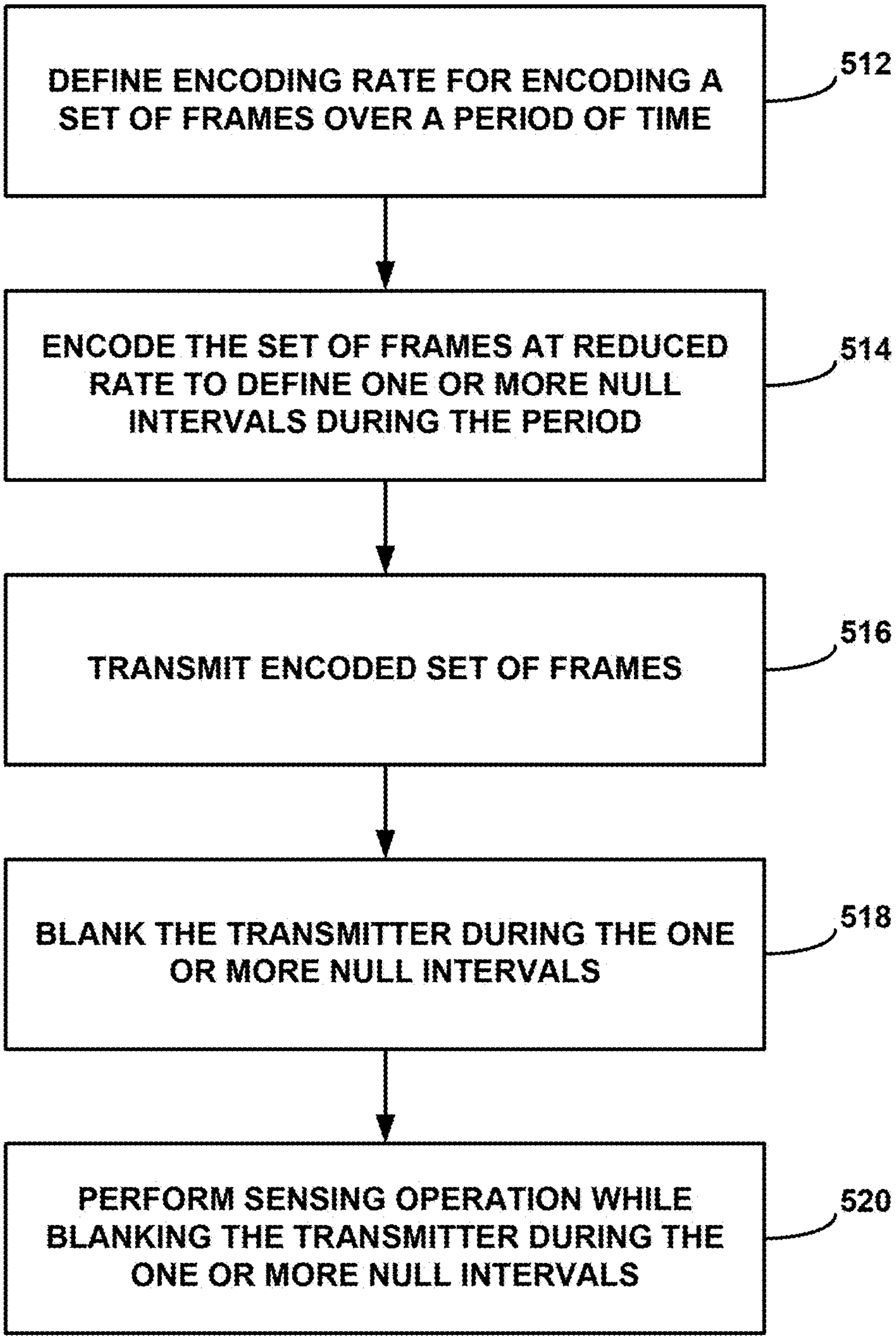
FIGS. 30-34 are flow diagrams illustrating different techniques consistent with this disclosure.

FIG. 30 is a flow diagram illustrating one technique consistent with a case where modulator unit 454 is used to insert non-essential data into a bitstream. In this case, a physical layer MUX (the output of which is a modulated physical layer bitstream) inserts the non-essential data. FIG. 30 may also be consistent with a case where MUX 340 of a modulator 320 (see FIG. 19) inserts the non-essential data into the bitstream. To allow for MUX 340 of a modulator 320 to insert the non-essential data, the multimedia encoder (e.g., MPEG-2 encoder 290 of FIG. 19) may encode data at a reduced rate so that the encoded data is at a lower rate than the data rate that is ultimately output by modulator 320. The reduced rate encoding is also shown conceptually in FIG. 23 and discussed in greater detail above.

In the example of FIG. 30, a multimedia encoding unit (such as multimedia processing unit 452 of FIG. 29 or MPEG-2 encoder 290 of FIG. 19) may define an encoding rate for encoding a set of frames over a period of time (512), but may encode the set of frames at a reduced encoding rate over the period of time such that encoding the set of frames at the reduced encoding rate defines one or more null intervals when data associated with the set of frames is not encoded during the period of time (514). Again, this reduced encoding is shown conceptually in FIG. 23. The encoded frames may be transmitted via transmitter 456 (516), and transmitter 456 can be blanked during the one or more null intervals (518). Modulator unit 454 may modulate the encoded data prior to transmission by transmitter unit 456.

The encoded set of frames may comprise a set of audio frames or a set of video frames. In most cases, the set of frames comprise a combined set of audio frames and video frames. In this example, a MUX of modulator unit 454 (see also MUX 340 of modulator 320 in FIG. 20) may insert non-essential data into the encoding bitstream during the one or more null intervals. In some cases, the non-essential data comprises packets of redundant data relative to the set of frames, but in other case, the non-essential data comprises null data. In the later case, the null data may comprise a set of packets having all zeros within packet payloads of the set of packets. Null data packets may still include packet headers.

The MUX of modulator 454 may generate a physical transport stream and in doing so, may insert the non-essential data into the physical transport stream. The ability to insert such non-essential data may be possible due to the multimedia processing unit 452 reducing its encoding rate. In generating the physical transport stream, the MUX of modulator unit 454 may multiplex the non-essential data with the encoded set of frames. Transmitter unit 456 may identify a location of the physical transport stream that includes the non-essential data, and may blank at a time associated with the identified location. Control signals from blanking control unit 458 may coordinate such blanking Blanking transmitter unit 456 during the one or more null intervals includes blanking the transmitter at times corresponding to at least some of the non-essential data. In some examples, this may require aligning one or more application layer boundaries of an encoded bitstream associated with the set of frames with physical layer boundaries of a physical layer transport stream that includes the set of frames. For example, the one or more null intervals may comprise data fields that immediately precede one or more of the application layer boundaries that are aligned with the physical layer boundaries. In this case, the application layer boundaries may comprise frame boundaries within a group of pictures (GOP) and the physical layer boundaries may correspond to field syncs of the physical layer transport stream.

The method of FIG. 30 may further include performing a sensing operation (e.g., via sensor unit 460) while blanking transmitter unit 456 during the one or more null intervals (520). As can be appreciated from this disclosure, the sensing operation may include sensing for other wireless signals at a particular frequency, or sensing for a licensed signal at the particular frequency. If such signals are sensed by sensor unit 460, transmitter unit 456 may be switched to a different frequency. In other words, upon sensing another wireless signal at the particular frequency, transmitter unit 456 may be switched to a different frequency, e.g. at the direction of blanking control unit 458, so that transmitter unit 456 does not interfere at the particular frequency. The method of FIG. 30 may be repeated periodically in compliance with a wireless communication standard that requires periodic sensing for unlicensed use of the particular frequency.

As an additional issue, latency may be considered in a system that requires transmitter blanking In particular, encoding and transmitting the set of frames may be performed such that the blanking of transmitter unit 456 combined with a latency time associated with decoding and demodulating the set of frames is less than a pre-defined duration associated with real-time multimedia presentation to a user. For example, it may be desirable to reduce latency associated with decoding and demodulating the set of frames to less than 100 milliseconds. However, due to additional latency from the transmitter blanking (such as approximately 40 milliseconds), it may be necessary to reduce latency associated with decoding and demodulating each frame in the set of frames to less than 60 milliseconds. A wide variety of techniques may be used to ensure that decoding and demodulating latency is sufficiently low to ensure real-time delivery of multimedia data. For example, some or all bi-directional predictive frames (e.g., B-frames) may be eliminated to reduce latency since B-frames are often predicted based on frames that occur later in the video sequence. Input buffers may also be reduced, e.g., only allowing frame prediction from a limited number of reference frames (or even single or partial reference frames), so as to ensure that latency is reduced, particularly when transmitter blanking is performed. For example, the reference picture buffers may be limited to a single reference frame so that encoding does not require decoding, reconstruction and buffering or multiple frames backward or forward in the video sequence. These and other techniques may be highly desirable for real-time communication of multimedia data at frequencies that require sensing (and thus transmitter blanking) at periodic intervals to ensure that use of the frequencies complies with laws and regulations that require such sensing.

Figure 31:
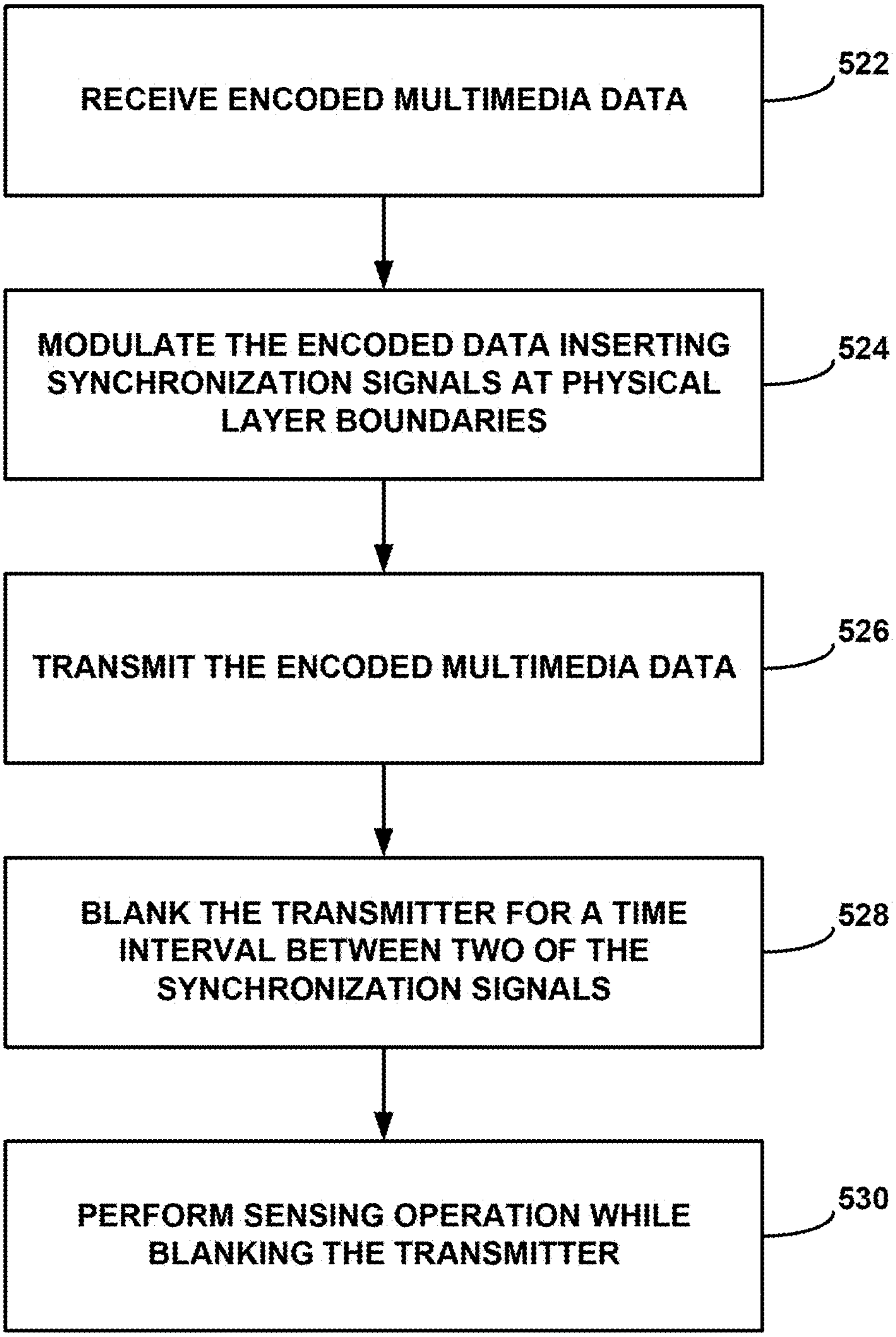

FIG. 31 is another flow diagram illustrating one technique consistent with a case where modulator unit 454 is used to insert non-essential data into a bitstream. FIG. 30 may also be consistent with a case where MUX 340 of a modulator 320 (see FIG. 19) inserts the non-essential data into the bitstream. In this case, a physical layer MUX (the output of which is a modulated physical layer bitstream) inserts the non-essential data. FIG. 26 is also used to help demonstrate the method of FIG. 31.

As shown in FIG. 31, modulator unit 454 receives encoded multimedia data (522) and modulates he encoded multimedia, wherein modulating includes inserting synchronization signals at physical layer boundaries associated with the encoded multimedia data (524). For example, as shown in FIG. 26, modulator may insert synchronization signals (e.g., field syncs) at physical layer boundaries. Upon forwarding the modulated data to transmitter unit 456, transmitter unit 456 transmits the encoded multimedia (526). However, blanking control unit 458 blanks transmitter unit 456 for a time interval between two of the synchronization signals (528), e.g., between two successive ones of the synchronization signals. This time interval may correspond to the TX quieting interval 418 shown in FIG. 26. Sensor unit 460 may then perform sensing operation while transmitter unit 456 is blanked (530). In this manner, sensing is coordinated with transmitter blanking, and non-essential data is associated with the blanking interval between field syncs so that data is not lost and synchronization is maintained during the blanking process.

In the example shown in FIG. 26, the non-essential data received at the modulator may be sufficient to flush input buffers of the modulator of the encoded multimedia data, which may flush the interlever (as shown during null 410A). By blanking the transmitter after flushing the input buffers for the time interval between two of the synchronization signals, data loss associated with valid encoded data may be avoided. Again, the non-essential data may comprise packets of redundant data relative to the encoded multimedia data, or null data comprising a set of packets having all zeros within packet payloads of the set of packets. The use of redundant data may be desired for cases where blanking is not always performed with each set of non-essential data. In this case, if blanking is not performed, the non-essential data may provide redundancy relative to other data (e.g., redundant I frames) so as to improve the quality of video in the case of data loss during data transmission.

Figure 32:
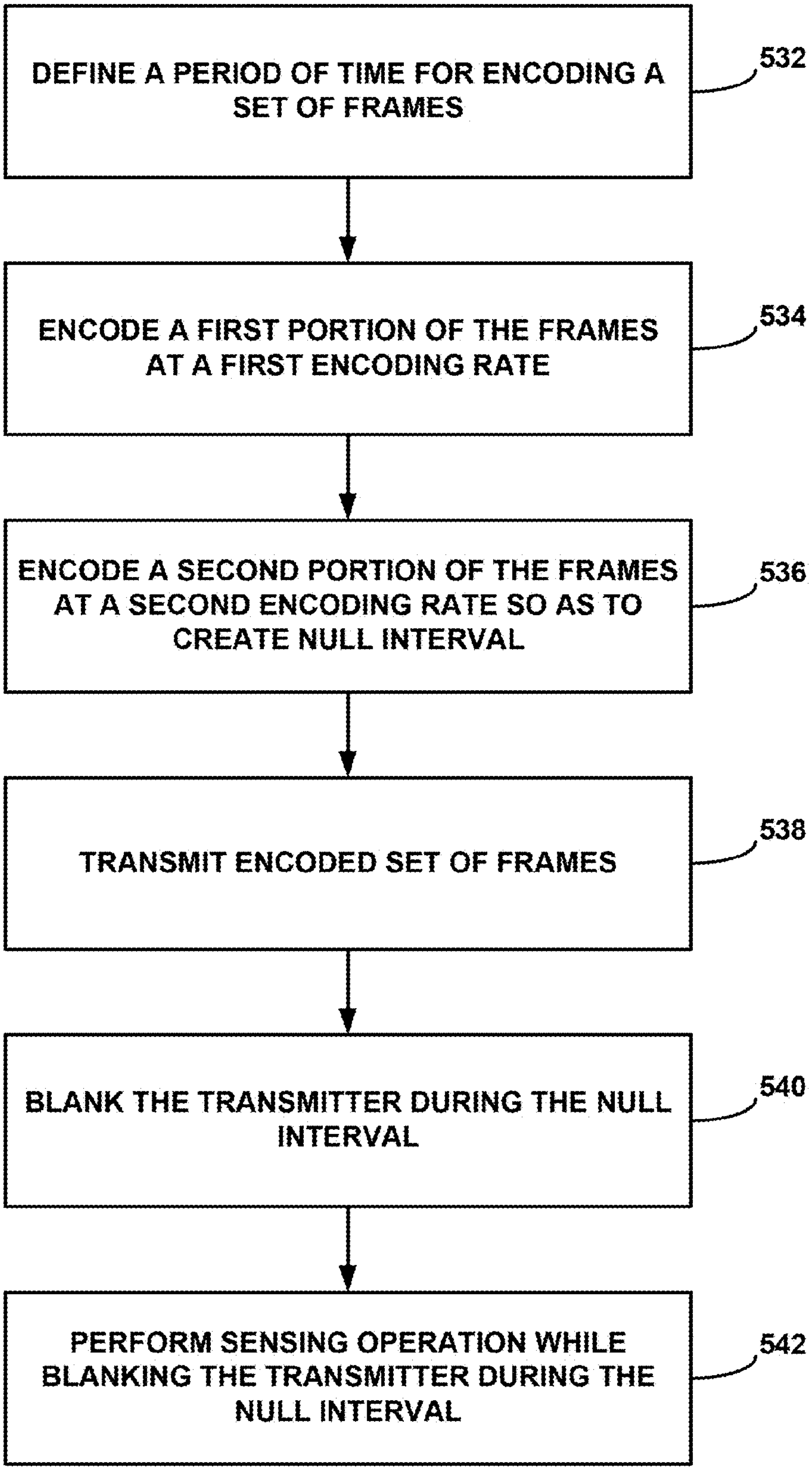

FIG. 32 is a flow diagram illustrating one technique consistent with a case where multimedia processing unit 454 is used to insert non-essential data into a bitstream. In this case, an application layer MUX (the output of which is an application layer bitstream such as an MPEG-2 or MPEG-4 bitstream) inserts the non-essential data. Specifically, in the case of FIG. 32, some frames of a set of frames are encoded at a reduced rate so as to create a null after the set of frames. The reduced rate encoding of one or more frames (e.g., a final frame) is also shown conceptually in FIG. 22 and discussed in greater detail above. In the technique of FIG. 32, a multiplexer of multimedia processing unit 452 inserts non-essential data into the bistream. The technique of FIG. 32 may also be consistent with a case where MUX 312 of encoding system 301 (which is one example multimedia processing unit 454) is used to insert non-essential data.

As shown in FIG. 32, multimedia processing unit 452 defines a period of time for encoding a set of frames (532), which may be an approximately 1 second interval associated with a so-called "superframe." Multimedia processing unit 452 encodes a first portion of the set of frames of multimedia data at a first encoding rate (534), and encodes a second portion of the set of frames of multimedia data at a second encoding rate (536), wherein the second encoding rate is less than the first encoding rate so as to create a null interval during the period of time. After modulating the encoded frames via modulator unit 454, transmitter unit 456 transmits the encoded set of frames (538). However, blanking control unit 458 causes transmitter unit 456 to blank during the null interval (540). Accordingly, sensor unit 460 performs a sensing operation while the transmitter blanks during the null interval (542).

As with other examples above, the sensing operation may include sensing for other wireless signals at a particular frequency, or sensing for a licensed signal at the particular frequency. If such signals are sensed by sensor unit 460, transmitter unit 456 may be switched to a different frequency. In other words, upon sensing another wireless signal at the particular frequency, transmitter unit 456 may be switched to a different frequency, e.g. at the direction of blanking control unit 458, so that transmitter unit 456 does not interfere at the particular frequency. The method of FIG. 32 may be repeated periodically in compliance with a wireless communication standard that requires periodic sensing for unlicensed use of the particular frequency.

In one example consistent with FIG. 32 and consistent with the conceptual diagram of FIG. 22 the second portion of the set of frames, which are encoded at the slower rate, may comprise a final frame of the set of frames, and the first portion may comprise all frames of the set of frames except the final frame. The method may further include encoding the first portion of the set of frames at the first encoding rate and encoding the second portion of the set of frames at a second encoding rate in response to determining that the set of frames overlap with a required blanking interval. In this case, if the set of frames do not overlap with the blanking interval, then all of the frames may be encoded at the faster encoding rate because a null interval may not be necessary.

The encoded set of frames may comprise a set of audio frames or a set of video frames. In most cases, the set of frames comprise a combined set of audio frames and video frames. In the example of FIG. 32, a MUX of encoding unit 452 (see also TS-MUX 312 of system 301 in FIG. 19) may insert non-essential data into the encoding bitstream during the one or more null intervals. In some cases, the non-essential data comprises packets of redundant data relative to the set of frames, but in other case, the non-essential data comprises null data. In the later case, the null data may comprise a set of packets having all zeros within packet payloads of the set of packets. Null data packets may still include packet headers. The MUX of encoding unit 452 (see also TS-MUX 312 of system 301 in FIG. 19) may combine audio frames and video frames with the non-essential data.

Since the non-essential data is inserted in the application layer, in this example, it may be necessary to ensure alignment of an application layer boundary of an encoded bitstream associated with the set of frames with a physical layer boundary of a physical layer transport stream that includes the set of frames. The null interval may comprise a data field that immediately precedes the application layer boundary that is aligned with the physical layer boundary. In one example consistent with this disclosure, the application layer boundary comprises a group of picture (GOP) boundary, and the physical layer boundary corresponds to a field sync of a transport stream. In another example, the application layer boundary comprises a scene boundary, and the physical layer boundary corresponds to a field sync of a transport stream. By inserting null data at these specific application layer boundaries, it may be easy for a modulator to ensure that physical layer boundaries (field syncs) are aligned with the null data (as shown in FIG. 26). Accordingly, transmitter blanking can be performed without loss of data.

As with other techniques described herein, the technique of FIG. 32 may be repeated periodically. Accordingly, in another example, the set of frames may comprise a first set of frames, and the period of time may comprise a first period of time. In this case, the method may further comprise defining a second period of time for encoding a second set of frames of multimedia data, encoding a first portion of the second set of frames of multimedia data at the first encoding rate, encoding a second portion of the second set of frames of multimedia data at a third encoding rate, wherein the third encoding rate is less than the first encoding rate so as to create a null interval during the second period of time, transmitting the second set of encoded set of frames via a transmitter, and blanking the transmitter during the null interval within the second period of time.

Furthermore, in yet another example, the technique of FIG. 32 may be adaptive such that reduced encoding of the second portion of a set of frames only occurs for sets of frames (e.g., GOPs) that correspond to blanking intervals. Thus, in another example, the method may further include defining a second period of time for encoding a second set of frames of multimedia data, wherein no blanking occurs during the second period of time, encoding the second set of frames at the first encoding rate, and transmitting the second set of encoded frames via the transmitter.

Furthermore, as with other examples, latency may be considered in a system that performs the techniques of FIG. 32. In particular, encoding and transmitting the set of frames may be performed such that the blanking of transmitter unit 456 combined with a latency time associated with decoding and demodulating the set of frames is less than a pre-defined duration associated with real-time multimedia presentation to a user. For example, it may be desirable to reduce latency associated with decoding and demodulating the set of frames to less than 100 milliseconds. However, due to additional latency from the transmitter blanking (say approximately 40 milliseconds), it may be necessary to reduce latency associated with decoding and demodulating the set of frames to less than 60 milliseconds.

As mentioned above, a wide variety of techniques may be used to ensure that decoding and demodulating latency is sufficiently low to ensure real-time delivery of multimedia data. For example, some types of predictive frames (e.g., B-frames) may not be used in the encoding so as to reduce latency since B-frames are often predicted based on frames that occur later in the video sequence. Input reference picture buffers used for motion estimation for predictive coding may also be reduced, e.g., only allowing frame prediction from a limited number of frames (or even single or partial frames) so as to ensure that latency is reduced, particularly when transmitter blanking is performed. These and other techniques may be highly desirable for real-time communication of multimedia data at whites pace frequencies that require sensing (and thus transmitter blanking) at periodic intervals to ensure that use of the frequencies complies with laws and regulations that require such sensing.

Figure 33:
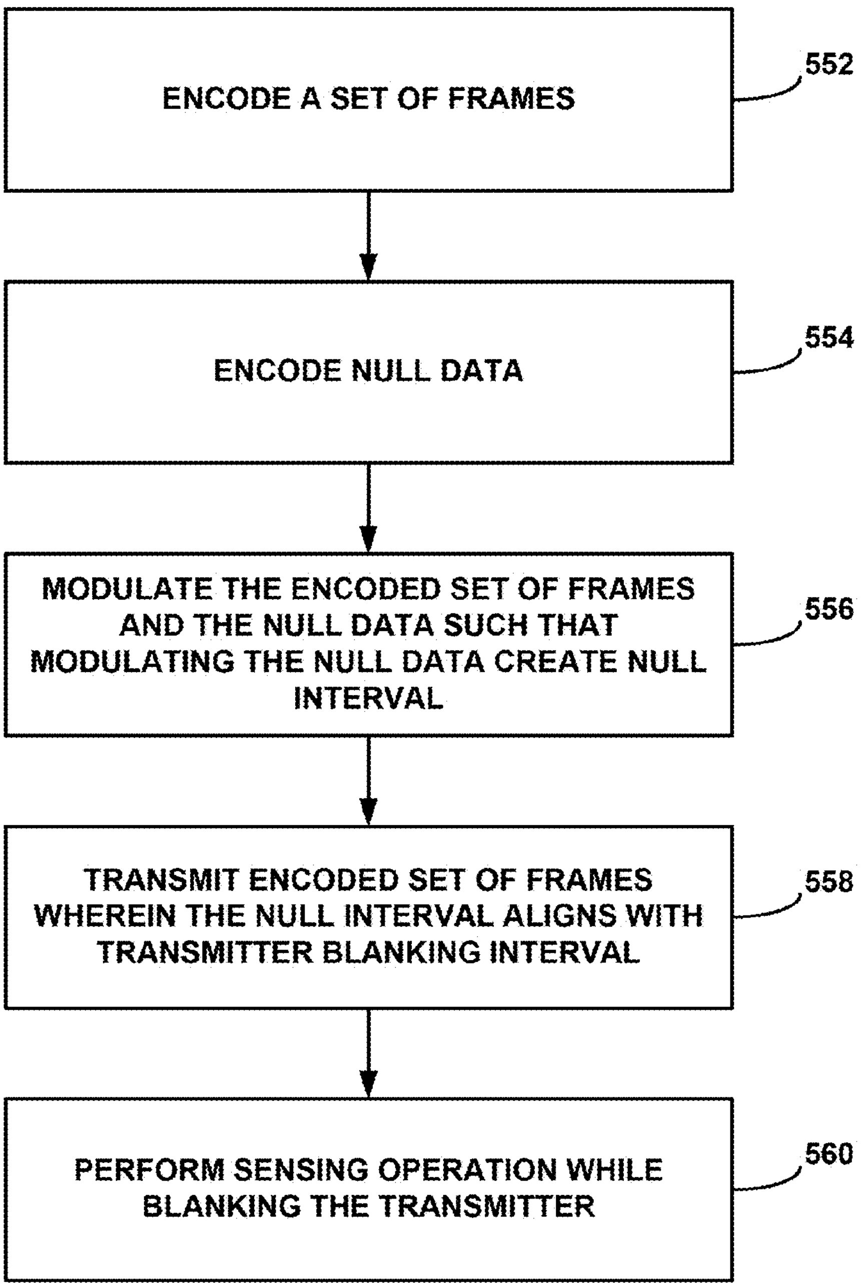

FIG. 33 is a flow diagram illustrating a technique consistent with a case where multimedia processing unit 454 is used to insert non-essential data into a bitstream. However, unlike the case of FIG. 31 where a multiplexer of multimedia processing unit 452 inserts non-essential data into the bistream, in the technique of FIG. 33, null data is encoded rather than inserted into the bitstream. FIG. 33 may be consistent with a case where MPEG-2 encoder 290 of encoding system 301 (which is one example multimedia processing unit 454) is used to encode null data. In this case, null data is encoded and when such null data is encountered by the transmitter, such null data may result in blanking insofar as the transmitter can be configured to recognize that nothing needs to be transmitted. With this example, null data is encoded and the encoded null data causes transmitter blanking due to the lack of valid data.

As shown in FIG. 33, multimedia processing unit 452 encodes a set of frames of multimedia data (552), and encodes null data for a period following the set of frames of multimedia data (554). Modulation unit 454 modulates the encoded set of frames and the null data, wherein modulating the null data creates a null interval over the period (556). Transmitter unit 456 transmits the encoded set of frames, wherein the null interval aligns with a blanking interval of the transmitter over the period (558). In some cases, the null data may itself cause the transmitter to blank over the blanking interval due to the presence of the null data. In any case, sensor unit 460 performs one or more sensing operations when the transmitter is blanked (560).

Again, as with other examples, the encoded set of frames may comprise a set of audio frames or a set of video frames. In most cases, the set of frames comprise a combined set of audio frames and video frames. The null data may comprise a set of packets having all zeros within packet payloads of the set of packets. Null data packets may still include packet headers.

As with other examples above, the sensing operation may include sensing for other wireless signals at a particular frequency, or sensing for a licensed signal at the particular frequency. If such signals are sensed by sensor unit 460, transmitter unit 456 may be switched to a different frequency. In other words, upon sensing another wireless signal at the particular frequency, transmitter unit 456 may be switched to a different frequency, e.g. at the direction of blanking control unit 458, so that transmitter unit 456 does not interfere at the particular frequency. The method of FIG. 33, like other techniques described herein, may be repeated periodically in compliance with a wireless communication standard that requires periodic sensing for unlicensed use of the particular frequency.

Figure 34:
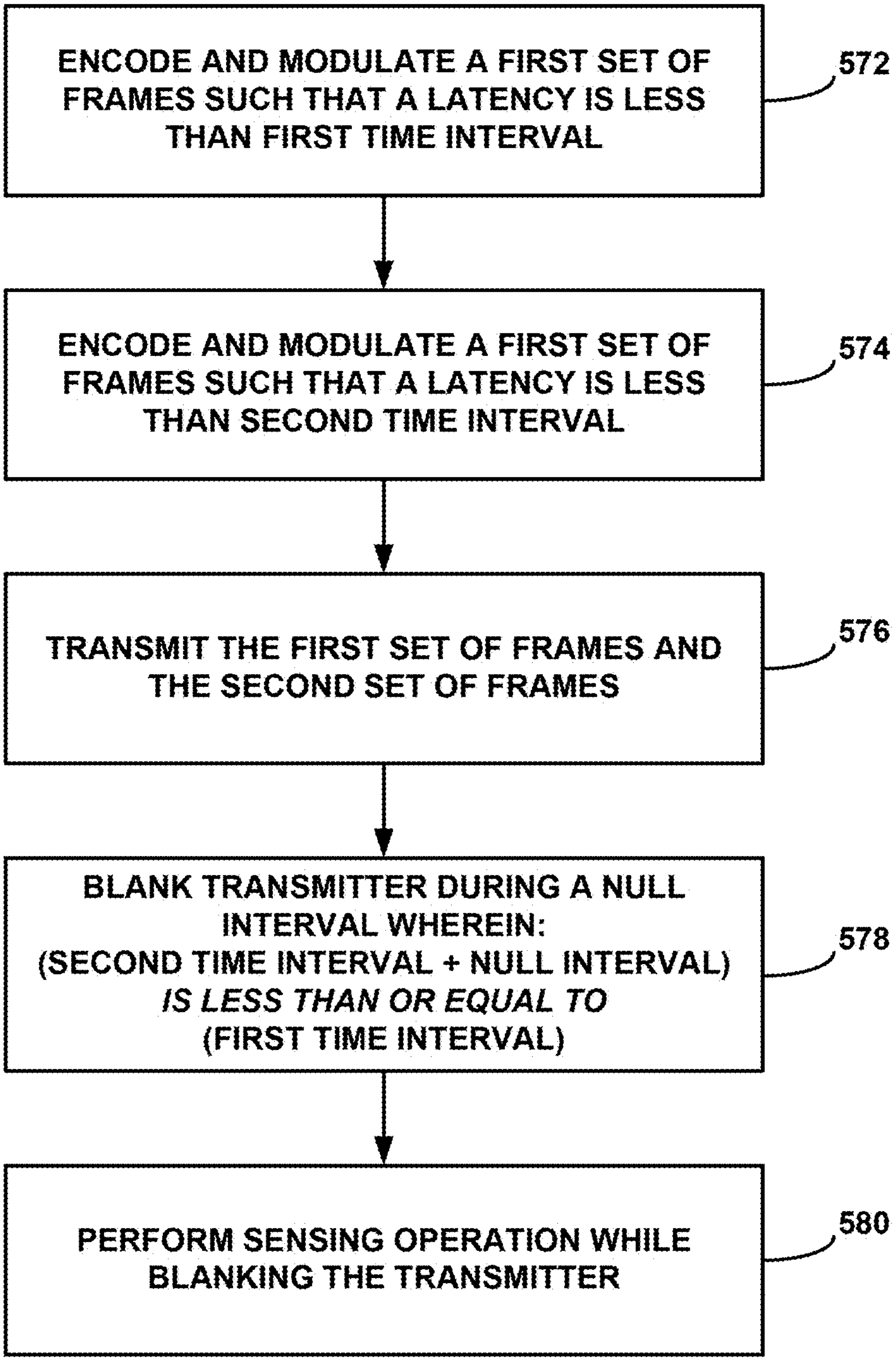

FIG. 34 is another flow diagram illustrating a technique consistent with this disclosure. As mentioned above, latency is an issue with real-time delivery of multimedia data, and latency associated with demodulating and decoding multimedia data may be a concern. Latency greater than 100 milliseconds in video may become noticeable to a human viewer, and therefore, it is often desirable to ensure that the encoding and modulation of multimedia data does not result in decoding and demodulation latency above the 100 milliseconds. Blanking can add additional latency, in which case it may be desirable to reduce decoding and demodulation latency by a commensurate amount to keep overall latency under 100 milliseconds (or another similar time interval).

FIG. 34 illustrates an adaptive technique that allows for decoding and demodulation latency to increase to a full real-time interval (say 100 milliseconds) for sets of frames during which blanking is not performed. However, with the technique of FIG. 34, decoding and demodulation latency may be reduced for any set of frames associated with a blanking interval. In this way, added latency (up to an allowed threshold) may be exploited to improve video quality for set of frames that are not associated with a blanking interval.

As shown in FIG. 34, multimedia processing unit 452 and modulator unit 454 encode and modulate a first set of frames such that a latency associated with demodulating and decoding the first set of frames is less than a first time interval (572). Multimedia processing unit 452 and modulator unit 454 then encode and modulate a second set of frames such that a required latency associated with demodulating and decoding the first set of frames is less than a second time interval (574). Transmitter unit 456 transmits the first set of frames and the second set of frames (576). Blanking control unit 458 cause transmitter 456 to blank its communication during a null interval associated with transmitting the second set of frames, wherein the null interval and the second time interval are less than or equal to the first time interval (578). Sensor unit 460 performs a sensing operation while transmitter 456 is blanked (580).

The first time interval may be less than approximately 100 milliseconds, the null interval may be approximately 40 milliseconds and the second time interval may be less than approximately 60 milliseconds. If the null interval is only 10 milliseconds, then the second time interval may be less than 90 milliseconds. In this example, the first time interval may be greater than or equal to the sum of the second time interval and the null interval so as to ensure that latency never exceeds the first time interval.

In the example of FIG. 34, encoding and modulating the second set of frames, may include encoding the second set of frames differently than the first set of frames to reduce decoding latency of the second set of frames by an amount sufficient to account for the null interval. As one example, the first set of frames may be encoded to include I-frames, P-frames and B-frames, while the second set of frames may be encoded to include I-frames and P-frames without any B-frames since B-frames can add latency to the decoding process.

Furthermore, a wide variety of other techniques may also be used to ensure that decoding and demodulating latency is sufficiently low to ensure real-time delivery of multimedia data, and the techniques may vary depending on whether a null interval is associated with a set of frames. The amount of input buffer data may also be reduced, e.g., only allowing frame prediction from a limited number of frames (or even single or partial frames) so as to ensure that latency associated with a decoding process is reduced when transmitter blanking is performed during transmission of a set of frames. Input buffers data may be expanded, however, if blanking is not performed during transmission of any given set of frames. These and other techniques may be highly desirable for real-time communication of multimedia data at frequencies that require sensing (and thus transmitter blanking) at periodic intervals to ensure that use of the frequencies complies with laws and regulations that require such sensing.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a non-transitory computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:

encoding a set of frames of digital multimedia data in a first data stream;

encoding digital null data for a period following the set of frames of multimedia data in a second data stream;

modulating, with a multiplexer, the encoded set of frames of the first stream and the null data of the second stream into a combined stream, wherein modulating the null data creates a null interval over the period, wherein the null interval is defined to correspond to a transmitter quieting interval during which a transmitter refrains from transmitting any data;

transmitting the encoded set of frames of the combined stream via the transmitter;

blanking the transmitter during the null interval of the combined stream, wherein blanking the transmitter during the null interval comprises refraining from transmitting data via the transmitter during the transmitter quieting interval corresponding to the null interval; and performing a sensing operation while blanking the transmitter during the transmitter quieting interval corresponding to the null interval wherein the one or more null intervals are not less than six milliseconds to provide a sufficient time for reliable spectrum sensing to be performed.

2. The method of claim 1, wherein the null data causes blanking of the transmitter.

3. The method of claim 1, wherein the set of frames comprise one of:

a set of audio frames, a set of video frames, and a combined set of audio frames and video frames.

4. The method of claim 1, wherein the null data comprises a set of packets having all zeros within packet payloads of the set of packets.

5. The method of claim 1, wherein performing the sensing operation includes sensing for other wireless signals at one or more particular frequencies.

6. The method of claim 5, wherein sensing for other wireless signals comprises sensing for a licensed signal at the one or more particular frequencies.

7. The method of claim 5, further comprising switching the transmitter to a different frequency upon sensing another wireless signal at the one or more particular frequencies.

8. The method of claim 5, further comprising periodically repeating the method in compliance with a wireless communication standard that requires periodic sensing with unlicensed use of the one or more particular frequencies.

9. The method of claim 4, wherein the method is repeated periodically for periodic sensing operations.

10. A device comprising:

a multimedia encoding unit that encodes a set of frames of digital multimedia data in a first data stream and encodes digital null data for a period following the set of frames of multimedia data in a second data stream;

a modulator unit that modulates, with a multiplexer, the encoded set of frames of the first stream and the null data of the second stream into a combined stream, wherein modulating the null data creates a null interval over the period, and wherein the null interval is defined to correspond to a transmitter quieting interval during which a transmitter refrains from transmitting any data;

the transmitter that transmits the encoded set of frames and blanks during the transmitter quieting interval corresponding to the null interval, wherein to blank during the null interval, the transmitter refrains from transmitting data via the transmitter during the transmitter quieting interval corresponding to the null interval; and a sensor unit that performs a sensing operation while the transmitter blanks during the transmitter quieting interval corresponding to the null interval wherein the one or more null intervals are not less than six milliseconds to provide a sufficient time for reliable spectrum sensing to be performed.

11. The device of claim 10, wherein the presence of the null data causes the blanking of the transmitter.

12. The device of claim 10, wherein the set of frames comprise one of:

a set of audio frames, a set of video frames, and a combined set of audio frames and video frames.

13. The device of claim 10, wherein the null data comprises a set of packets having all zeros within packet payloads of the set of packets.

14. The device of claim 10, wherein in performing the sensing operation, the sensor unit senses for other wireless signals at one or more particular frequencies.

15. The device of claim 14, wherein the sensor unit senses for a licensed signal at the one or more particular frequencies.

16. The device of claim 14, wherein the transmitter switches to a different frequency when the sensor unit senses another wireless signal at the one or more particular frequencies.

17. The device of claim 14, the sensor unit periodically repeats the sensing operation and the transmitter unit periodically repeats blanking in compliance with a wireless communication standard that requires periodic sensing with unlicensed use of the one or more particular frequencies.

18. The device of claim 14, wherein the sensor unit periodically repeats the sensing operation.

19. A device comprising:

means for encoding a set of digital frames of multimedia data in a first data stream;

means for encoding digital null data for a period following the set of frames of multimedia data in a second data stream;

means for modulating, with a multiplexer, the encoded set of frames of the first stream and the null data of the second stream into a combined stream, wherein modulating the null data creates a null interval over the period, and wherein the null interval is defined to correspond to a transmitter quieting interval during which a transmitter refrains from transmitting any data;

means for transmitting the encoded set of frames of the combined stream via the transmitter;

means for blanking the means for transmitting during the null interval of the combined stream, wherein the means for blanking the means for transmitting during the null interval comprises means for refraining from transmitting data via the transmitter during the transmitter quieting interval corresponding to the null interval; and means for performing a sensing operation while blanking the transmitter during the transmitter quieting interval corresponding to the null interval wherein the one or more null intervals are not less than six milliseconds to provide a sufficient time for reliable spectrum sensing to be performed.

20. The device of claim 19, wherein the null data causes blanking of the means for transmitting.

21. The device of claim 19, wherein the set of frames comprise one of:

a set of audio frames, a set of video frames, and a combined set of audio frames and video frames.

22. The device of claim 19, wherein the null data comprises a set of packets having all zeros within packet payloads of the set of packets.

23. The device of claim 19, wherein the means for performing the sensing operation includes means for sensing for other wireless signals at one or more particular frequencies.

24. The device of claim 23, wherein the means for sensing for other wireless signals comprises means for sensing for a licensed signal at the one or more particular frequencies.

25. The device of claim 23, further comprising switching the transmitter to a different frequency upon sensing another wireless signal at the one or more particular frequencies.

26. The device of claim 23, further comprising periodically repeating the method in compliance with a wireless communication standard that requires periodic sensing with unlicensed use of the one or more particular frequencies.

27. The device of claim 19, wherein the method is repeated periodically for periodic sensing operations.

28. A non-transitory computer-readable storage medium comprising instructions that upon execution in a processor cause the processor to:

encode a set of frames of digital multimedia data in a first data stream;

encode digital null data for a period following the set of frames of multimedia data in a second data stream;

modulate, with a multiplexer, the encoded set of frames of the first stream and the null data of the second stream into a combined stream, wherein modulating the null data creates a null interval over the period, and wherein the null interval is defined to correspond to a transmitter quieting interval during which a transmitter refrains from transmitting any data;

transmit the encoded set of frames of the combined stream via the transmitter;

blank the transmitter during the null interval of the combined stream, wherein the instructions that cause the processor to blank the transmitter during the null interval further cause the processor to: refrain from transmitting data via the transmitter during the transmitter quieting interval corresponding to the null interval; and cause a sensor unit to perform a sensing operation while the transmitter blanks during the transmitter quieting interval corresponding to the null interval wherein the one or more null intervals are not less than six milliseconds to provide a sufficient time for reliable spectrum sensing to be performed.

29. The computer-readable storage medium of claim 28, wherein the null data causes blanking of the transmitter.

30. The computer-readable storage medium of claim 28, wherein the set of frames comprise one of:

a set of audio frames, a set of video frames, and a combined set of audio frames and video frames.

31. The computer-readable storage medium of claim 28, wherein the null data comprises a set of packets having all zeros within packet payloads of the set of packets.

32. The computer-readable storage medium of claim 28, wherein the instructions cause the sensor unit to sense for other wireless signals at one or more particular frequencies.

33. The computer-readable storage medium of claim 32, wherein the instructions cause the sensor unit to sense for a licensed signal at the one or more particular frequencies.

34. The computer-readable storage medium of claim 32, wherein the instructions cause the transmitter to switch to a different frequency upon the sensor unit sensing another wireless signal at the one or more particular frequencies.

35. The computer-readable storage medium of claim 32, wherein the instructions cause the sensor unit periodically repeat sensing operations during periodically repeating null intervals.

* * * * *